(12) United States Patent
Murata et al.

(10) Patent No.: US 10,663,804 B2
(45) Date of Patent: May 26, 2020

(54) LIQUID CRYSTAL DISPLAY DEVICE COMPRISING A SECOND ELECTRODE HAVING AN ELLIPTICAL OPENING PORTION WITH A MAJOR AXIS PARALLEL OR PERPENDICULAR TO AN ALIGNMENT AZIMUTH OF LIQUID CRYSTAL MOLECULES

(71) Applicant: SHARP KABUSHIKI KAISHA, Sakai, Osaka (JP)

(72) Inventors: Mitsuhiro Murata, Sakai (JP); Yosuke Iwata, Sakai (JP); Takuma Tomotoshi, Sakai (JP); Satoshi Matsumura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 240 days.

(21) Appl. No.: 15/762,964

(22) PCT Filed: Sep. 20, 2016

(86) PCT No.: PCT/JP2016/077611
§ 371 (c)(1),
(2) Date: Mar. 23, 2018

(87) PCT Pub. No.: WO2017/051787
PCT Pub. Date: Mar. 30, 2017

(65) Prior Publication Data
US 2019/0107759 A1  Apr. 11, 2019

(30) Foreign Application Priority Data

Sep. 25, 2015 (JP) ................. 2015-188811
Jan. 21, 2016 (JP) ................. 2016-009926

(51) Int. Cl.
G02F 1/1337 (2006.01)
G02F 1/1343 (2006.01)
G02F 1/137 (2006.01)

(52) U.S. Cl.
CPC .. *G02F 1/133707* (2013.01); *G02F 1/134363* (2013.01); *G02F 2001/13706* (2013.01);
(Continued)

(58) Field of Classification Search
CPC ........ G09G 3/3607; G02F 2001/13706; G02F 2001/13712
See application file for complete search history.

(56) References Cited

U.S. PATENT DOCUMENTS

2002/0089632 A1* 7/2002 Wong ................ G02F 1/133707
349/143
2005/0225708 A1 10/2005 Oke et al.
(Continued)

FOREIGN PATENT DOCUMENTS

JP 2005-300821 A 10/2005
JP 2009-169353 A 7/2009
(Continued)

*Primary Examiner* — Paul C Lee
(74) *Attorney, Agent, or Firm* — ScienBiziP, P.C.

(57) ABSTRACT

A liquid crystal display device includes, in the given order: a first substrate; a liquid crystal layer containing liquid crystal molecules; and a second substrate; wherein the first substrate includes a first electrode, a second electrode positioned closer to the liquid crystal layer than the first electrode is, and an insulating film between the first electrode and the second electrode, the second electrode has an opening having a shape including an elliptical portion and/or a circular portion, in a no-voltage-applied state, where no voltage is applied between the first electrode and the second electrode, the liquid crystal molecules are aligned parallel to the first substrate, and in a plan view, the major axis of the (Continued)

elliptical portion is parallel or perpendicular to the alignment azimuth of the liquid crystal molecules in the no-voltage-applied state.

8 Claims, 48 Drawing Sheets

(52) U.S. Cl.
CPC .............. *G02F 2001/13712* (2013.01); *G02F 2001/134372* (2013.01)

(56) References Cited

U.S. PATENT DOCUMENTS

| | | |
|---|---|---|
| 2008/0042158 A1 | 2/2008 | Oke et al. |
| 2008/0043193 A1 | 2/2008 | Oke et al. |
| 2008/0043415 A1 | 2/2008 | Oke et al. |
| 2009/0002294 A1* | 1/2009 | Horiguchi ......... G02F 1/134363 345/87 |
| 2009/0091696 A1* | 4/2009 | Higano ............. G02F 1/133707 349/126 |
| 2009/0102826 A1 | 4/2009 | Oke et al. |
| 2009/0128727 A1* | 5/2009 | Yata ................. G02F 1/134363 349/46 |
| 2009/0160748 A1* | 6/2009 | Kimura ............. G02F 1/134363 345/94 |
| 2009/0185123 A1 | 7/2009 | Morimoto et al. |
| 2009/0231530 A1* | 9/2009 | Nishimura ............ G02F 1/1323 349/129 |
| 2012/0019759 A1 | 1/2012 | Sunohara et al. |
| 2012/0113072 A1 | 5/2012 | Oke et al. |
| 2012/0154724 A1* | 6/2012 | Yang ................. G02F 1/134309 349/108 |
| 2013/0100388 A1 | 4/2013 | Matsushima |
| 2013/0140571 A1* | 6/2013 | Imai .................... H01L 33/0041 257/59 |
| 2013/0169899 A1* | 7/2013 | Tsuda ............... G02F 1/134363 349/42 |
| 2013/0187842 A1 | 7/2013 | Oke et al. |
| 2013/0194532 A1* | 8/2013 | Morita ................ G02F 1/13452 349/123 |
| 2015/0268494 A1* | 9/2015 | Yamaguchi ........... G02F 1/1337 349/43 |
| 2016/0161811 A1 | 6/2016 | Matsushima |

FOREIGN PATENT DOCUMENTS

| | | |
|---|---|---|
| JP | 2011-081256 A | 4/2011 |
| JP | 2012-027151 A | 2/2012 |
| JP | 2013-109309 A | 6/2013 |

\* cited by examiner (1)　　　　　　　　　(2)

Polarizing plate absorption axes (1)　　　　　　　　(2)

200B

Polarizing plate absorption axes (1)     (2)

Polarizing plate absorption axes (1)　　　　　　　(2)

300B (1)  (2)

LIQUID CRYSTAL DISPLAY DEVICE COMPRISING A SECOND ELECTRODE HAVING AN ELLIPTICAL OPENING PORTION WITH A MAJOR AXIS PARALLEL OR PERPENDICULAR TO AN ALIGNMENT AZIMUTH OF LIQUID CRYSTAL MOLECULES

TECHNICAL FIELD

The present invention relates to a liquid crystal display device. In particular, the present invention relates to a liquid crystal display device suitable as a horizontal alignment mode liquid crystal display device provided with high-definition pixels.

BACKGROUND ART

Liquid crystal display devices are display devices that utilize a liquid crystal composition for display. The typical display mode thereof is applying voltage to a liquid crystal composition sealed between paired substrates to change the alignment state of liquid crystal molecules in the liquid crystal composition according to the applied voltage, thereby controlling the amount of light transmitted. These liquid crystal display devices, having characteristics such as thin profile, light weight, and low power consumption, have been used in a broad range of fields.

The display modes of liquid crystal display devices include horizontal alignment modes, which control the alignment of liquid crystal molecules by rotating them mainly in a plane parallel to the substrate surfaces. The horizontal alignment modes have received attention because these modes make it easy to achieve wide viewing angle characteristics. For example, the in-plane switching (IPS) mode and the fringe field switching (FFS) mode, both a type of horizontal alignment mode, are widely used in recent liquid crystal display devices for smartphones or tablet PCs.

There is continuing research and development of the horizontal alignment modes to achieve higher definition pixels, an improved transmittance, and an improved response speed to improve display quality. Patent Literature 1 discloses a technique to improve the response speed, for example. Specifically, Patent Literature 1 relates to an IPS mode liquid crystal display device, and discloses a technique in which a liquid crystal composition containing a photo-polymerizable monomer is placed between paired substrates and the photopolymerizable monomer is polymerized to form a polymer structure to connect the paired substrates. The literature teaches that this technique allows the liquid crystal display device to exhibit excellent responsivity in a wide temperature range. Patent Literature 2 relates to a FFS mode liquid crystal display device and discloses a technique in which openings having, for example, a rectangular or substantially rhombic shape are formed in the common electrode, and liquid crystal molecules facing each other in the width direction of each opening are rotated in opposite directions. The literature teaches that this technique contributes to a higher response speed.

CITATION LIST

Patent Literature

Patent Literature 1: JP 2011-81256 A
Patent Literature 2: JP 2013-109309 A

SUMMARY OF INVENTION

Technical Problem

The horizontal alignment modes offer the advantage of wide viewing angles, but have the problem that they are slow in response as compared to vertical alignment modes such as the multi-domain vertical alignment (MVA) mode. The use of the technique of Patent Literature 1 to improve the response speed unfortunately decreases the transmittance because the aperture ratio (the proportion of the display area in a pixel) is decreased due to the polymer structure. In addition, the photopolymerizable monomer that remains in the liquid crystal layer may cause unevenness due to image sticking. The use of the technique of Patent Literature 2 significantly decreases the transmittance because in this technique the region where the liquid crystal molecules rotate is small. Both of the techniques of Patent Literatures 1 and 2 thus fail to provide a high transmittance while improving the response speed.

For a liquid crystal display device having ultra high-definition pixels (800 ppi or greater) to achieve excellent display quality, high transmittance is very important. Therefore, there is a need for a technique to achieve both a high-speed response and a high transmittance in a horizontal alignment mode liquid crystal display panel having ultra high-definition pixels.

The present invention has been made in view of the current state of the art, and aims to provide a horizontal alignment mode liquid crystal display device that achieves both a high-speed response and a high transmittance.

Solution to Problem

The present inventors made various studies on horizontal alignment mode liquid crystal display devices achieving both a high-speed response and a high transmittance. As a result, they found out that forming an opening having a shape including an elliptical portion and/or a circular portion in the electrode as an opening for generating a fringe electric field enables appropriate control of liquid crystal molecules near the opening. They found that this makes it possible to achieve a higher response speed without decreasing the transmittance and can solve the problems, thus arriving at the present invention.

One aspect of the present invention may be a liquid crystal display device including, in the given order: a first substrate; a liquid crystal layer containing liquid crystal molecules; and a second substrate, wherein the first substrate includes a first electrode, a second electrode positioned closer to the liquid crystal layer than the first electrode is, and an insulating film between the first electrode and the second electrode, the second electrode is provided with an opening having a shape including an elliptical portion and/or a circular portion, in a no-voltage-applied state, where no voltage is applied between the first electrode and the second electrode, the liquid crystal molecules are aligned parallel to the first substrate, and in a plan view, the major axis of the elliptical portion is parallel to an alignment azimuth of the liquid crystal molecules in the no-voltage-applied state.

Another aspect of the present invention may be a liquid crystal display device including, in the given order: a first substrate; a liquid crystal layer containing liquid crystal molecules; and a second substrate, wherein the first substrate includes a first electrode, a second electrode positioned closer to the liquid crystal layer than the first electrode is, and an insulating film between the first electrode and the second electrode, the second electrode is provided with an opening having a shape including an elliptical portion and/or a circular portion, in a no-voltage-applied state, where no voltage is applied between the first electrode and the second electrode, the liquid crystal molecules are aligned parallel to the first substrate, and in a plan view, the major axis of the elliptical portion is perpendicular to an alignment azimuth of the liquid crystal molecules in the no-voltage-applied state.

Advantageous Effects of Invention

The present invention enables a horizontal alignment mode liquid crystal display device to achieve both a high-speed response and a high transmittance. The effect is significant especially when the liquid crystal display device has high-definition pixels.

BRIEF DESCRIPTION OF DRAWINGS

FIG. 6(1) shows the off state and FIG. 6(2) shows the on state.

FIG. 10(1) shows the off state and FIG. 10(2) shows the on state.

FIG. 14(1) shows the off state and FIG. 14(2) shows the on state.

FIG. 18(1) shows the off state and FIG. 18(2) shows the on state.

FIG. 23(1) shows the off state and FIG. 23(2) shows the on state.

FIG. 27(1) shows the off state and FIG. 27(2) shows the on state.

FIG. 31(1) shows the off state and FIG. 31(2) shows the on state.

FIG. 35(1) shows the off state and FIG. 35(2) shows the on state.

FIG. 39(1) shows the off state and FIG. 39(2) shows the on state.

FIG. 43(1) shows the off state and FIG. 43(2) shows the on state.

FIG. 48(1) shows the off state and FIG. 48(2) shows the on state.

FIG. 52(1) shows the off state and FIG. 52(2) shows the on state.

FIG. 56(1) shows the off state and FIG. 56(2) shows the on state.

FIG. 60(1) shows the off state and FIG. 60(2) shows the on state.

FIG. 64(1) shows the off state and FIG. 64(2) shows the on state.

DESCRIPTION OF EMBODIMENTS

Figure 1:
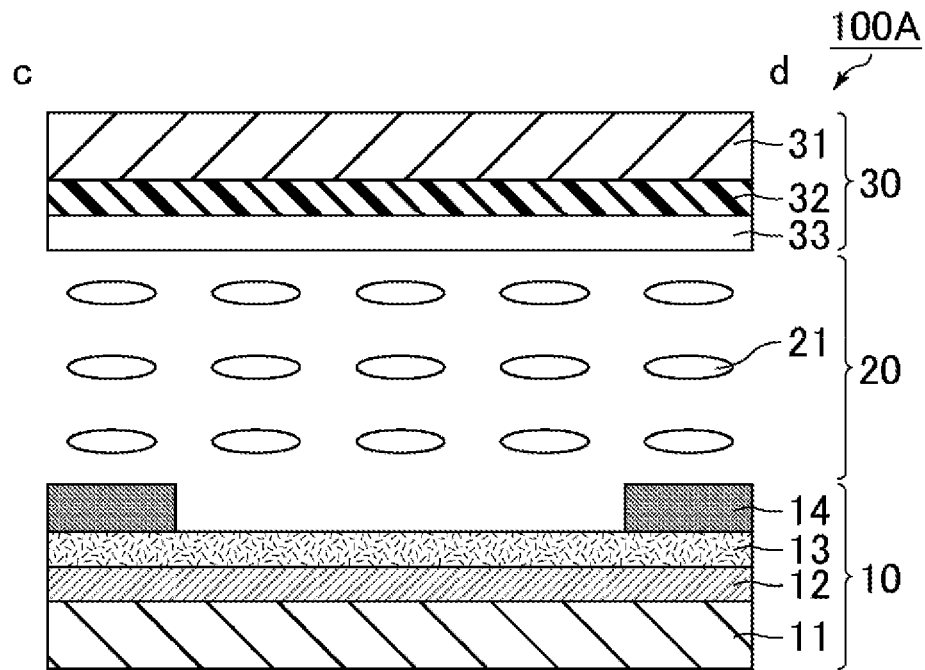
FIG. 1 is a schematic cross-sectional view of a liquid crystal display device of Embodiment 1 in the off state.

Hereinafter, embodiments of the present invention will be described. The following embodiments, however, are not intended to limit the scope of the present invention. The present invention may appropriately be modified within the scope of the configuration of the present invention.

The same components or components having the same or similar function are commonly provided with the same reference sign in the drawings, and description of such components is not repeated.

The configurations described in the embodiments may appropriately be combined or modified within the spirit of the present invention.

Embodiment 1

Figure 2:
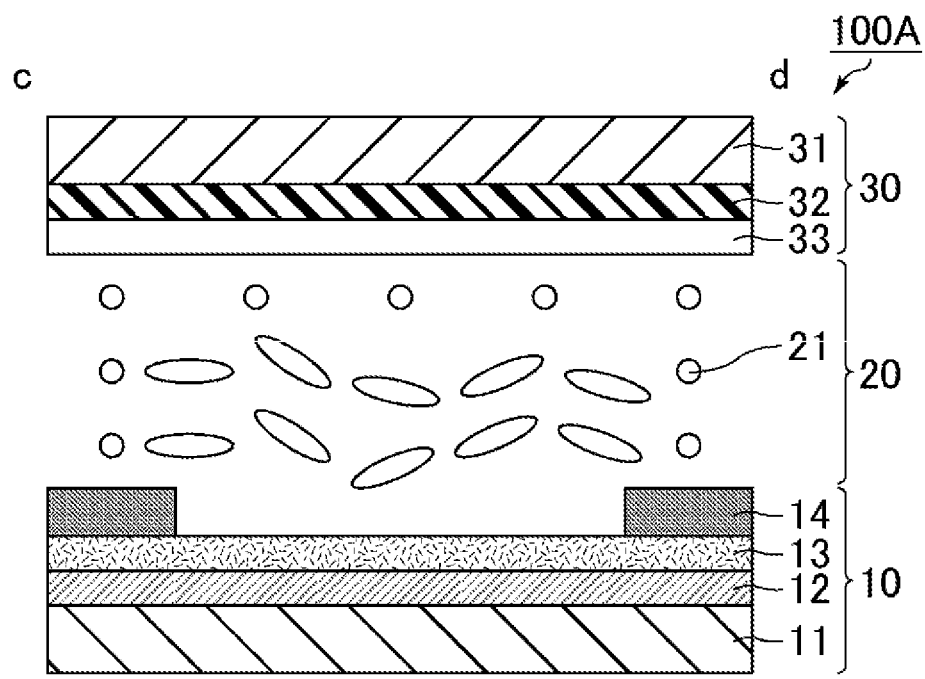
FIG. 2 is a schematic cross-sectional view of the liquid crystal display device of Embodiment 1 in the on state.
Figure 3:
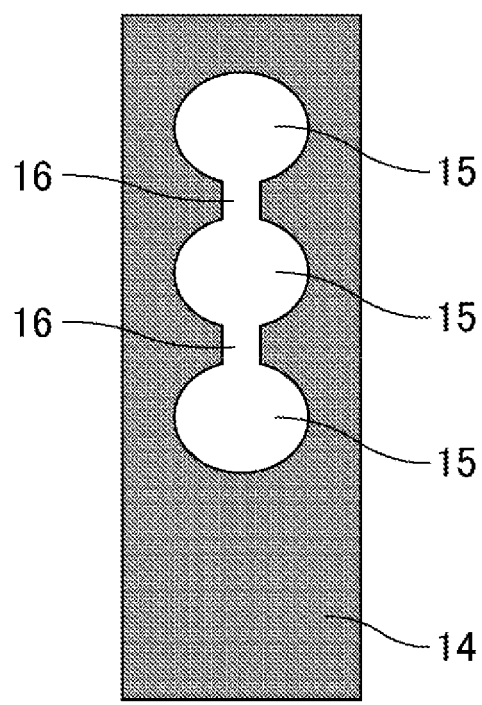
FIG. 3 is a schematic plan view of a counter electrode in the liquid crystal display device of Embodiment 1.
Figure 4:
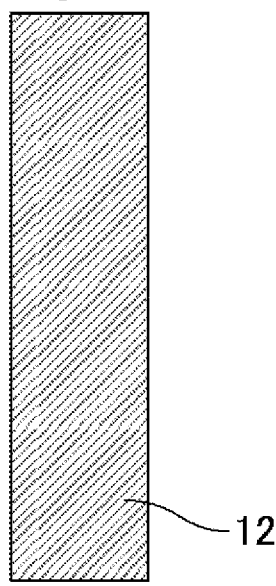
FIG. 4 is a schematic plan view of a pixel electrode in the liquid crystal display device of Embodiment 1.
Figure 5:
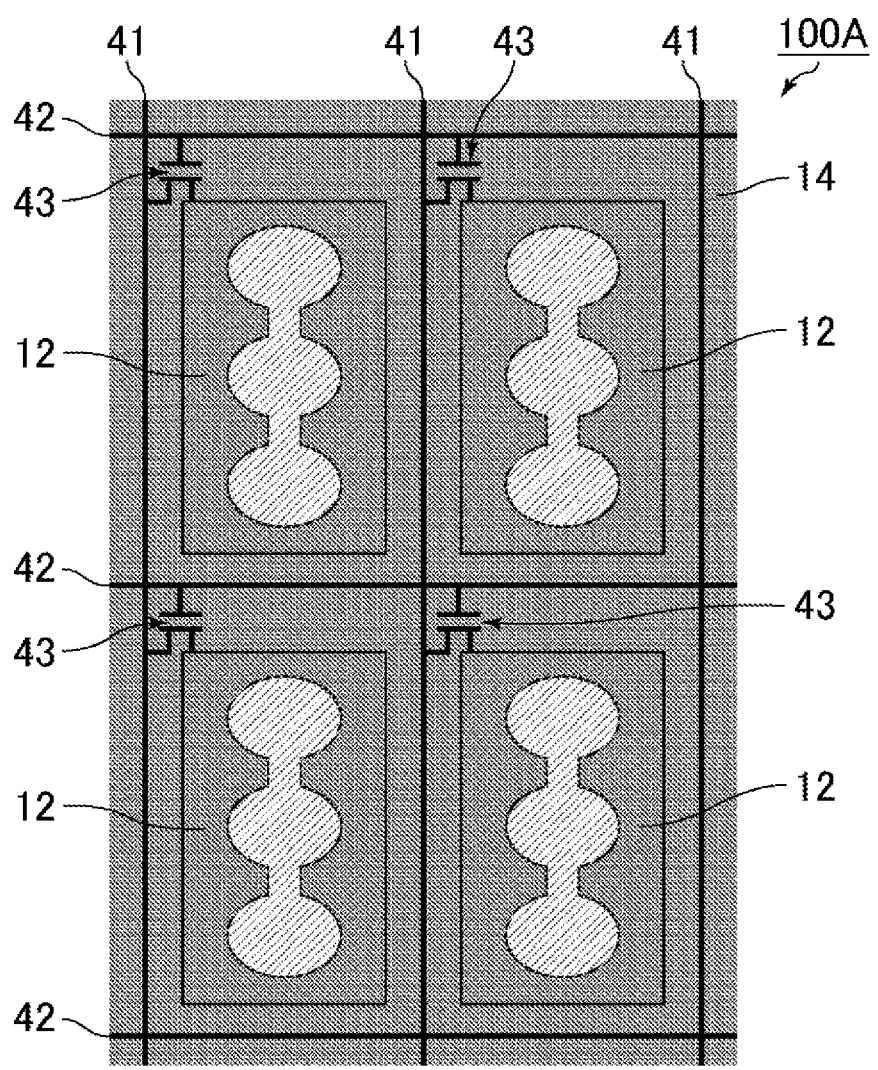
FIG. 5 is a schematic plan view of the liquid crystal display device of Embodiment 1.
Figure 6:
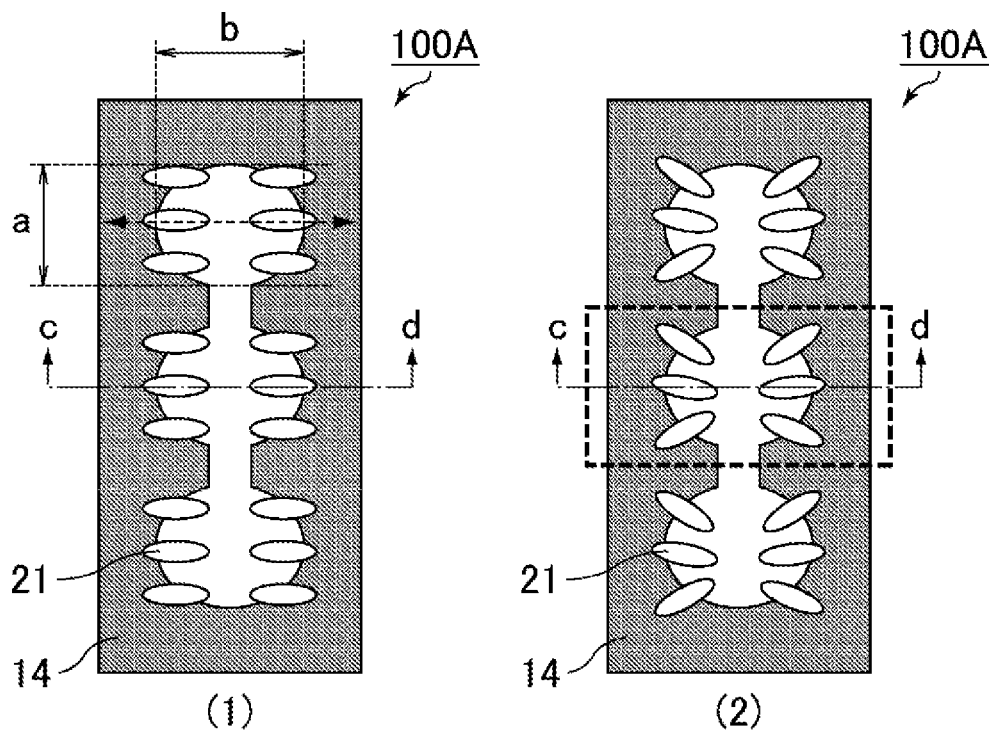
FIG. 6 schematically illustrates the control of the alignment of liquid crystal molecules in the liquid crystal display device of Embodiment 1.

With reference to FIGS. 1 to 6, a liquid crystal display device of Embodiment 1 will be described below. FIG. 1 is a schematic cross-sectional view of the liquid crystal display device of Embodiment 1 in the off state. FIG. 2 is a schematic cross-sectional view of the liquid crystal display device of Embodiment 1 in the on state. FIG. 3 is a schematic plan view of a counter electrode in the liquid crystal display device of Embodiment 1. FIG. 4 is a schematic plan view of a pixel electrode in the liquid crystal display device of Embodiment 1. FIG. 5 is a schematic plan view of the liquid crystal display device of Embodiment 1. FIG. 6 schematically illustrates the control of the alignment of liquid crystal molecules in the liquid crystal display device of Embodiment 1. FIG. 6(1) shows the off state and FIG. 6(2) shows the on state. FIG. 1 and FIG. 2 each show a cross section taken along the line c-d in FIG. 6.

As shown in FIG. 1, a liquid crystal display device 100A of Embodiment 1 includes a first substrate 10, a liquid crystal layer 20 containing liquid crystal molecules 21, and a second substrate 30, in the given order. The first substrate 10 is a TFT array substrate and has a stacked structure including, in order toward the liquid crystal layer 20, a first polarizer (not shown), an insulating substrate (e.g., glass substrate) 11, a pixel electrode (first electrode) 12, an insulating layer (insulating film) 13, and a counter electrode (second electrode) 14. The second substrate 30 is a color filter substrate and has a stacked structure including, in order toward the liquid crystal layer 20, a second polarizer (not shown), an insulating substrate (e.g., glass substrate) 31, a color filter 32, and an overcoat layer 33. The first polarizer and the second polarizer are both absorptive polarizers and disposed in the crossed Nicols with their absorption axes perpendicular to each other.

Although not shown in FIG. 1, a horizontal alignment film is typically disposed on the liquid crystal layer 20 side surface of the first substrate 10 and/or the second substrate 30. The horizontal alignment film acts to align liquid crystal molecules near the film parallel to the film surface. In addition, the horizontal alignment film adjusts the orientations of the major axes (hereinafter also referred to as "alignment azimuths") of the liquid crystal molecules 21 aligned parallel to the first substrate 10 to a specific in-plane azimuth. The horizontal alignment film preferably has been subjected to alignment treatment such as photo-alignment treatment or rubbing treatment. The horizontal alignment film may be made of an inorganic material or an organic material.

The alignment mode of the liquid crystal display device 100A is a fringe field switching (FFS) mode.

In the no-voltage-applied state (off state), where no voltage is applied between the pixel electrode 12 and the counter electrode 14, the liquid crystal molecules 21 are aligned parallel to the first substrate 10. The "parallel" herein includes not only being completely parallel, but also a range (substantially parallel) that can be equated with being parallel in the art. The pre-tilt angle (angle of tilt in the off state) of the liquid crystal molecules 21 is preferably smaller than 3°, more preferably smaller than 1° relative to the surface of the first substrate 10.

In the liquid crystal layer 20 in the voltage-applied state (on state), the alignment of the liquid crystal molecules 21 is controlled by the stacked structure of the first substrate 10 including the pixel electrode 12, the insulating layer 13, and the counter electrode 14. The pixel electrode 12 is an electrode formed per display unit. The counter electrode 14 is common to a plurality of display units. The "display unit" means a region corresponding to one pixel electrode 12. The display unit may be one called "pixel" in the technical field of liquid crystal display devices, or may be one called "sub-pixel" or "dot" in cases where one pixel is divided for driving.

The positions of the counter electrode 14 and the pixel electrode 12 may be switched. Specifically, although in the stacked structure shown in FIG. 1 the counter electrode 14 is adjacent to the liquid crystal layer 20 via a horizontal alignment film (not shown), the pixel electrode 12 may be adjacent to the liquid crystal layer via a horizontal alignment film (not shown). In such a case, an opening having a shape including an elliptical portion 15 and/or a circular portion 15A (described later) is formed in the pixel electrode 12 instead of the counter electrode 14.

In the stacked structure shown in FIG. 1, an opening having a shape including an elliptical portion 15 and/or a circular portion 15A is formed in the counter electrode 14. This opening is used for generating a fringe electric field (oblique electric field). The opening is preferably formed per display unit, and preferably formed in all the display units.

The opening in the counter electrode 14 may have any shape as long as it includes an elliptical portion 15 and/or a circular portion 15A. Examples of the shape include a shape including only one elliptical portion 15, a shape including only one circular portion 15A, a shape including a plurality of elliptical portions 15, a shape including a plurality of circular portions 15A, and a shape including both one or more elliptical portions 15 and one or more circular portions 15A. When the total number of elliptical portions 15 and circular portions 15A is 2 or greater, the portions may be connected to each other via linear portion(s) 16, or may be formed independently. One counter electrode 14 may have one or more openings. The elliptical portion 15 preferably has an elliptical shape, but from the standpoint of the effects of the present invention, it may have a shape (substantially elliptical shape) that can be equated with an elliptical shape. For example, the elliptical portion 15 may have an elliptical shape that has partial irregularities, a shape similar to an elliptical shape such as an egg shape, or a polygonal shape that substantially can be equated with an elliptical shape. Similarly, the circular portion 15A preferably has a perfectly circular shape, but from the standpoint of the effects of the present invention, it may have a shape (substantially circular shape) that can be equated with a circular shape. For example, the circular portion 15A may have a shape similar to a circular shape, such as a circular shape that has partial irregularities, or a polygonal shape that can be substantially equated with a circular shape.

Figure 7:
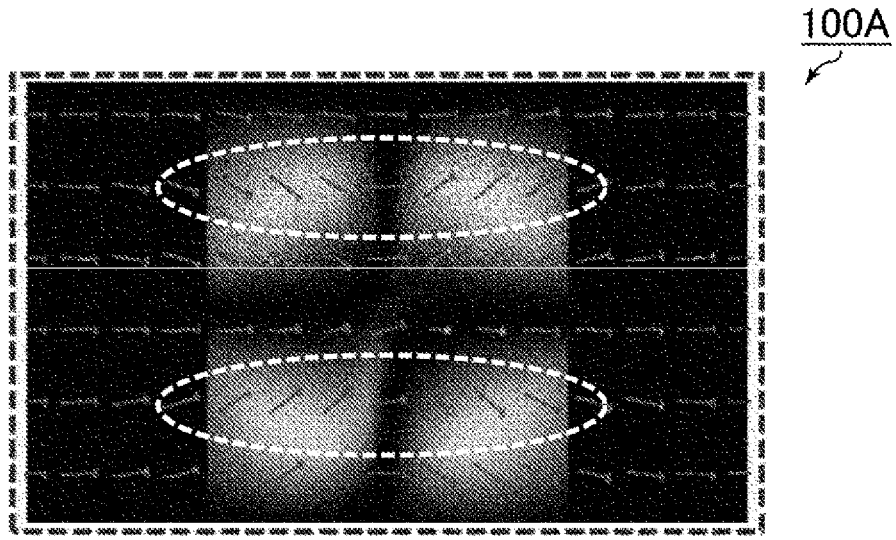
FIG. 7 is an enlarged plan view showing the simulation results of the distribution of liquid crystal molecule alignments in the region surrounded by the dotted line in FIG. 6(2).

For example, the opening in the counter electrode 14 may have a shape including a plurality of elliptical portions 15 and/or a plurality of circular portions 15A and linear portion(s) 16, and the linear portion(s) 16 may connect the elliptical portions 15 and/or the circular portions 15A to each other. In a specific example of the shape of the opening in the counter electrode 14, as shown in FIG. 3, three elliptical portions 15 are arranged in line in one display unit and the elliptical portions 15 are connected to each other via the linear portions 16. As shown in FIG. 7 (described later), in the voltage-applied state, the alignment region of liquid crystal molecules in each of the elliptical portions 15 or the circular portions 15A is divided into four domains. Connecting the elliptical portions 15 and/or the circular portions 15A to each other via the linear portion(s) 16 stabilizes the alignment of the liquid crystal molecules 21 in the voltage-applied state. As a result, the four domains of each of the elliptical portions 15 or the circular portions 15A have an approximately equal area, leading to higher transmittance.

In a plan view, the major axis of the elliptical portion 15 is parallel to the alignment azimuth of the liquid crystal molecules 21 in the no-voltage-applied state (off state). Preferably, in a plan view, a distortion ratio represented by the formula below is 1 or smaller:

Distortion ratio=$a/b$ where a is the length of the elliptical portion 15 and/or the circular portion 15A at the azimuth perpendicular to the alignment azimuth of the liquid crystal molecules 21 in the no-voltage-applied state, and b is the length of the elliptical portion 15 and/or the circular portion 15A at the alignment azimuth of the liquid crystal molecules 21 in the no-voltage-applied state. A distortion ratio of greater than 1 leads to a wide disclination region (unstable alignment region) in the center of the elliptical portion 15 and/or the circular portion 15A, which may decrease the transmittance. The lower limit of the distortion ratio is preferably 0.4. The major axis of the elliptical portion 15 and the alignment azimuth of the liquid crystal molecules 21 in the no-voltage-applied state are preferably parallel to the short direction of the display unit.

Since the counter electrode 14 provides a common potential to the respective display units, the counter electrode 14 may be formed on almost the entire surface (excluding the openings for producing a fringe electric field) of the first substrate 10. The counter electrode 14 may be electrically connected to an external connecting terminal at the periphery (frame region) of the first substrate 10.

As shown in FIG. 4, the pixel electrode 12 is a planer electrode with no opening. The pixel electrode 12 and the counter electrode 14 are stacked together via the insulating layer 13. As shown in FIG. 5, in a plan view, each pixel electrode 12 is positioned under the corresponding opening in the counter electrode 14. Thus, a fringe electric field is generated around the openings in the counter electrode 14 when a potential difference is generated between the pixel electrodes 12 and the counter electrode 14. As shown in FIG. 5, the openings in the counter electrode 14 are preferably formed such that the elliptical portions 15 and/or the circular portions 15A in adjacent display units are arranged in line in the row direction and/or the column direction. This arrangement stabilizes the alignment of the liquid crystal molecules in the voltage-applied state. For example, arranging the elliptical portions 15 and/or the circular portions 15A in adjacent display units in a staggered manner in the row or column direction causes unstable alignment of the liquid crystal molecules, which may decrease the response speed.

As in the circuit shown in FIG. 5, the drain of a TFT 43 is electrically connected to the corresponding pixel electrode 12. To the gate of the TFT 43 is electrically connected a gate signal line 41, and to the source of the TFT 43 is electrically connected a source signal line 42. Thus, the switching on/off of the TFT 43 is controlled by scanning signals input to the gate signal line 41. When the TFT 43 is on, data signals (source voltage) input to the source signal line 42 are provided to the pixel electrode 12 through the TFT 43. The TFT 43 preferably has a channel formed from indium-gallium-zinc-oxygen (IGZO), which is an oxide semiconductor.

The insulating layer 13 between the pixel electrode 12 and the counter electrode 14 may be, for example, an organic film (dielectric constant $\varepsilon$=3 to 4), an inorganic film (dielectric constant $\varepsilon$=5 to 7) such as a silicon nitride (SiNx) film or a silicon oxide (SiO$_2$) film, or a multilayer film containing any of these films.

The liquid crystal molecules 21 may have negative or positive value for the anisotropy of dielectric constant ($\Delta\varepsilon$) defined by the formula below. In other words, the liquid crystal molecules 21 may have negative anisotropy of dielectric constant or positive anisotropy of dielectric constant. Since liquid crystal materials containing liquid crystal molecules 21 having negative anisotropy of dielectric constant tend to have a relatively high viscosity, liquid crystal materials containing liquid crystal molecules 21 having positive anisotropy of dielectric constant are advantageous from the standpoint of achieving a high-speed response.

$\Delta\varepsilon$=(dielectric constant in the major axis direction)−(dielectric constant in the minor axis direction)

In a plan view, the alignment azimuth of the liquid crystal molecules 21 in the no-voltage-applied state (off state) is parallel to the absorption axis of one of the first polarizer and the second polarizer, and perpendicular to the absorption axis of the other. The control mode of the liquid crystal display device 100A is thus what is called a normally black mode, which provides black display when the liquid crystal layer 20 is in the no-voltage-applied state (off state).

The second substrate 30 is not limited and may be a color filter substrate typically used in the field of liquid crystal display devices. The overcoat layer 33 smoothes the liquid crystal layer 20 side surface of the second substrate 30, and may be an organic film (dielectric constant $\varepsilon$=3 to 4).

The first substrate 10 and the second substrate 30 are typically bonded to each other with a sealing material formed to surround the periphery of the liquid crystal layer 20. The first substrate 10, the second substrate 30, and the sealing material hold the liquid crystal layer 20 in a predetermined region. Examples of the sealing material include epoxy resins containing an inorganic or organic filler and a curing agent.

The liquid crystal display device 100A may contain components such as a backlight; an optical film (e.g., retardation film, viewing angle-increasing film, and luminance-increasing film); external circuits (e.g., a tape-carrier package (TCP) and a printed circuit board (PCB)); and a bezel (frame), in addition to the first substrate 10, liquid crystal layer 20, and second substrate 30. These components are not limited, and may be those usually used in the field of liquid crystal display devices. The description of these components is thus omitted.

The operation of the liquid crystal display device 100A will be described hereinbelow.

FIG. 1 shows the no-voltage-applied state (off state), where no voltage is applied between the pixel electrode 12 and the counter electrode 14. In the liquid crystal layer 20 in the off state, no electric field is generated and the liquid crystal molecules 21 are aligned parallel to the first substrate 10 as shown in FIG. 1. Since the alignment azimuth of the liquid crystal molecules 21 is parallel to the absorption axis of one of the first polarizer and the second polarizer, and since the first polarizer and the second polarizer are disposed in the crossed Nicols, the liquid crystal panel in the off state does not transmit light and provides black display.

As shown in FIG. 6(1), the alignment azimuth of the liquid crystal molecules 21 in the off state in a plan view may be parallel to the major axis of each elliptical portion 15 of the opening in the counter electrode 14. As shown in FIG.

6(1), the alignment azimuth of the liquid crystal molecules 21 in the off state in a plan view may be parallel to the short direction of the display unit.

FIG. 2 shows the voltage-applied state (on state), where a voltage is applied between the pixel electrode 12 and the counter electrode 14. In the liquid crystal layer 20 in the on state, an electric field according to the level of the voltage between the pixel electrode 12 and the counter electrode 14 is generated. Specifically, since the opening is formed in the counter electrode 14 positioned closer to the liquid crystal layer than the pixel electrode 12 is, a fringe electric field is generated around the opening. The liquid crystal molecules 21 rotate under the effect of the electric field to change their alignment azimuth from the alignment azimuth in the off state (see FIG. 6(1)) to the alignment azimuths in the on state (see FIG. 6(2)). The liquid crystal panel in the on state thus transmits light to provide white display.

Embodiment 2

Embodiment 2 has the same configuration as Embodiment 1 except that in the no-voltage-applied state, where no voltage is applied between the first electrode and the second electrode, the major axis of the elliptical portion in a plan view is perpendicular to the alignment azimuth of the liquid crystal molecules.

Figure 46:
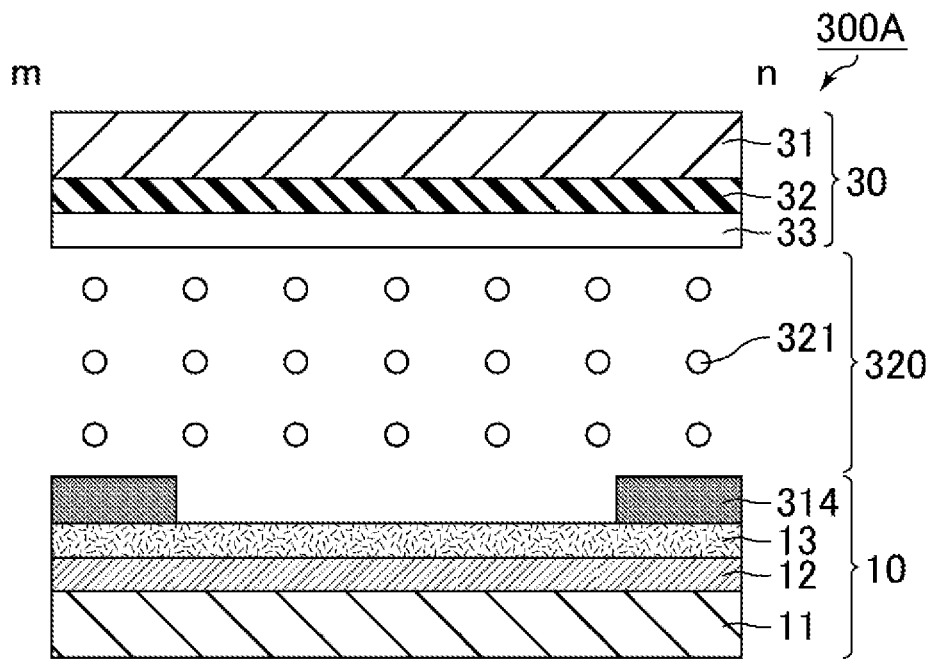
FIG. 46 is a schematic cross-sectional view of a liquid crystal display device of Embodiment 2 in the off state.
Figure 47:
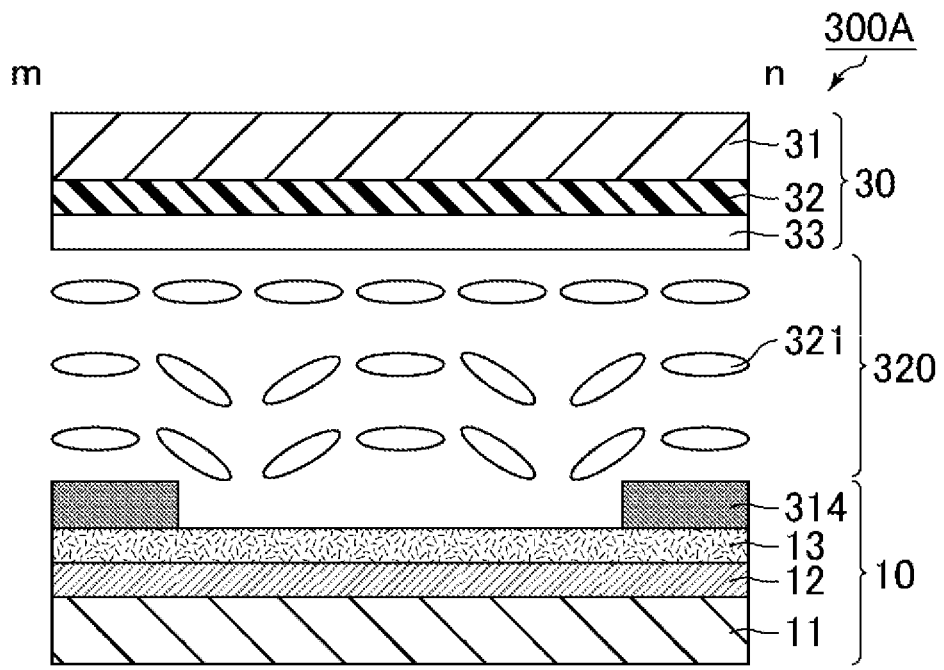
FIG. 47 is a schematic cross-sectional view of the liquid crystal display device of Embodiment 2 in the on state.
Figure 48:
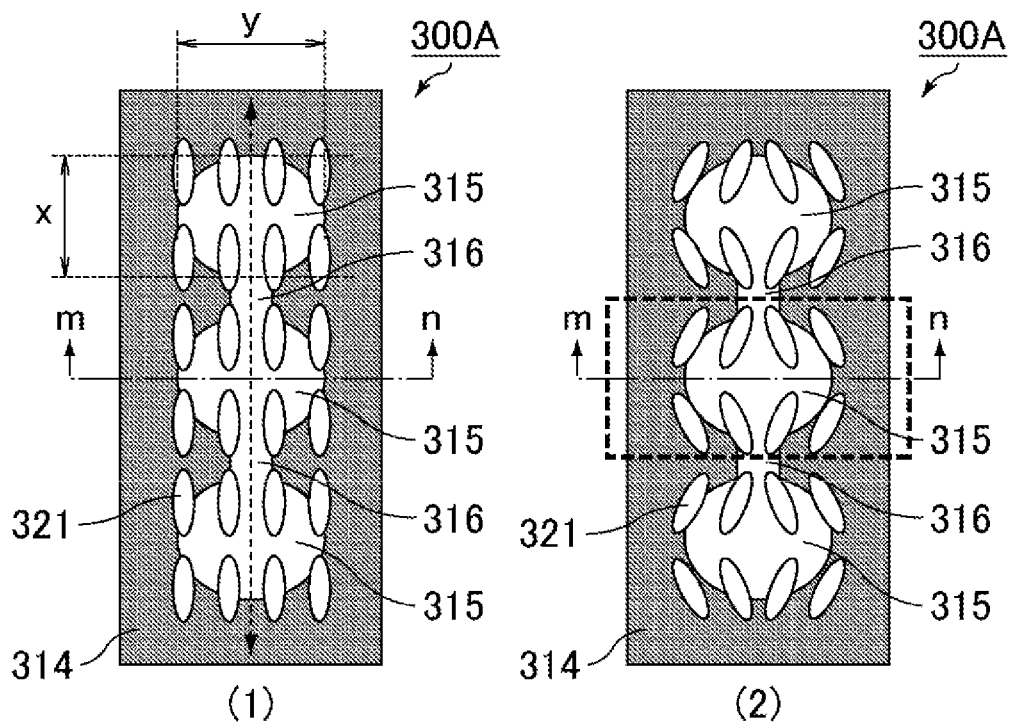
FIG. 48 schematically illustrates the control of the alignment of liquid crystal molecules in the liquid crystal display device of Embodiment 2.

With reference to FIGS. 46 to 48, a liquid crystal display device of Embodiment 2 will be described below. FIG. 46 is a schematic cross-sectional view of the liquid crystal display device of Embodiment 2 in the off state. FIG. 47 is a schematic cross-sectional view of the liquid crystal display device of Embodiment 2 in the on state. FIG. 48 schematically illustrates the control of the alignment of liquid crystal molecules in the liquid crystal display device of Embodiment 2. FIG. 48(1) shows the off state and FIG. 48(2) shows the on state. FIG. 46 and FIG. 47 each show a cross section taken along the line m-n in FIG. 48. The dotted line in FIG. 48(1) indicates the initial alignment azimuth of the liquid crystal molecules in the no-voltage-applied state.

As shown in FIG. 46, a liquid crystal display device 300A of Embodiment 2 includes the first substrate 10, a liquid crystal layer 320 containing liquid crystal molecules 321, and the second substrate 30, in the given order. The first substrate 10 is a TFT array substrate and has a stacked structure including, in order toward the liquid crystal layer 320, a first polarizer (not shown), the insulating substrate (e.g., glass substrate) 11, the pixel electrode (first electrode) 12, the insulating layer (insulating film) 13, and a counter electrode (second electrode) 314. The second substrate 30 is a color filter substrate and has a stacked structure including, in order toward the liquid crystal layer 320, a second polarizer (not shown), the insulating substrate (e.g., glass substrate) 31, the color filter 32, and the overcoat layer 33. The first polarizer and the second polarizer are both absorptive polarizers and disposed in the crossed Nicols with their absorption axes perpendicular to each other. The alignment mode of the liquid crystal display device 300A is a fringe field switching (FFS) mode.

Although not shown in FIG. 46, a horizontal alignment film is typically disposed on the liquid crystal layer 320 side surface of the first substrate 10 and/or the second substrate 30. The horizontal alignment film preferably has been subjected to alignment treatment such as photo-alignment treatment or rubbing treatment. The horizontal alignment film may be made of an inorganic material or an organic material. The pre-tilt angle (angle of tilt in the off state) of the liquid crystal molecules 321 is preferably smaller than 3°, more preferably smaller than 1° relative to the surface of the first substrate 10.

In the stacked structure shown in FIG. 46, an opening having a shape including an elliptical portion 315 and/or a circular portion 315A is formed in the counter electrode 314. The opening is preferably formed per display unit, and preferably formed in all the display units.

As in Embodiment 1, the opening in the counter electrode 314 may have any shape as long as it includes an elliptical portion 315 and/or a circular portion 315A. Examples of the shape include a shape including only one elliptical portion 315, a shape including only one circular portion 315A, a shape including a plurality of elliptical portions 315, a shape including a plurality of circular portions 315A, and a shape including both one or more elliptical portions 315 and one or more circular portions 315A. When the total number of the elliptical portions 315 and the circular portions 315A is 2 or greater, the portions may be connected to each other via linear portion(s) 316, or may be formed independently. One counter electrode 314 may have one or more openings. The elliptical portion 315 preferably has an elliptical shape, but from the standpoint of the effects of the present invention, it may have a shape (substantially elliptical shape) that can be equated with an elliptical shape. For example, the elliptical portion 315 may have an elliptical shape that has partial irregularities, a shape similar to an elliptical shape such as an egg shape, or a polygonal shape that substantially can be equated with an elliptical shape. Similarly, the circular portion 315A preferably has a perfectly circular shape, but from the standpoint of the effects of the present invention, it may have a shape (substantially circular shape) that can be equated with a circular shape. For example, the circular portion 315 may have a shape similar to a circular shape, such as a circular shape that has partial irregularities, or a polygonal shape that can be substantially equated with a circular shape.

Figure 49:
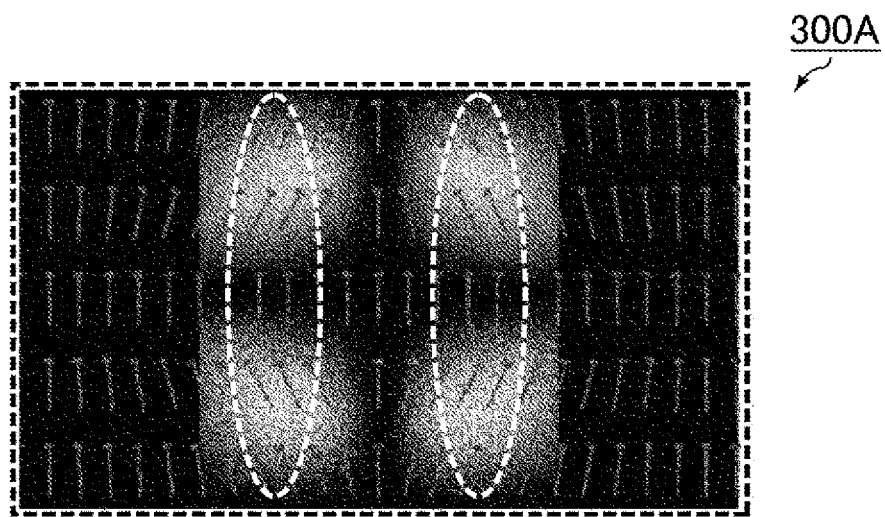
FIG. 49 is an enlarged plan view showing the simulation results of the distribution of liquid crystal molecule alignments in the region surrounded by the dotted line in FIG. 48(2).

For example, the opening in the counter electrode 314 may have a shape including a plurality of elliptical portions 315 and/or a plurality of circular portions 315A and linear portion(s) 316, and the linear portions(s) 316 may connect the elliptical portions 315 and/or the circular portions 315A to each other. In a specific example of the shape of the opening in the counter electrode 314, as shown in FIG. 48, three elliptical portions 315 are arranged in line in one display unit and the elliptical portions 315 are connected to each other via the linear portion(s) 316. As shown in FIG. 49 (described later), in the voltage-applied state, the alignment region of the liquid crystal molecules in each of the elliptical portions 315 or the circular portions 315A is divided into four domains. Connecting the elliptical portions 315 and/or the circular portions 315A to each other via the linear portion(s) 316 stabilizes the alignment of the liquid crystal molecules 321 in the voltage-applied state. As a result, the four domains of each of the elliptical portions 315 or the circular portions 315A have an approximately equal area, leading to a higher transmittance.

In Embodiment 2, in a plan view, the major axis of the elliptical portion 315 is perpendicular to the alignment azimuth of the liquid crystal molecules 321 in the no-voltage-applied state (off state). Preferably, in a plan view, a distortion ratio represented by Formula (2) below is 1 or smaller:

$$\text{Distortion ratio} = x/y \qquad (2)$$

where x is the length of the elliptical portion 315 and/or the circular portion 315A at the alignment azimuth of the liquid crystal molecules 321 in the no-voltage-applied state, and y is the length of the elliptical portion 315 and/or the circular portion 315A at the azimuth perpendicular to the alignment azimuth of the liquid crystal molecules 321 in the no-voltage-applied state. A distortion ratio of greater than 1 leads to a wide disclination region (unstable alignment region) in the center of the elliptical portion 315 and/or the circular portion 315A, which may decrease the transmittance. The lower limit of the distortion ratio is preferably 0.4. Preferably, the major axis of the elliptical portion 315 is parallel to the short direction of the display unit, and the alignment azimuth of the liquid crystal molecules 321 in the no-voltage-applied state is preferably perpendicular to the short direction of the display unit. The "perpendicular" herein includes not only being completely perpendicular, but also a range (substantially perpendicular) that can be equated with being perpendicular in the art.

In Embodiment 2, the liquid crystal molecules 321 may have negative anisotropy of dielectric constant or positive anisotropy of dielectric constant. The liquid crystal molecules having negative anisotropy of dielectric constant react only in the horizontal direction under the influence of the fringe electric field, so that they are likely to remain parallel to the first substrate in the pulling of the electric field. In other words, the alignment distortion of the liquid crystal molecules is larger in the horizontal direction, which results in a high response speed. Accordingly, from the standpoint of improving the response speed, liquid crystal materials containing liquid crystal molecules 321 having negative anisotropy of dielectric constant are advantageous.

In a plan view, the alignment azimuth of the liquid crystal molecules 321 in the no-voltage-applied state (off state) is parallel to the absorption axis of one of the first polarizer and the second polarizer, and perpendicular to the absorption axis of the other. The control mode of the liquid crystal display device 300A is thus what is called a normally black mode, which provides black display when the liquid crystal layer 320 is in the no-voltage-applied state (off state).

The operation of the liquid crystal display device 300A will be described hereinbelow.

FIG. 46 shows the no-voltage-applied state (off state), where no voltage is applied between the pixel electrode 12 and the counter electrode 314. In the liquid crystal layer 320 in the off state, no electric field is generated and the liquid crystal molecules 321 are aligned parallel to the first substrate 10 as shown in FIG. 46. Since the alignment azimuth of the liquid crystal molecules 321 is parallel to the absorption axis of one of the first polarizer and the second polarizer and the first polarizer and the second polarizer are disposed in the crossed Nicols, the liquid crystal panel in the off state does not transmit light and provides black display.

As shown in FIG. 48(1), the alignment azimuth of the liquid crystal molecules 321 in the off state in a plan view may be perpendicular to the major axis of each elliptical portion 315 of the opening in the counter electrode 314. As shown in FIG. 48(1), the alignment azimuth of the liquid crystal molecules 321 in the off state in a plan view may be perpendicular to the short direction of the display unit.

FIG. 47 shows the voltage-applied state (on state), where a voltage is applied between the pixel electrode 12 and the counter electrode 314. In the liquid crystal layer 320 in the on state, an electric field according to the level of the voltage between the pixel electrode 12 and the counter electrode 314 is generated. Specifically, since the opening is formed in the counter electrode 314 positioned closer to the liquid crystal layer 320 than the pixel electrode 12 is, a fringe electric field is generated around the opening. The liquid crystal molecules 321 rotate under the effect of the electric field and change their alignment azimuth from the alignment azimuth in the off state (see FIG. 48(1)) to the alignment azimuths in the on state (see FIG. 48(2)). The liquid crystal panel in the on state thus transmits light to provide white display.

Each and every detail described for the above embodiments of the present invention shall be applied to all the aspects of the present invention.

The present invention is described below in more detail based on examples and comparative examples. The examples, however, are not intended to limit the scope of the present invention.

Example 1

A liquid crystal display device of Example 1 is a specific example of the liquid crystal display device 100A of Embodiment 1 and has the following configuration.

In each opening in the counter electrode 14, a is set to 5 μm, b is set to 7 μm, and a distortion ratio is set to 0.714, where a is the length of the elliptical portion 15 at the azimuth perpendicular to the alignment azimuth of liquid crystal molecules 21 in the no-voltage-applied state, b is the length of the elliptical portion 15 at the alignment azimuth of the liquid crystal molecules 21 in the no-voltage-applied state, and the distortion ratio is a/b. In the liquid crystal layer 20, the refractive index anisotropy (Δn) is set to 0.12, the in-plane retardation (Re) is set to 360 nm, and the viscosity is set to 80 cps. The anisotropy of dielectric constant (Δε) of the liquid crystal molecules 21 is set to 7 (positive type).

Figure 8:
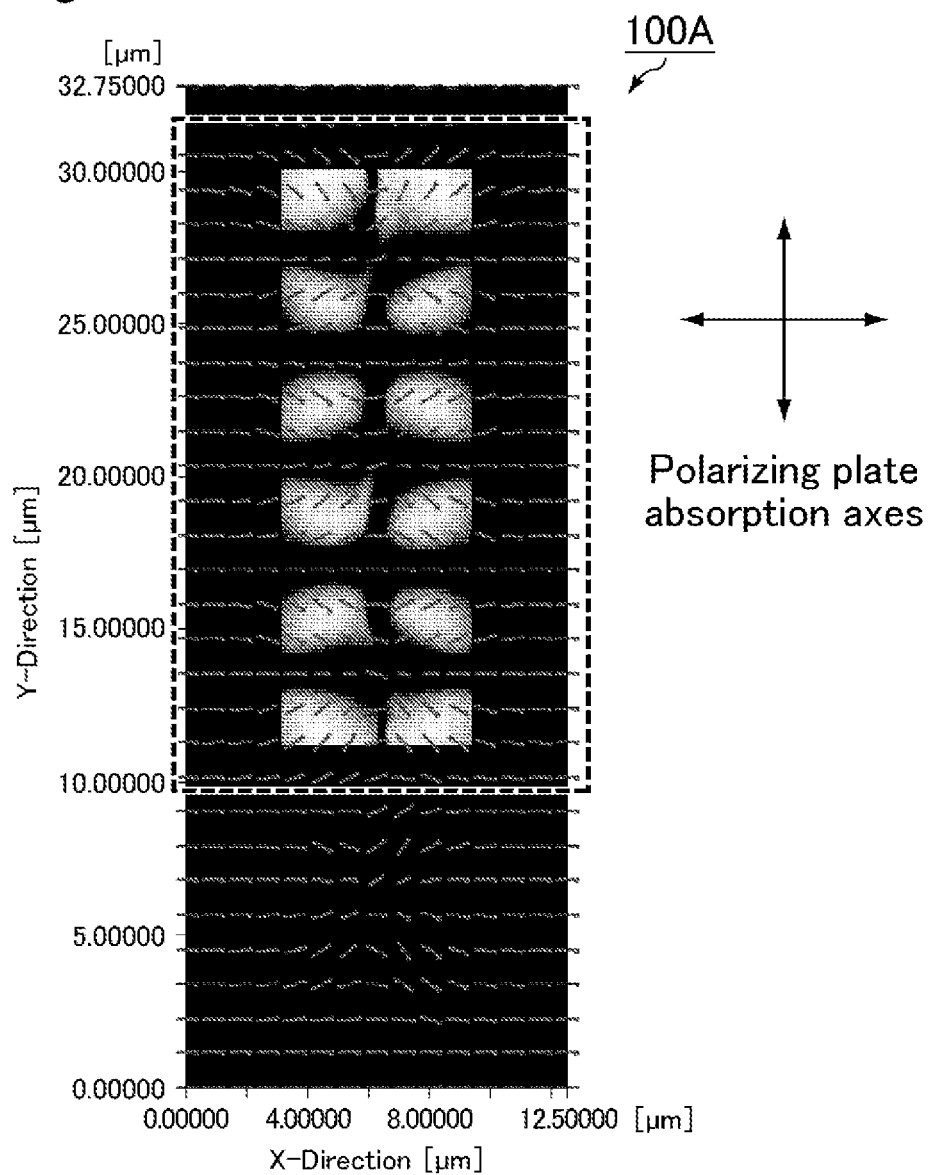
FIG. 8 is a plan view showing the simulation results of the distribution of liquid crystal molecule alignments in a display unit of Example 1 in the on state.

With reference to FIGS. 7 and 8, the distribution of liquid crystal molecule alignments in the liquid crystal display device of Example 1 in the on state (6 V application) will be described. FIG. 7 is an enlarged plan view showing the simulation results of the distribution of liquid crystal molecule alignments in the region surrounded by the dotted line in FIG. 6(2). FIG. 8 is a plan view showing the simulation results of the distribution of liquid crystal molecule alignments in a display unit of Example 1 in the on state. In the display unit in Example 1, when a voltage is applied between the pixel electrode 12 and the counter electrode 14, the liquid crystal molecules quickly rotate to form four domains around the center of each elliptical portion 15. In FIG. 7, the liquid crystal molecules in the two regions surrounded by ellipses are bend-aligned. The liquid crystal molecules on the right side and those on the left side in each region are aligned in opposite directions. The alignment region of the liquid crystal molecules in one elliptical portion 15 is thus divided into four domains. When the voltage between the pixel electrode 12 and the counter electrode 14 is removed, the distortion force derived from the bend alignment formed in the narrow regions allows a high-speed response of the liquid crystal molecules. In addition, the electric field at the periphery of each elliptical portion 15 acts to prevent excessive rotation of the liquid crystal molecules, so that the reduction in transmittance is suppressed as compared to cases where the opening is rhombic.

Example 2

Figure 9:
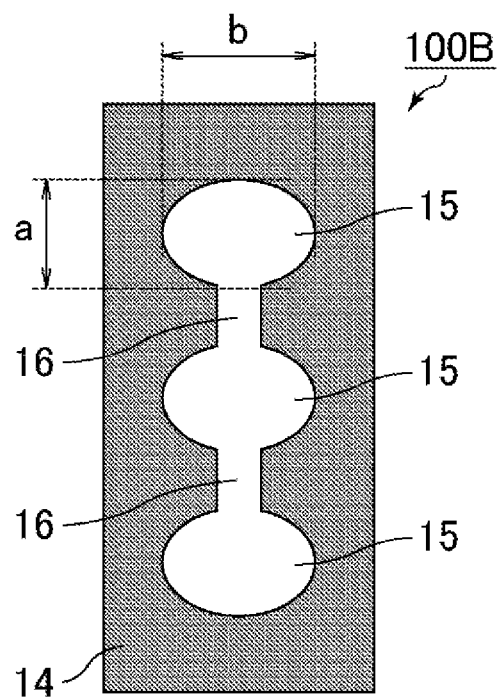
FIG. 9 is a schematic plan view of a counter electrode in a liquid crystal display device of Example 2.
Figure 10:
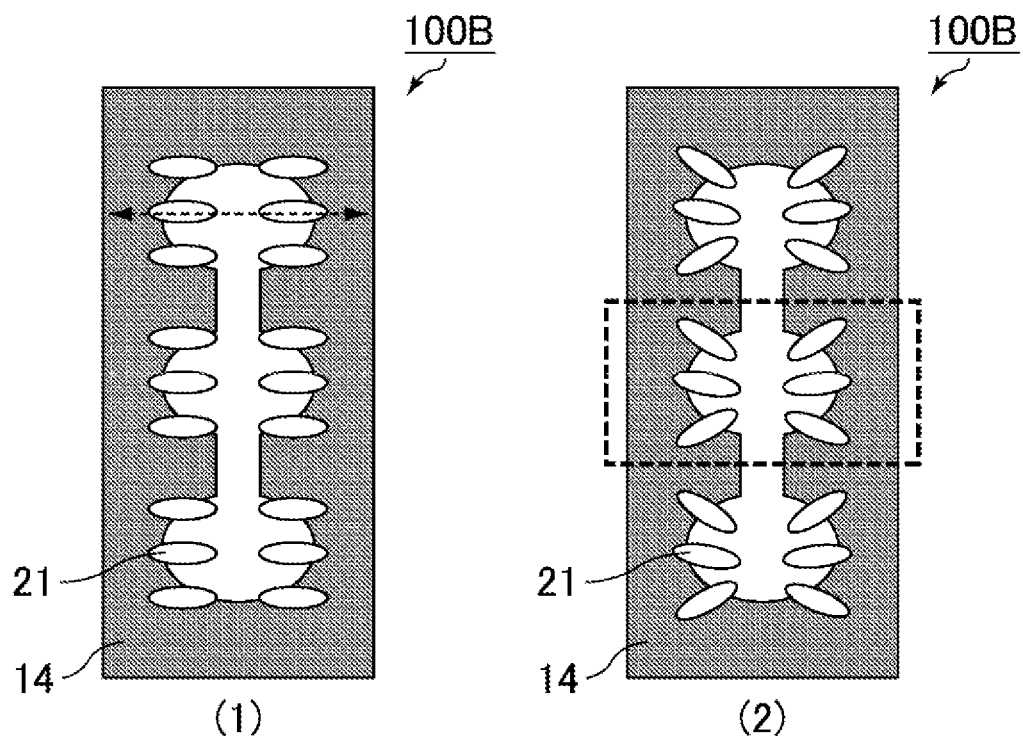
FIG. 10 schematically illustrates the control of the alignment of liquid crystal molecules in the liquid crystal display device of Example 2.
Figure 11:
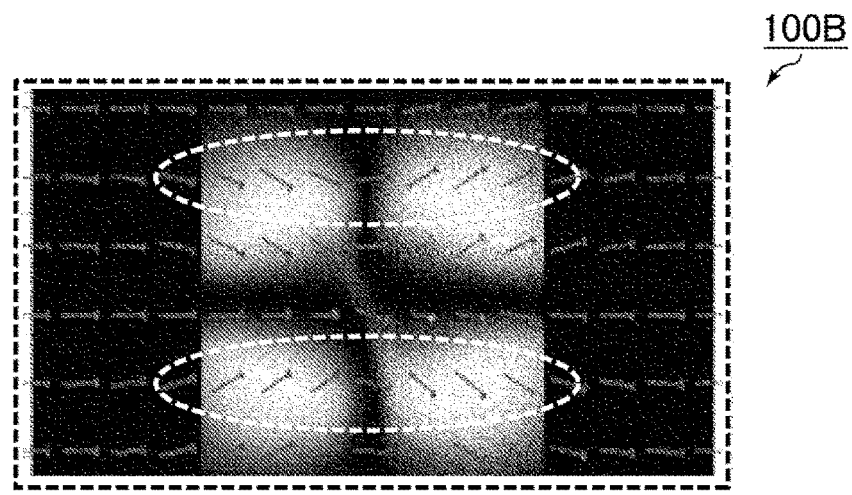
FIG. 11 is an enlarged plan view showing the simulation results of the distribution of liquid crystal molecule alignments in the region surrounded by the dotted line in FIG. 10(2).
Figure 12:
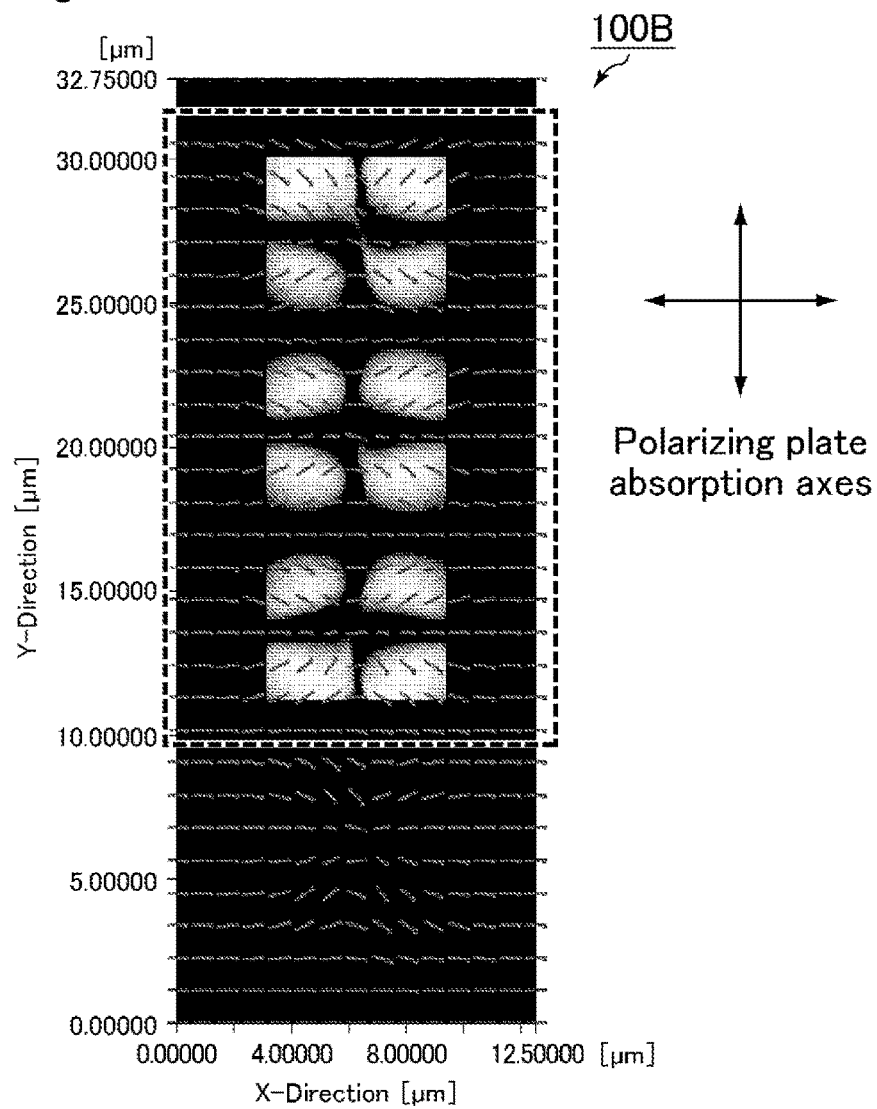
FIG. 12 is a plan view showing the simulation results of the distribution of liquid crystal molecule alignments in a display unit of Example 2 in the on state.

A liquid crystal display device of Example 2 has the same configuration as the liquid crystal display device of Example 1 except that the shape (distortion ratio) of each opening in the counter electrode 14 is changed. With reference to FIGS. 9 to 12, the liquid crystal display device of Example 2 will be described below. FIG. 9 is a schematic plan view of a counter electrode in the liquid crystal display device of Example 2. FIG. 10 schematically illustrates the control of the alignment of liquid crystal molecules in the liquid crystal display device of Example 2. FIG. 10(1) shows the off state and FIG. 10(2) shows the on state. FIG. 11 is an enlarged plan view showing the simulation results of the distribution of liquid crystal molecule alignments in the region surrounded by the dotted line in FIG. 10(2). FIG. 12 is a plan view showing the simulation results of the distribution of liquid crystal molecule alignments in a display unit of Example 2 in the on state.

In a liquid crystal display device 100B of Example 2 shown in FIG. 9, as in the liquid crystal display device 100A of Example 1, an opening is formed in the counter electrode 14 in such a shape that three elliptical portions 15 are arranged in line in one display unit and the elliptical portions 15 are connected to each other via linear portions 16. Here, the liquid crystal display panel is different from that of Example 1 in that a is set to 4 μm, b is set to 7 μm, and the distortion ratio is 0.571. As shown in FIG. 10, the major axis of each elliptical portion 15 is parallel to the alignment azimuth of the liquid crystal molecules 21 in the off state, as in Example 1.

As with the liquid crystal display device 100A of Example 1, the liquid crystal display device 100B of Example 2 in the on state can generate a fringe electric field in the liquid crystal layer 20 using the openings in the counter electrode 14. Here, the distortion ratio in Example 2 is smaller than that in Example 1, so that, as shown in FIG. 11 and FIG. 12, the twist (rate of change of the alignment azimuth) of the liquid crystal molecules around the elliptical portions 15 is large. Thus, although the transmittance is lower than that in Example 1, the response speed can be improved.

Example 3

Figure 13:
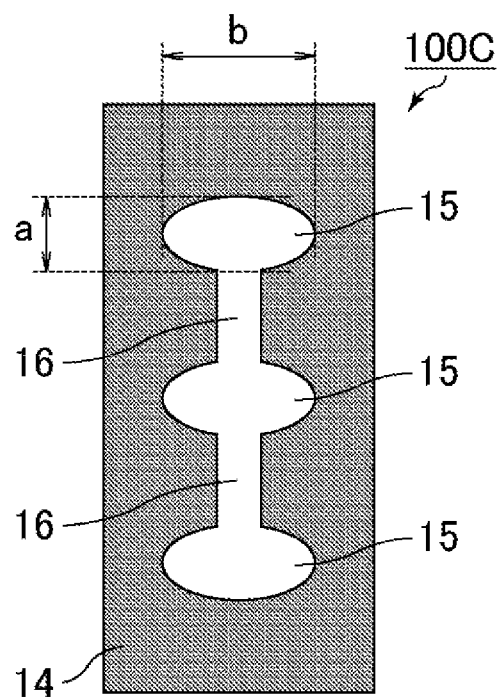
FIG. 13 is a schematic plan view of a counter electrode in a liquid crystal display device of Example 3.
Figure 14:
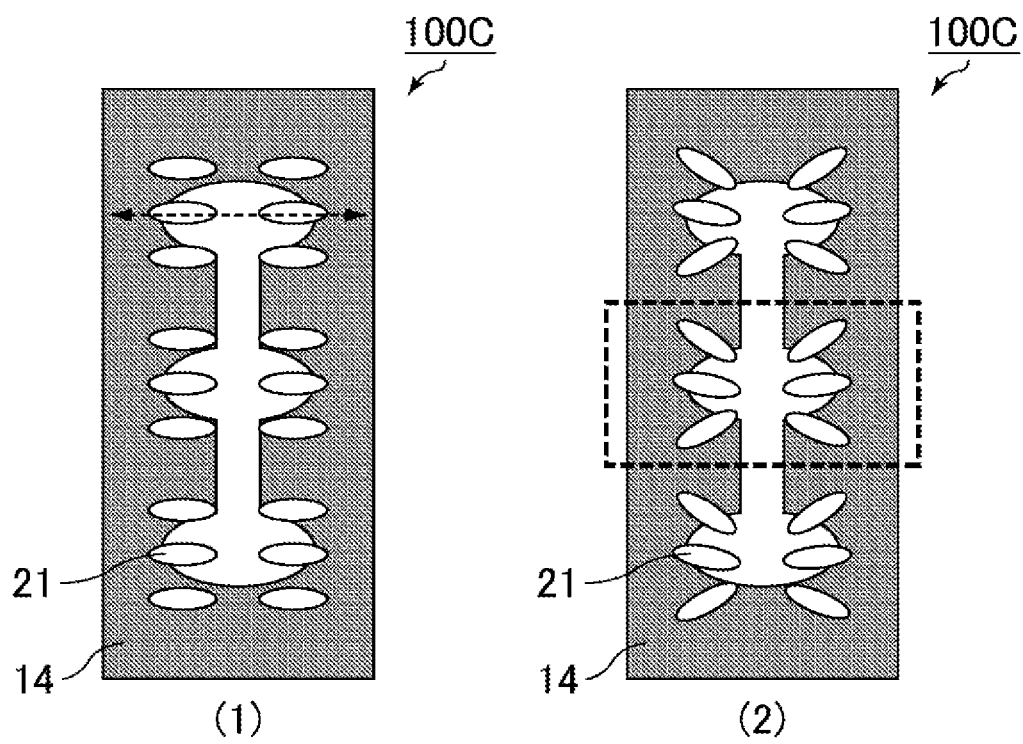
FIG. 14 schematically illustrates the control of the alignment of liquid crystal molecules in the liquid crystal display device of Example 3.
Figure 15:
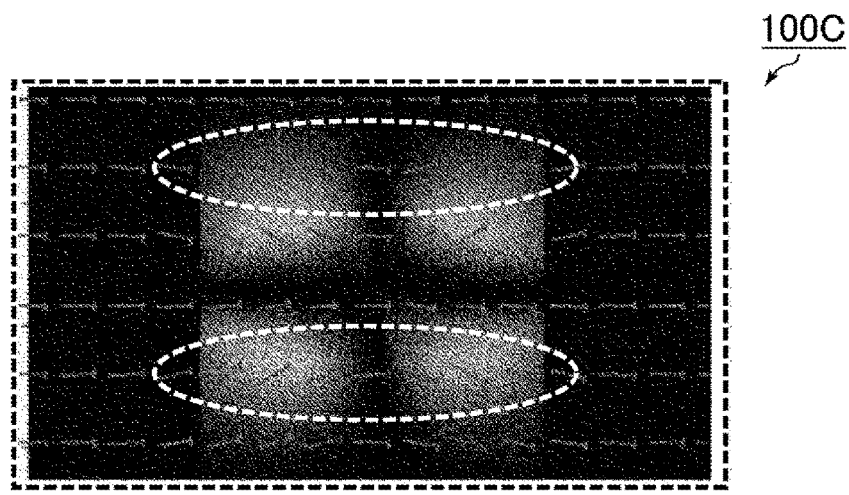
FIG. 15 is an enlarged plan view showing the simulation results of the distribution of liquid crystal molecule alignments in the region surrounded by the dotted line in FIG. 14(2).
Figure 16:
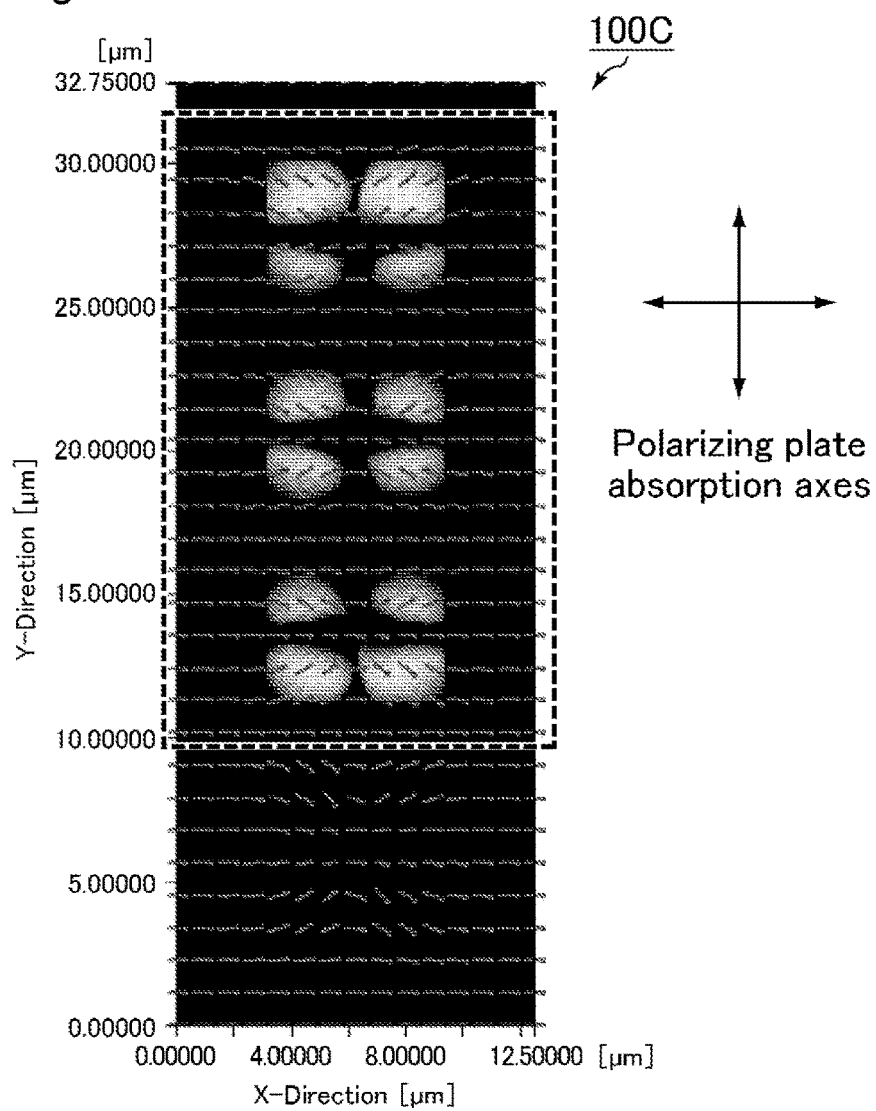
FIG. 16 is a plan view showing the simulation results of the distribution of liquid crystal molecule alignments in a display unit of Example 3 in the on state.

A liquid crystal display device of Example 3 has the same configuration as the liquid crystal display device of Example 1 except that the shape (distortion ratio) of each opening in the counter electrode 14 is changed. With reference to FIGS. 13 to 16, the liquid crystal display device of Example 3 will be described below. FIG. 13 is a schematic plan view of a counter electrode in the liquid crystal display device of Example 3. FIG. 14 schematically illustrates the control of the alignment of liquid crystal molecules in the liquid crystal display device of Example 3. FIG. 14(1) shows the off state and FIG. 14(2) shows the on state. FIG. 15 is an enlarged plan view showing the simulation results of the distribution of liquid crystal molecule alignments in the region surrounded by the dotted line in FIG. 14(2). FIG. 16 is a plan view showing the simulation results of the distribution of liquid crystal molecule alignments in a display unit of Example 3 in the on state.

In a liquid crystal display device 100C of Example 3 shown in FIG. 13, as in the liquid crystal display device 100A of Example 1, an opening is formed in the counter electrode 14 in such a shape that three elliptical portions 15 are arranged in line in one display unit and the elliptical portions 15 are connected to each other via linear portions 16. Here, the liquid crystal display device is different from that of Example 1 in that a is set to 3 μm, b is set to 7 μm, and the distortion ratio is 0.429. As shown in FIG. 14, the major axis of each elliptical portion 15 is parallel to the alignment azimuth of the liquid crystal molecules 21 in the off state, as in Example 1.

As with the liquid crystal display device 100A of Example 1, the liquid crystal display device 100C of Example 3 in the on state can produce a fringe electric field in the liquid crystal layer 20 using the openings in the counter electrode 14. Here, the distortion ratio in Example 3 is smaller than that in Example 2, so that, as shown in FIG. 15 and FIG. 16, the twist (rate of change of the alignment azimuth) of the liquid crystal molecules around the elliptical portions 15 is large. Thus, although the transmittance is lower than that in Example 2, the response speed can be improved.

Example 4

Figure 17:
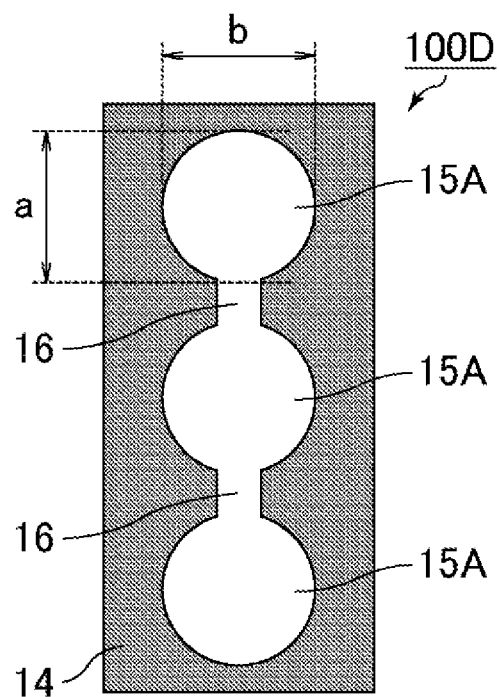
FIG. 17 is a schematic plan view of a counter electrode in a liquid crystal display device of Example 4.
Figure 18:
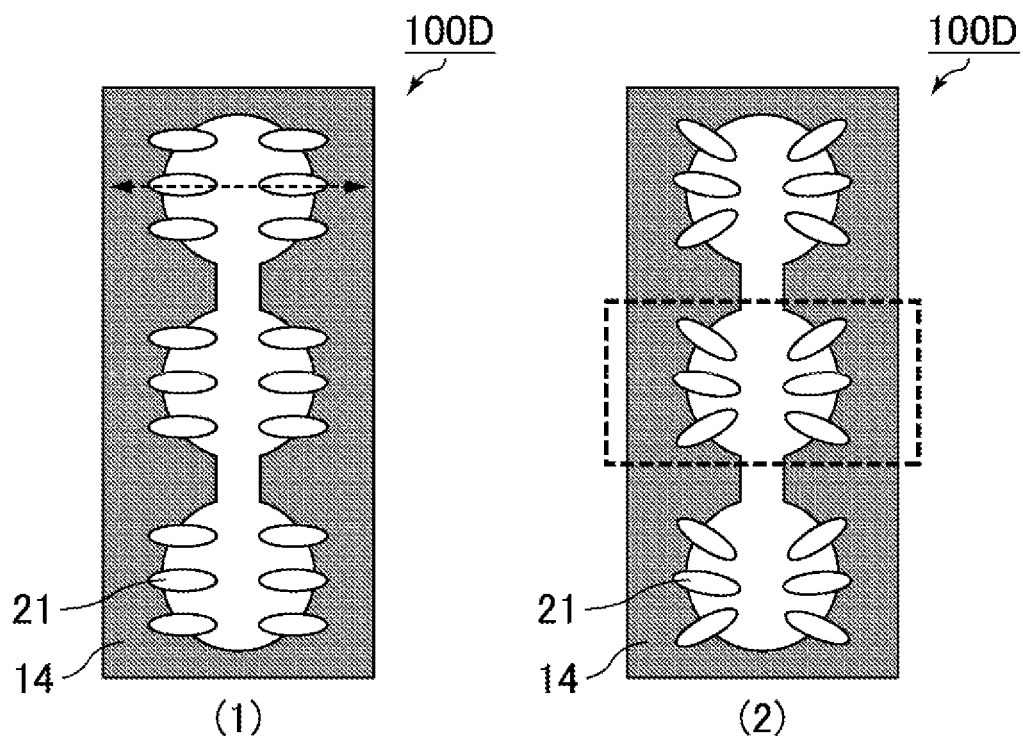
FIG. 18 schematically illustrates the control of the alignment of liquid crystal molecules in the liquid crystal display device of Example 4.
Figure 19:
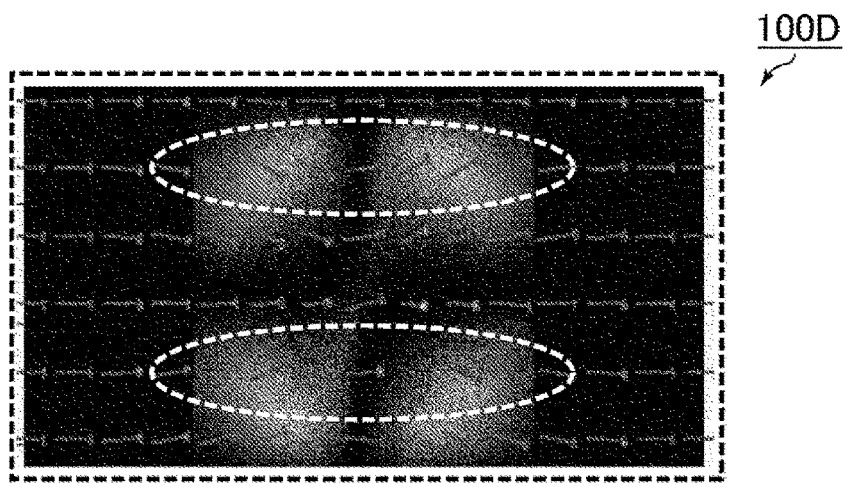
FIG. 19 is an enlarged plan view showing the simulation results of the distribution of liquid crystal molecule alignments in the region surrounded by the dotted line in FIG. 18(2).
Figure 20:
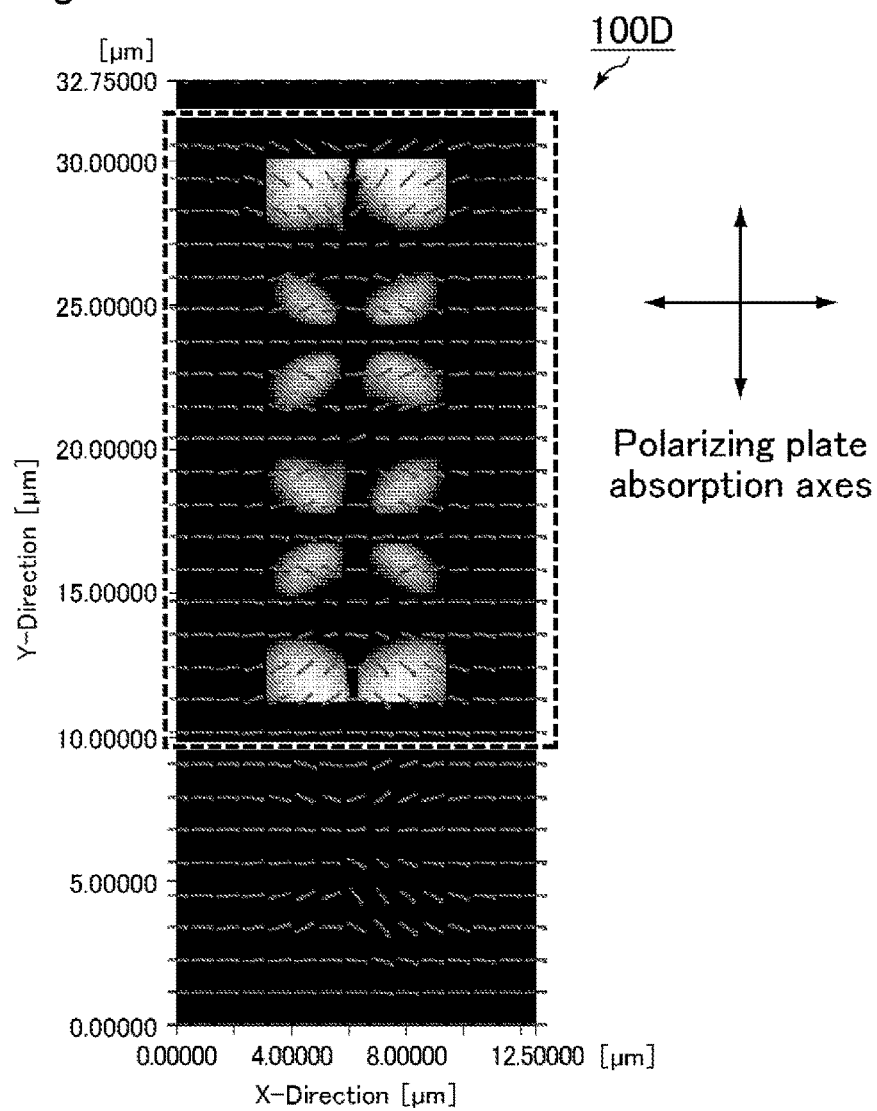
FIG. 20 is a plan view showing the simulation results of the distribution of liquid crystal molecule alignments in a display unit of Example 4 in the on state.

A liquid crystal display device of Example 4 has the same configuration as the liquid crystal display device of Example 1 except that the shape (distortion ratio) of each opening in the counter electrode 14 is changed. With reference to FIGS. 17 to 20, the liquid crystal display device of Example 4 will be described below. FIG. 17 is a schematic plan view of a counter electrode in the liquid crystal display device of Example 4. FIG. 18 schematically illustrates the control of the alignment of liquid crystal molecules in the liquid crystal display device of Example 4. FIG. 18(1) shows the off state and FIG. 18(2) shows the on state. FIG. 19 is an enlarged plan view showing the simulation results of the distribution of liquid crystal molecule alignments in the region surrounded by the dotted line in FIG. 18(2). FIG. 20 is a plan view showing the simulation results of the distribution of liquid crystal molecule alignments in a display unit of Example 4 in the on state.

In a liquid crystal display device 100D of Example 4 shown in FIG. 17, an opening is formed in the counter electrode 14 in such a shape that three circular portions 15A are arranged in line in one display unit and the circular portions 15A are connected to each other via linear portions 16. In each circular portion 15A, in a plan view, a and b are both set to 6 μm and the distortion ratio is 1, where a is the length of the circular portion 15A at the azimuth perpendicular to the alignment azimuth of the liquid crystal molecules 21 in the no-voltage-applied state, and b is the length of the circular portion 15A at the alignment azimuth of the liquid crystal molecules 21 in the no-voltage-applied state.

As with the liquid crystal display device 100A of Example 1, the liquid crystal display device 100D of Example 4 in the on state can generate a fringe electric field in the liquid crystal layer 20 using the openings in the counter electrode 14. Thus, the formation of the circular portions 15A instead of the elliptical portions 15 also can improve the response speed. Here, in Example 4, as shown in FIG. 19 and FIG. 20, the distance from the center to the edge of each circular portion 15A is constant. This results in a point-symmetric alignment of the liquid crystal molecules 21, disadvantageously leading to the formation of a relatively large cross-shaped disclination region in the center of each circular portion 15A. The alignment simulation results shown in FIG. 20 thus indicate that the transmittance in Example 4 is lower than that in Example 1.

Comparative Example 1

Figure 21:
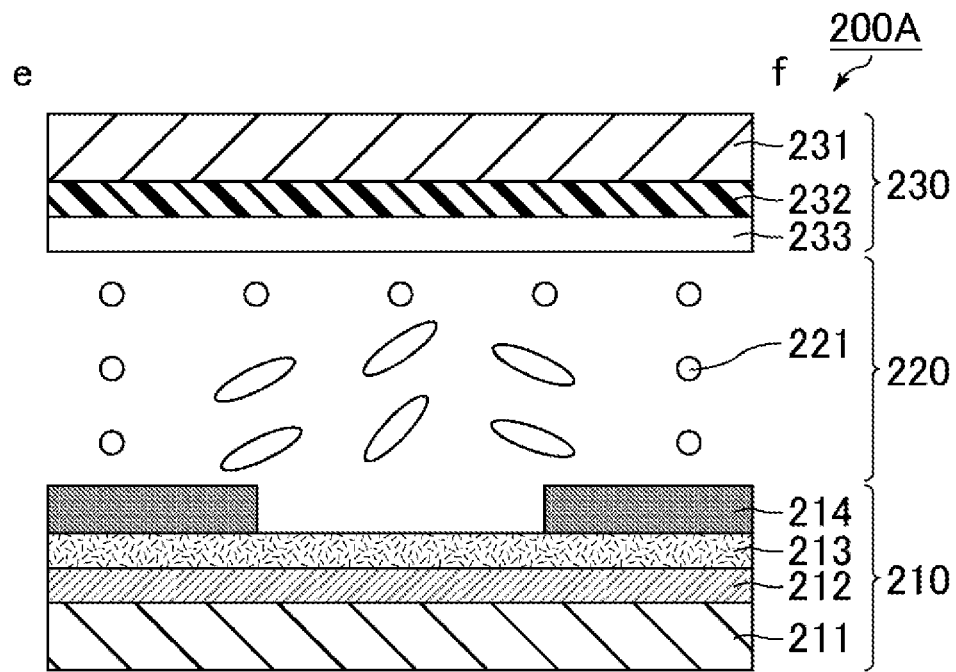
FIG. 21 is a schematic cross-sectional view of a liquid crystal display device of Comparative Example 1 in the on state.
Figure 22:
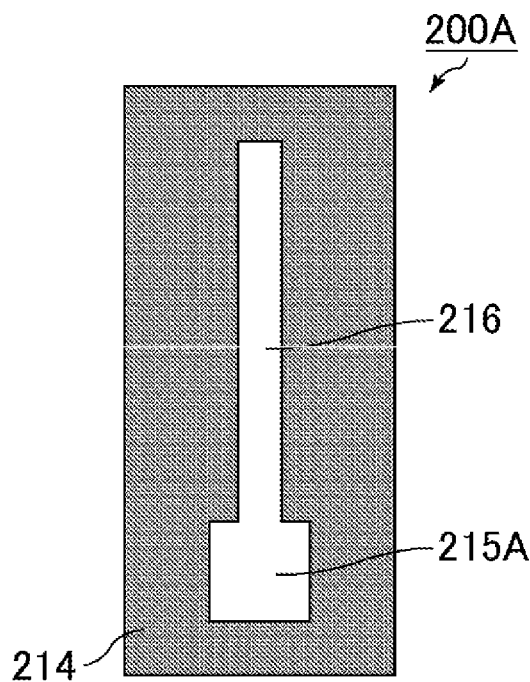
FIG. 22 is a schematic plan view of a counter electrode in the liquid crystal display device of Comparative Example 1.
Figure 23:
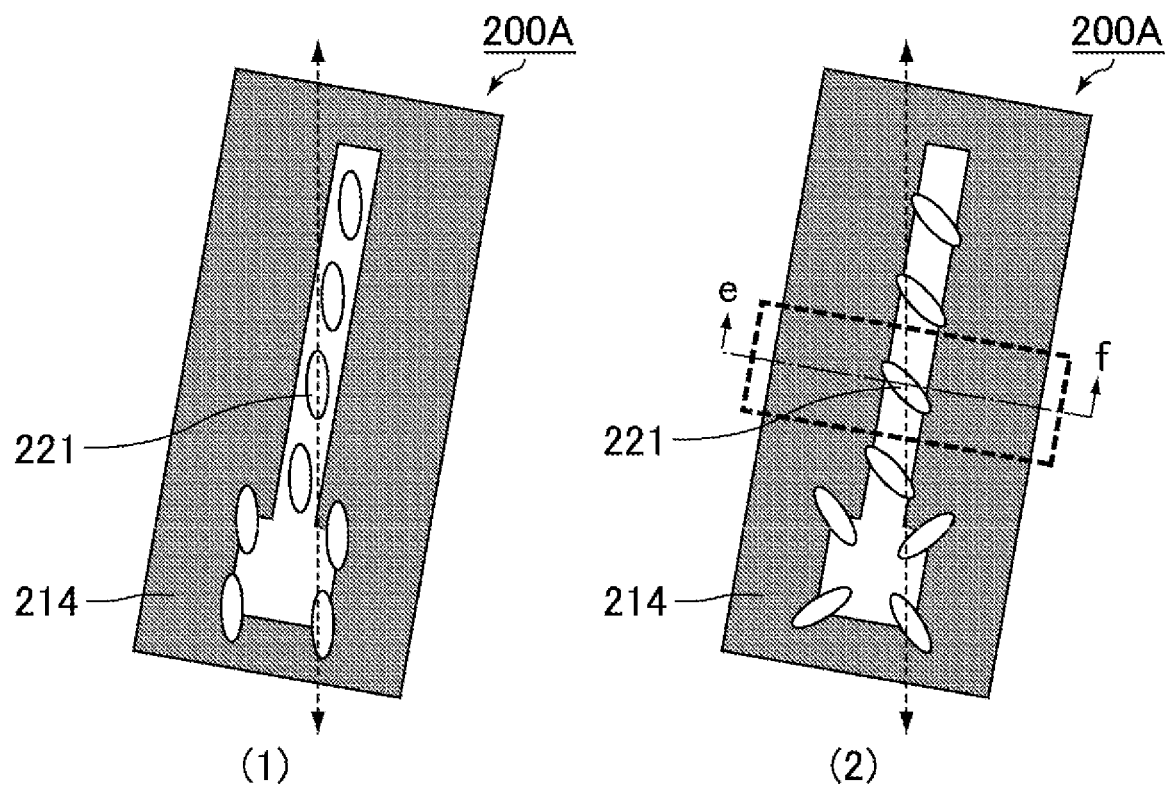
FIG. 23 schematically illustrates the control of the alignment of liquid crystal molecules in the liquid crystal display device of Comparative Example 1.
Figure 24:
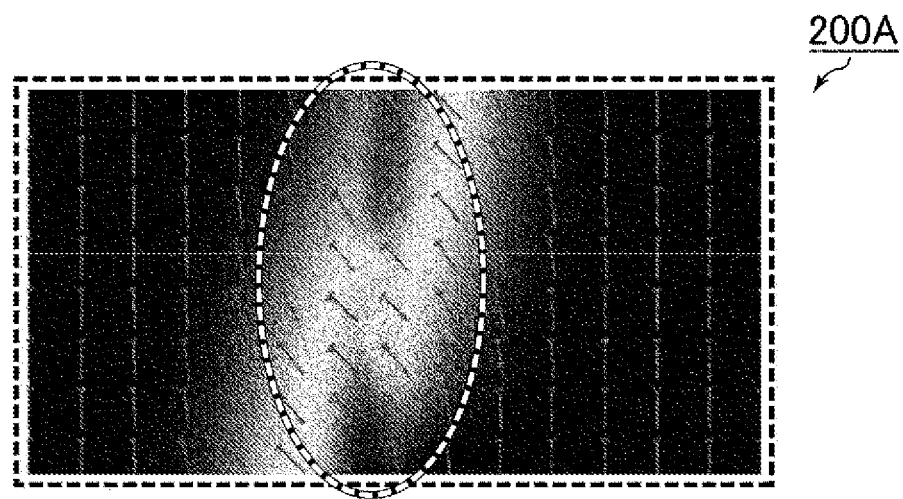
FIG. 24 is an enlarged plan view showing the simulation results of the distribution of liquid crystal molecule alignments in the region surrounded by the dotted line in FIG. 23(2).
Figure 25:
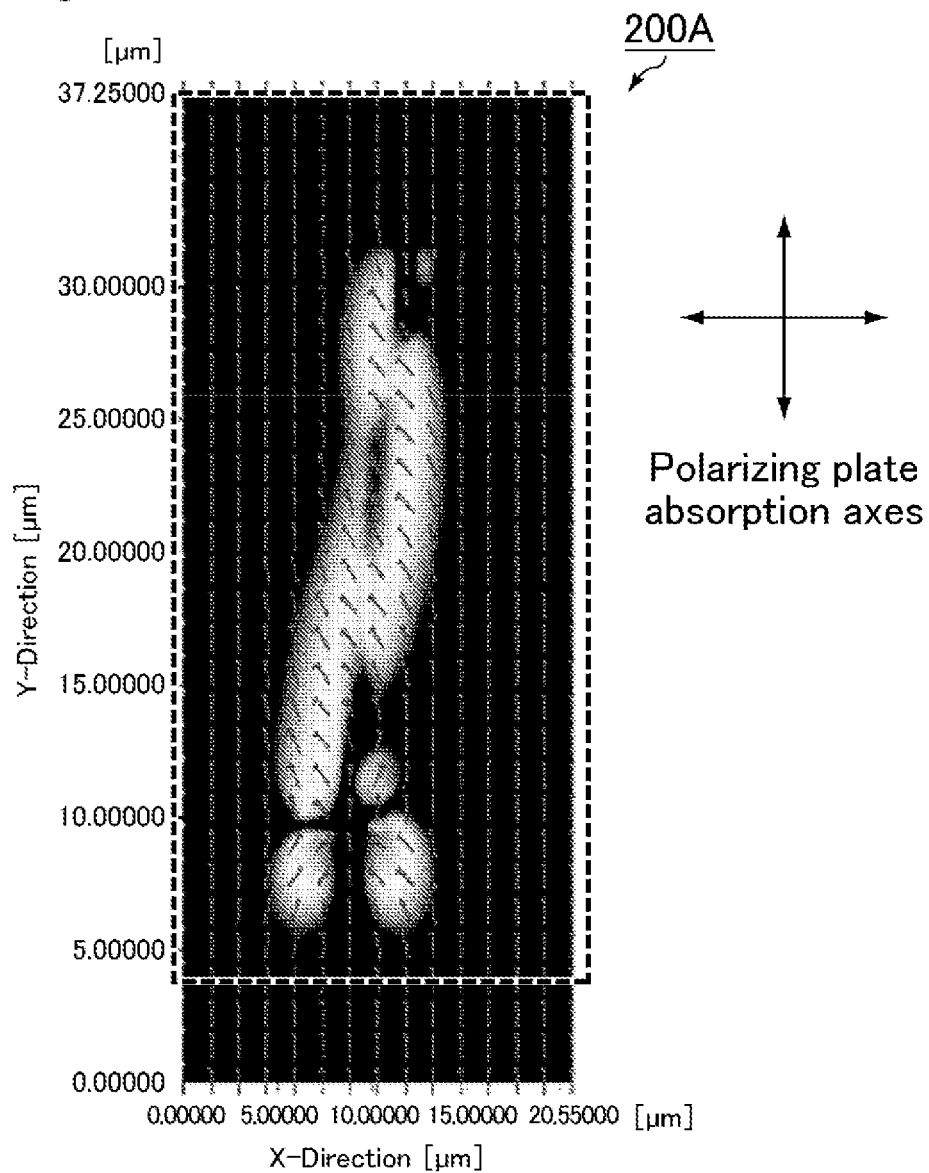
FIG. 25 is a plan view showing the simulation results of the distribution of liquid crystal molecule alignments in a display unit of Comparative Example 1 in the on state.

A liquid crystal display device of Comparative Example 1 is a typical FFS mode liquid crystal display device which has improved definition. The liquid crystal display device of Comparative Example 1 has the same configuration as the liquid crystal display device of Example 1 except that the shape of each opening in the counter electrode 214 is changed. With reference to FIGS. 21 to 25, the liquid crystal display device of Comparative Example 1 will be described below. FIG. 21 is a schematic cross-sectional view of the liquid crystal display device of Comparative Example 1 in the on state. FIG. 22 is a schematic plan view of a counter electrode in the liquid crystal display device of Comparative Example 1. FIG. 23 schematically illustrates the control of the alignment of liquid crystal molecules in the liquid crystal display device of Comparative Example 1. FIG. 23(1) shows the off state and FIG. 23(2) shows the on state. FIG. 24 is an enlarged plan view showing the simulation results of the distribution of liquid crystal molecule alignments in the region surrounded by the dotted line in FIG. 23(2). FIG. 25 is a plan view showing the simulation results of the distribution of liquid crystal molecule alignments in a display unit of Comparative Example 1 in the on state. FIG. 21 shows a cross section taken along the line e-f in FIG. 23. In FIG. 23, the dotted double-pointed arrow indicates the alignment azimuth of the liquid crystal molecules 221 in the off state.

In a liquid crystal display device 200A of Comparative Example 1 shown in FIG. 21, in the on state, an electric field according to the level of the voltage between the pixel electrode 212 and the counter electrode 214 is generated in the liquid crystal layer 220. The liquid crystal molecules 221 rotate under the effect of the electric field and change their alignment azimuth from the alignment azimuth in the off state (see FIG. 23(1)) to the alignment azimuths in the on state (see FIG. 23(2)).

As shown in FIG. 22, in the liquid crystal display device 200A, an opening is formed in the counter electrode 214 in such a shape that one square portion 215A and one linear portion 216 are connected to each other. The azimuth at which the linear portion 216 extends is parallel to the longitudinal direction of the display unit. The square portion 215A is set to be 4 µm on a side. As shown in FIG. 23, the azimuth at which the linear portion 216 extends and the alignment azimuth of the liquid crystal molecules 221 in the off state form an angle of 3° to 7°.

The liquid crystal display device 200A of Comparative Example 1 in the on state can generate a fringe electric field in the liquid crystal layer 220 using the openings in the counter electrode 214. In the region surrounded by an ellipse in FIG. 24, the liquid crystal molecules 221 rotate in one direction along the fringe electric field. Thus, as shown in FIG. 24 and FIG. 25, a high transmittance can be achieved. The response speed, however, is slow because the twist of liquid crystal molecules such as that in Example 1 is not generated.

Comparative Example 2

Figure 26:
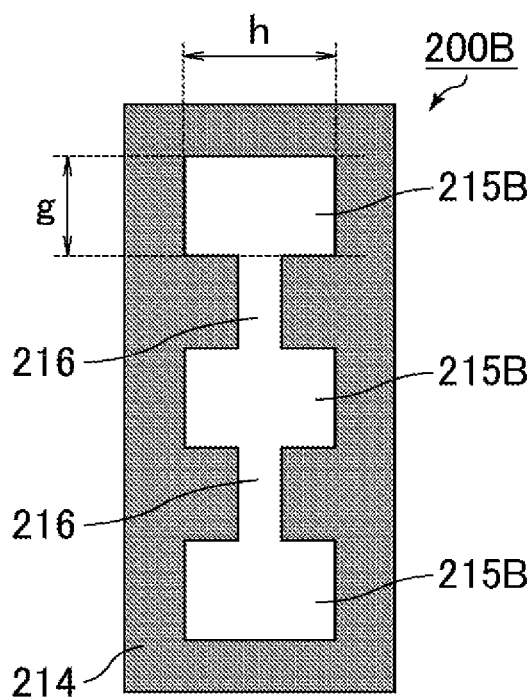
FIG. 26 is a schematic plan view of a counter electrode in a liquid crystal display device of Comparative Example 2.
Figure 27:
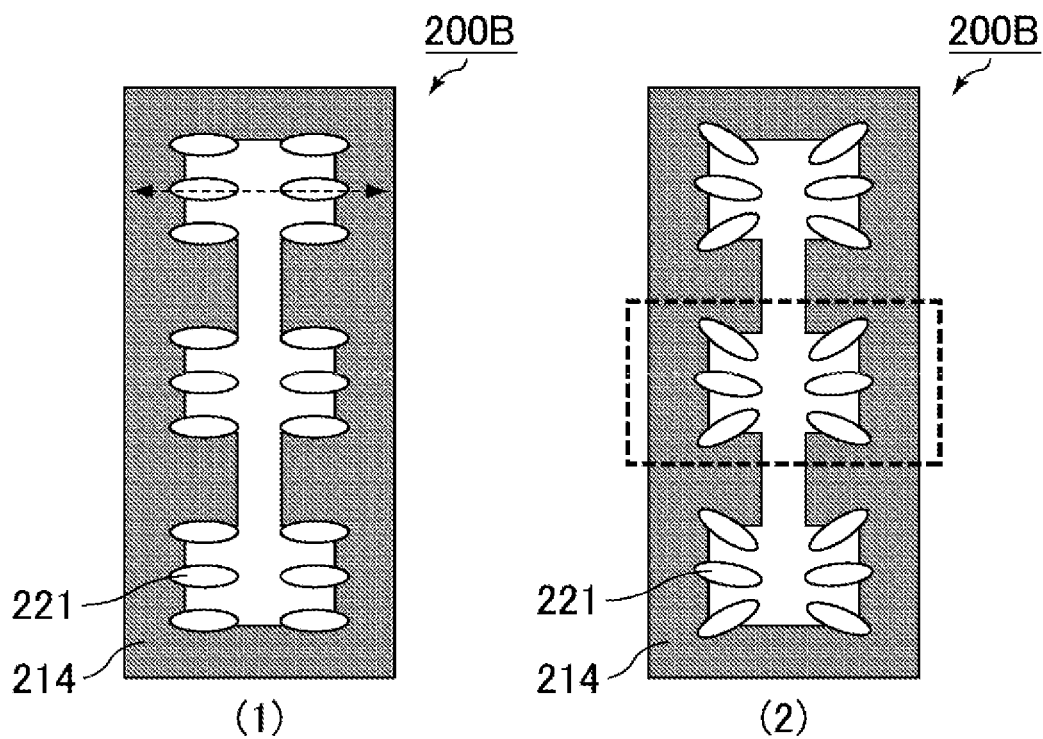
FIG. 27 schematically illustrates the control of the alignment of liquid crystal molecules in the liquid crystal display device of Comparative Example 2.
Figure 28:
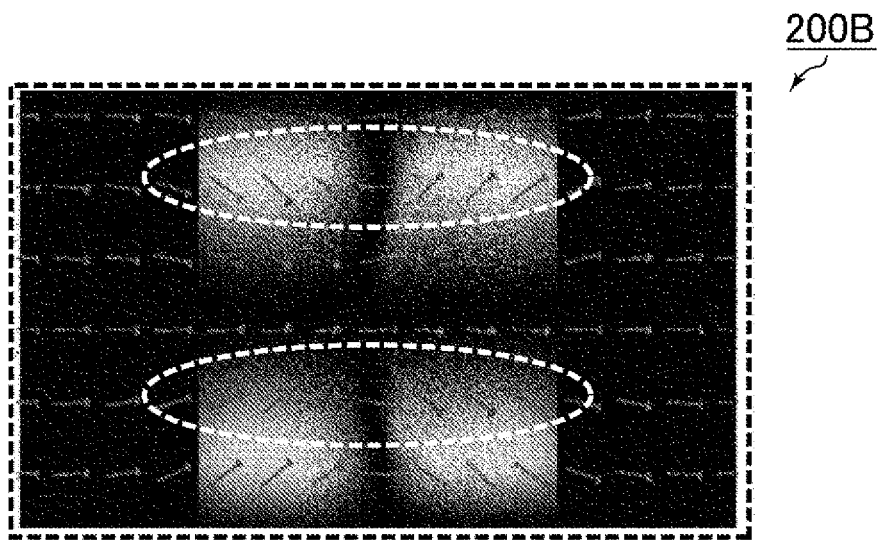
FIG. 28 is an enlarged plan view showing the simulation results of the distribution of liquid crystal molecule alignments in the region surrounded by the dotted line in FIG. 27(2).
Figure 29:
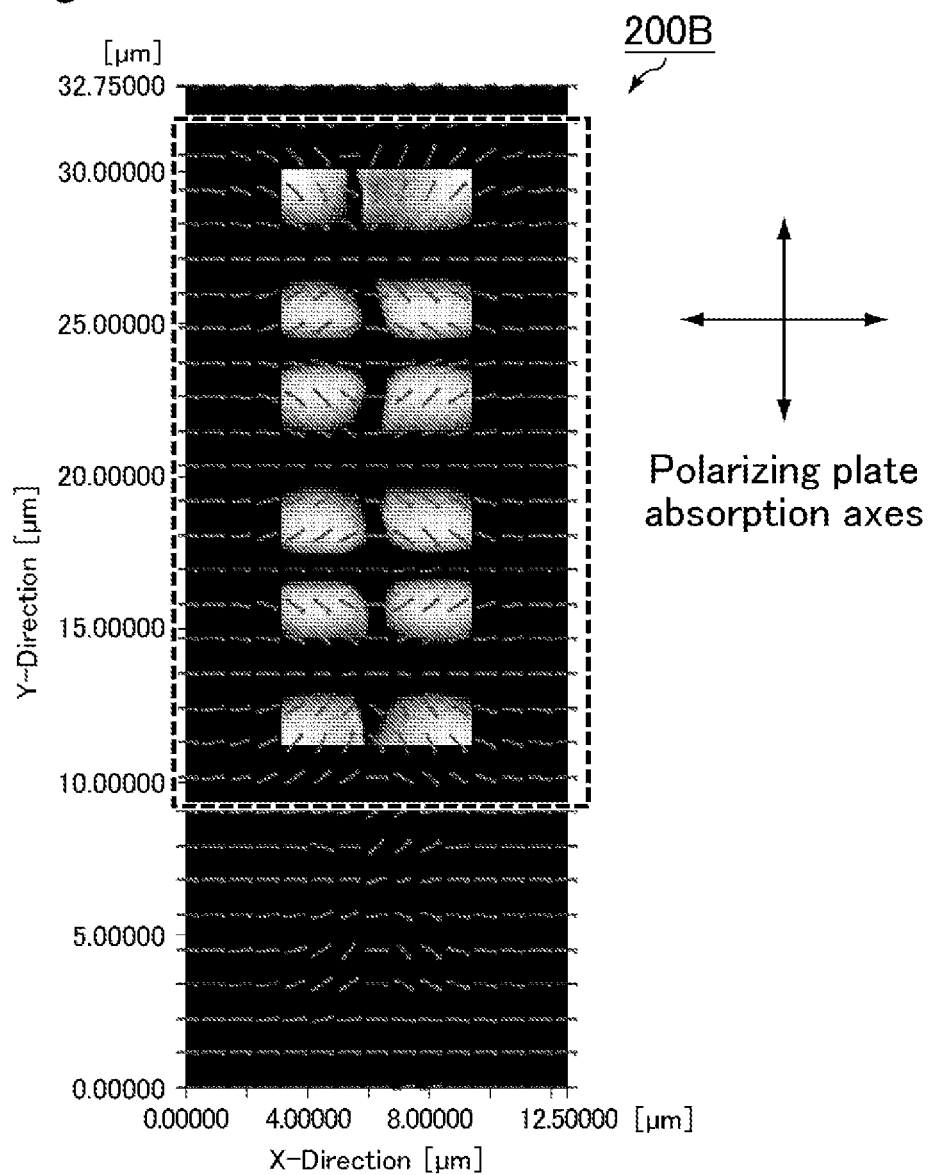
FIG. 29 is a plan view showing the simulation results of the distribution of liquid crystal molecule alignments in a display unit of Comparative Example 2 in the on state.

A liquid crystal display device of Comparative Example 2 has the same configuration as the liquid crystal display device of Example 1 except that the shape of each opening in the counter electrode 214 is changed. With reference to FIGS. 26 to 29, the liquid crystal display device of Comparative Example 2 will be described. FIG. 26 is a schematic plan view of a counter electrode in the liquid crystal display device of Comparative Example 2. FIG. 27 schematically illustrates the control of the alignment of liquid crystal molecules in the liquid crystal display device of Comparative Example 2. FIG. 27(1) shows the off state and FIG. 27(2) shows the on state. FIG. 28 is an enlarged plan view showing the simulation results of the distribution of liquid crystal molecule alignments in the region surrounded by the dotted line in FIG. 27(2). FIG. 29 is a plan view showing the simulation results of the distribution of liquid crystal molecule alignments in a display unit of Comparative Example 2 in the on state.

In a liquid crystal display device 200B of Comparative Example 2 shown in FIG. 26, an opening is formed in the counter electrode 214 in such a shape that three rectangular portions 215B are arranged in line for one display unit and the rectangular portions 215B are connected to each other via linear portions 216. The length g of the short sides of each rectangular portion 215B is set to 5 µm and the length h of the long sides is set to 7 µm. As shown in FIG. 27, the long sides of each rectangular portion 215B are parallel to the alignment azimuth of the liquid crystal molecules 221 in the off state.

As with the liquid crystal display device 100A of Example 1, the liquid crystal display device 200B of Comparative Example 2 in the on state can generate a fringe electric field in the liquid crystal layer 220 using the openings in the counter electrode 214. In the two regions surrounded by ellipses in FIG. 28, the electric field tends to be generated from the center of the rectangular portion 215B toward the four corners of the rectangular portion 215B, so that a high transmittance can be achieved. As shown in FIG. 29, in Comparative Example 2, the direction of rotation of the liquid crystal molecules is opposite between adjacent rectangular portions 215. As a result, the response speed of the liquid crystal molecules is improved as compared to that in Comparative Example 1. However, as the alignment distortion of the bend-aligned liquid crystal molecules is moderated at the four corners of each rectangular portion 215B, the effect of improving the response speed of the liquid crystal molecules is lower than that in the examples of the present invention.

Comparative Example 3

Figure 30:
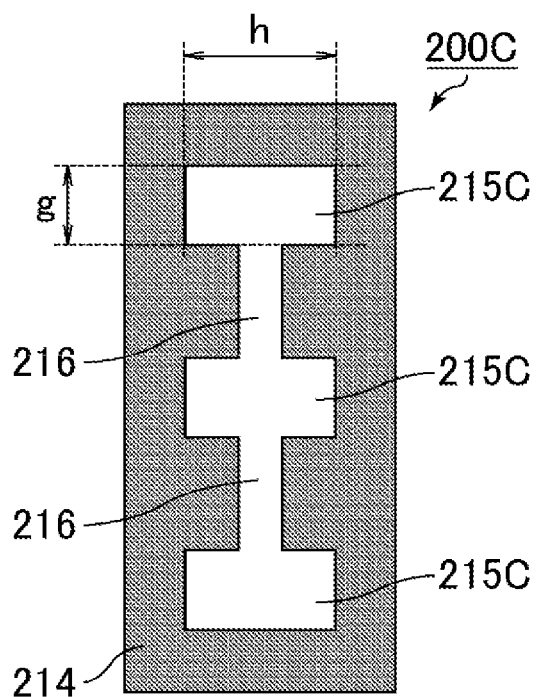
FIG. 30 is a schematic plan view of a counter electrode in the liquid crystal display device of Comparative Example 3.
Figure 31:
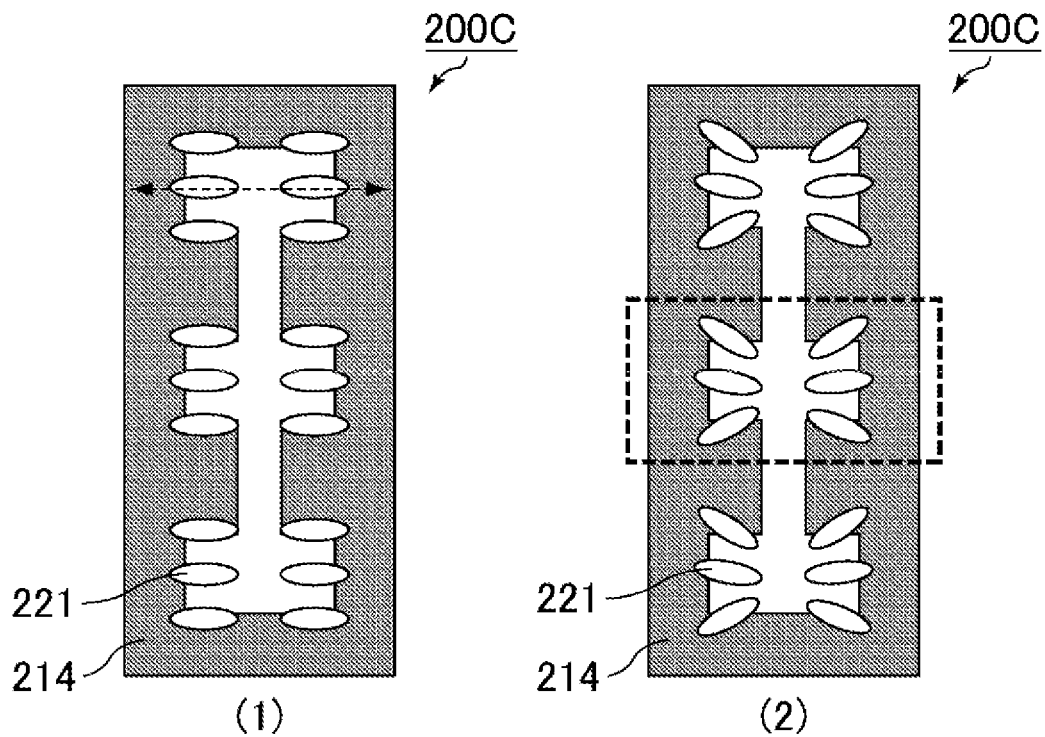
FIG. 31 schematically illustrates the control of the alignment of liquid crystal molecules in the liquid crystal display device of Comparative Example 3.
Figure 32:
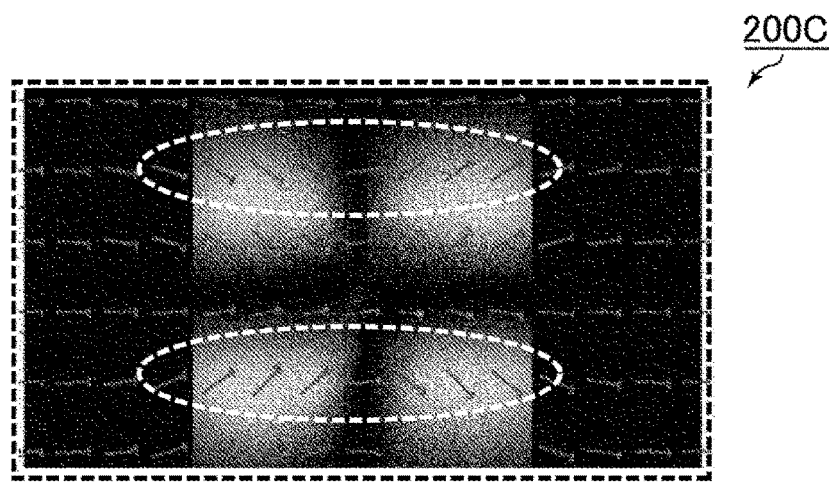
FIG. 32 is an enlarged plan view showing the simulation results of the distribution of liquid crystal molecule alignments in the region surrounded by the dotted line in FIG. 31(2).
Figure 33:
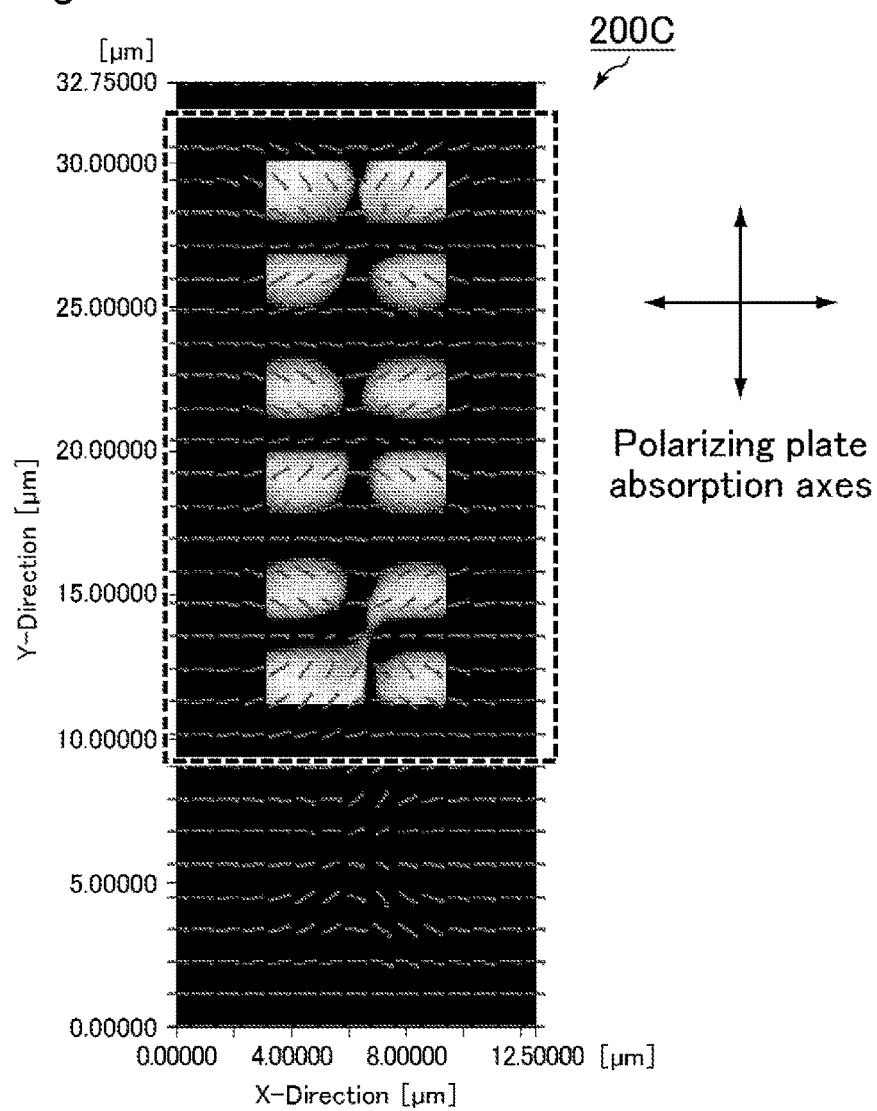
FIG. 33 is a plan view showing the simulation results of the distribution of liquid crystal molecule alignments in a display unit of Comparative Example 3 in the on state.

A liquid crystal display device of Comparative Example 3 has the same configuration as the liquid crystal display device of Example 1 except that the shape of each opening in the counter electrode 214 is changed. With reference to FIGS. 30 to 33, the liquid crystal display device of Comparative Example 3 will be described below. FIG. 30 is a schematic plan view of a counter electrode in the liquid crystal display device of Comparative Example 3. FIG. 31 schematically illustrates the control of the alignment of liquid crystal molecules in the liquid crystal display device of Comparative Example 3. FIG. 31(1) shows the off state and FIG. 31(2) shows the on state. FIG. 32 is an enlarged plan view showing the simulation results of the distribution of liquid crystal molecule alignments in the region surrounded by the dotted line in FIG. 31(2). FIG. 33 is a plan view showing the simulation results of the distribution of liquid crystal molecule alignments in a display unit of Comparative Example 3 in the on state.

In a liquid crystal display device 200C of Comparative Example 3 shown in FIG. 30, an opening is formed in the counter electrode 214 in such a shape that three rectangular portions 215C are arranged in line in one display unit and the rectangular portions 215C are connected to each other via linear portions 216. The length g of the short sides of each rectangular portion 215C is set to 3 µm and the length h of the long sides is set to 7 µm. As shown in FIG. 31, the long sides of each rectangular portion 215C are parallel to the alignment azimuth of the liquid crystal molecules 221 in the off state.

As with the liquid crystal display device 100A of Example 1, the liquid crystal display device 200C of Comparative Example 3 in the on state can generate a fringe electric field in the liquid crystal layer 220 using the openings in the counter electrode 214. In the two regions surrounded by ellipses in FIG. 32, the electric field tends to be generated from the center of the rectangular portion 215C toward the four corners of the rectangular portion 215C. This leads to a high transmittance, although it is not as high as that in Comparative Example 2. In Comparative Example 3, as shown in FIG. 33, the direction of rotation of the liquid crystal molecules is opposite between adjacent rectangular portions 215, as in Comparative Example 2. As a result, the response speed of the liquid crystal molecules is improved as compared to that in Comparative Example 1. However, as the alignment distortion of the bend-aligned liquid crystal molecules is moderated at the four corners of the rectangular portion 215C, the effect of improving the response speed of the liquid crystal molecules is lower than that in the examples of the present invention.

Comparative Example 4

Figure 34:
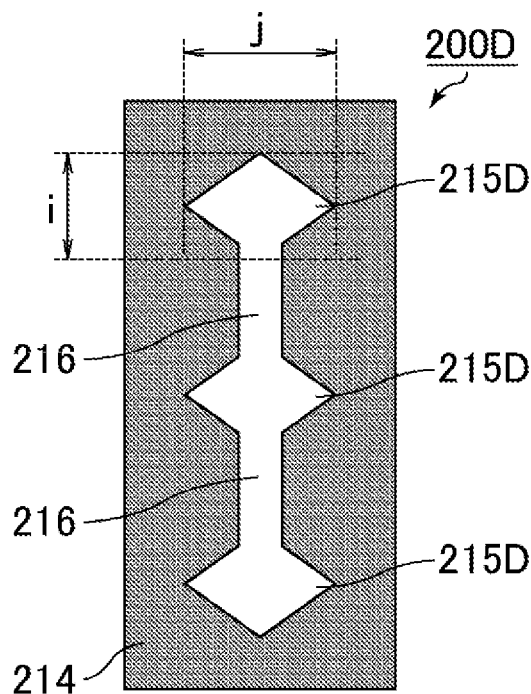
FIG. 34 is a schematic plan view of a counter electrode in a liquid crystal display device of Comparative Example 4.
Figure 35:
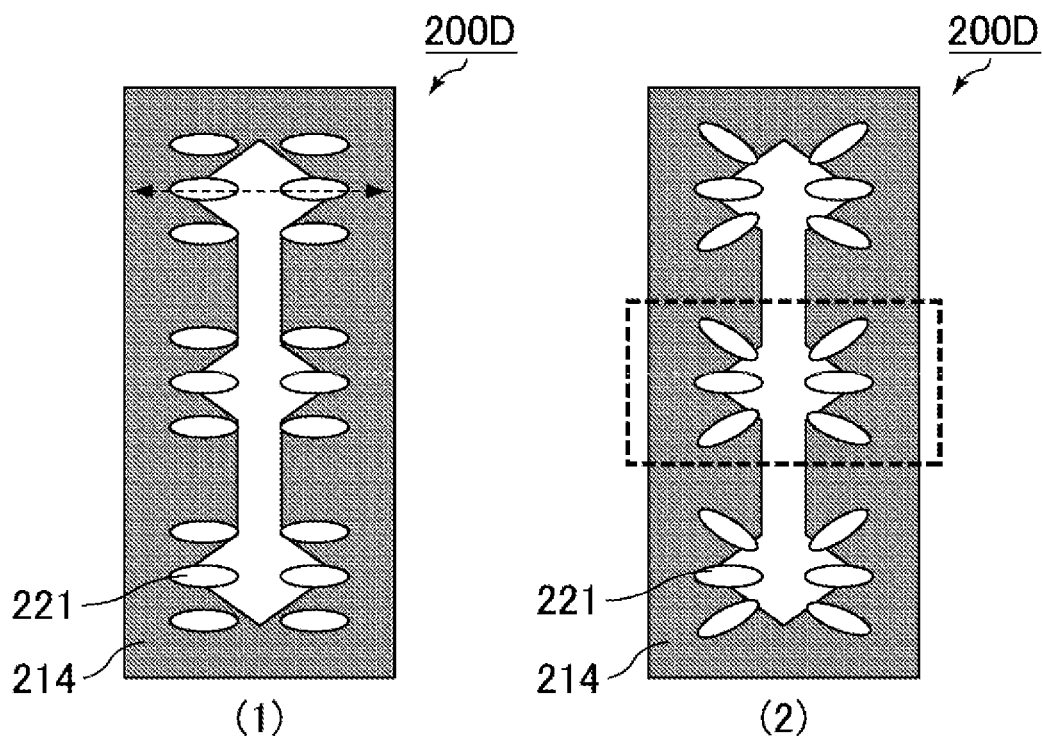
FIG. 35 schematically illustrates the control of the alignment of liquid crystal molecules in the liquid crystal display device of Comparative Example 4.
Figure 36:
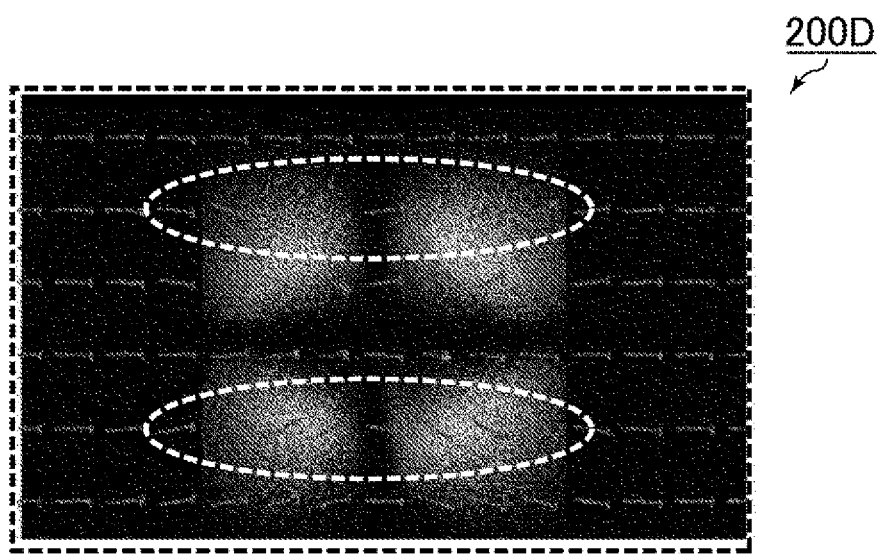
FIG. 36 is an enlarged plan view showing the simulation results of the distribution of liquid crystal molecule alignments in the region surrounded by the dotted line in FIG. 35(2).
Figure 37:
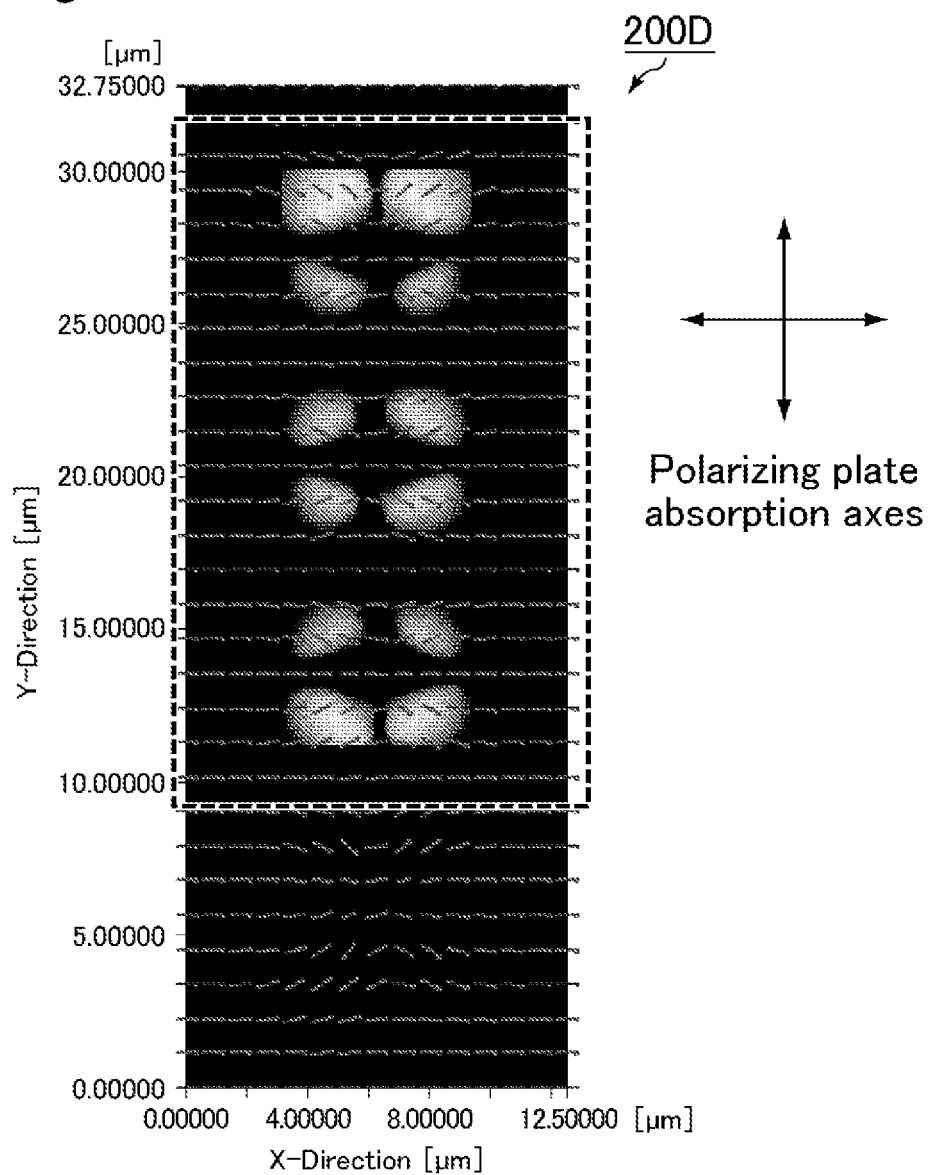
FIG. 37 is a plan view showing the simulation results of the distribution of liquid crystal molecule alignments in a display unit of Comparative Example 4 in the on state.

A liquid crystal display device of Comparative Example 4 has the same configuration as the liquid crystal display device of Example 1 except that the shape of each opening in the counter electrode 214 is changed. With reference to FIGS. 34 to 37, the liquid crystal display device of Comparative Example 4 will be described below. FIG. 34 is a schematic plan view of a counter electrode in the liquid crystal display device of Comparative Example 4. FIG. 35 schematically illustrates the control of the alignment of liquid crystal molecules in the liquid crystal display device of Comparative Example 4. FIG. 35(1) shows the off state and FIG. 35(2) shows the on state. FIG. 36 is an enlarged plan view showing the simulation results of the distribution of liquid crystal molecule alignments in the region surrounded by the dotted line in FIG. 35(2). FIG. 37 is a plan view showing the simulation results of the distribution of liquid crystal molecule alignments in a display unit of Comparative Example 4 in the on state.

In a liquid crystal display device 200D of Comparative Example 4 shown in FIG. 34, an opening is formed in the counter electrode 214 in such a shape that three rhombic portions 215D are arranged in line in one display unit and the rhombic portions 215D are connected to each other via linear portions 216. The length j of one diagonal of each rhombic portion 215D is longer than the length i of the other diagonal. The length i is set to 5 µm and the length j is set to 7 µm. As shown in FIG. 35, the diagonal of each rhombic portion 215D having a length j is parallel to the alignment azimuth of the liquid crystal molecules 221 in the off state.

As with the liquid crystal display device 100A of Example 1, the liquid crystal display device 200D of Comparative Example 4 in the on state can generate a fringe electric field in the liquid crystal layer 220 using the openings in the counter electrode 214. In Comparative Example 4, as shown in FIG. 37, the direction of rotation of the liquid crystal molecules is opposite between adjacent rhombic portions 215D. As a result, the response speed of the liquid crystal molecules is improved as compared to that in Comparative Example 1. However, the electric field tends to be generated from the center of each rhombic portion 215D toward the four corners of the rhombic portion 215D. In the two regions surrounded by ellipses in FIG. 36, thus, less liquid crystal molecules than in Comparative Example 1 are aligned at the 45° azimuth relative to the absorption axes of the first and second polarizers. As a result, the transmittance is lower than that in Comparative Example 1.

Comparative Example 5

Figure 38:
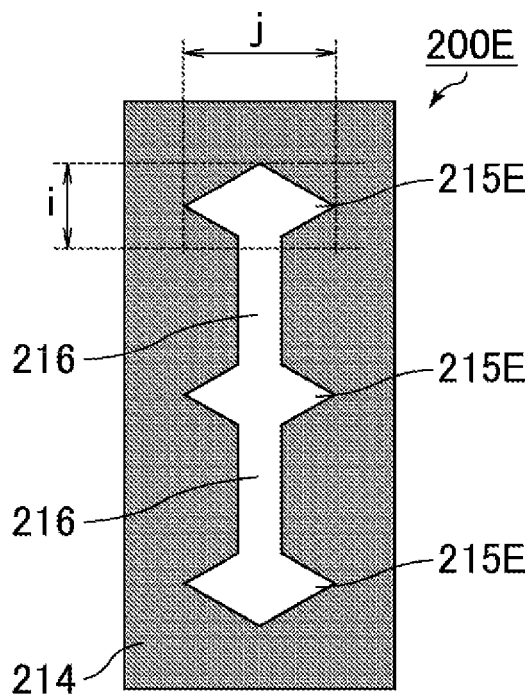
FIG. 38 is a schematic plan view of a counter electrode in a liquid crystal display device of Comparative Example 5.
Figure 39:
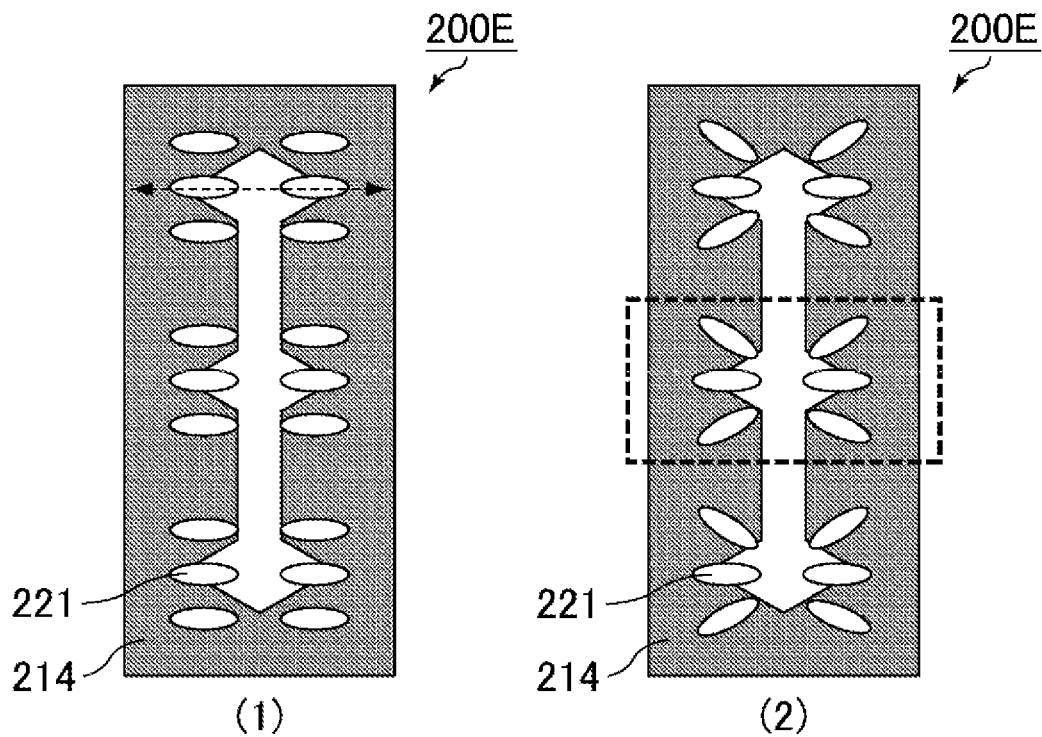
FIG. 39 schematically illustrates the control of the alignment of liquid crystal molecules in the liquid crystal display device of Comparative Example 5.
Figure 40:
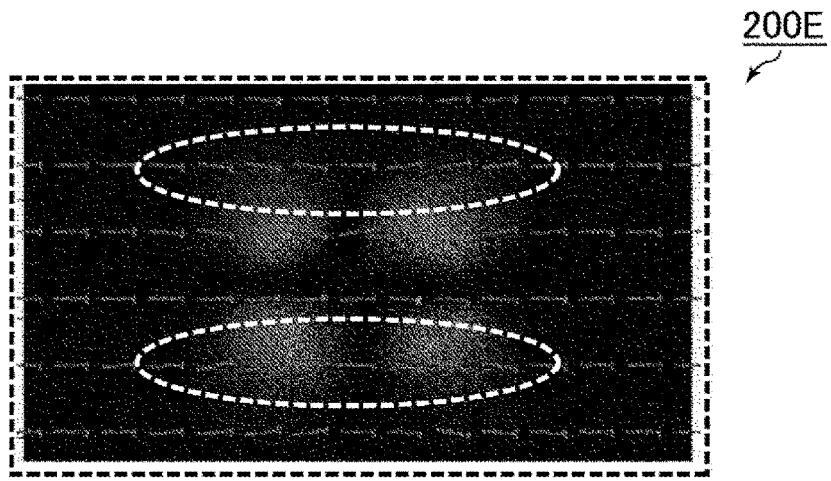
FIG. 40 is an enlarged plan view showing the simulation results of the distribution of liquid crystal molecule alignments in the region surrounded by the dotted line in FIG. 39(2).
Figure 41:
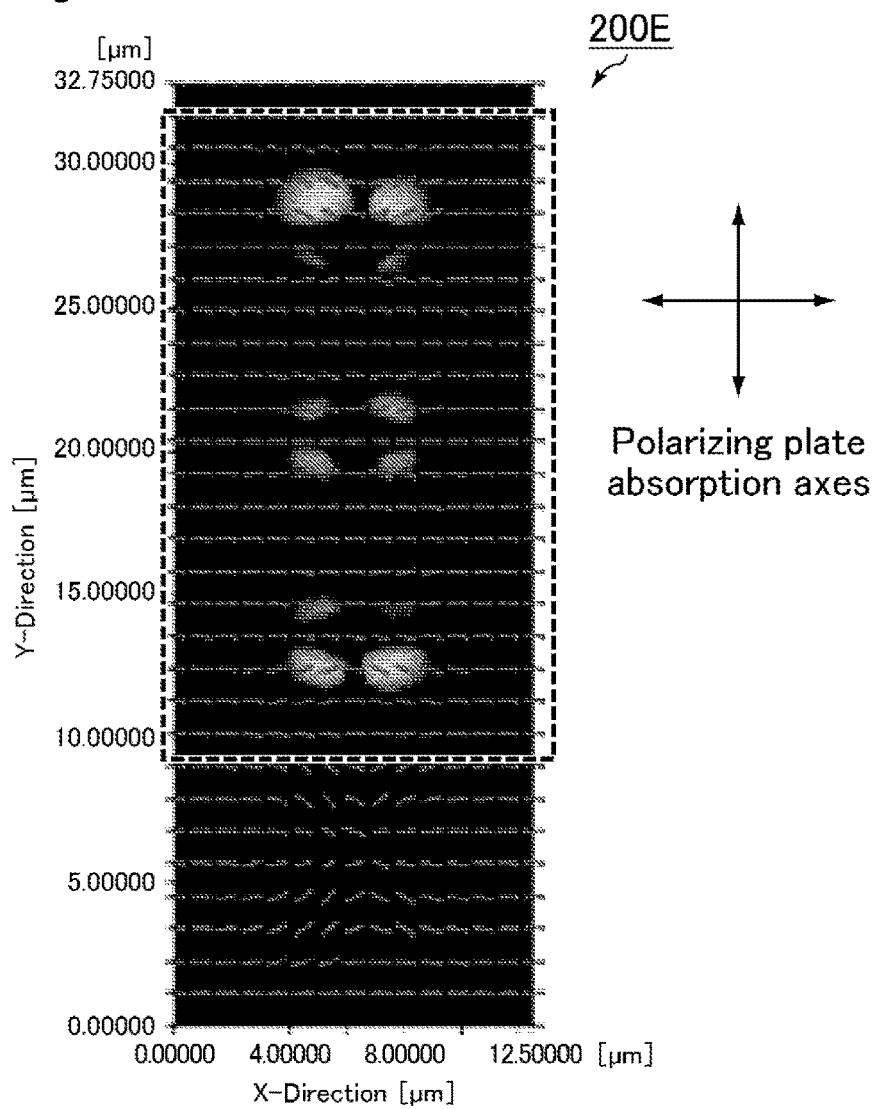
FIG. 41 is a plan view showing the simulation results of the distribution of liquid crystal molecule alignments in a display unit of Comparative Example 5 in the on state.

A liquid crystal display device of Comparative Example 5 has the same configuration as the liquid crystal display device of Example 1 except that the shape of each opening in the counter electrode 214 is changed. With reference to FIGS. 38 to 41, the liquid crystal display device of Comparative Example 5 will be described below. FIG. 38 is a schematic plan view of a counter electrode in a liquid crystal display device of Comparative Example 5. FIG. 39 schematically illustrates the control of the alignment of liquid crystal molecules in the liquid crystal display device of Comparative Example 5. FIG. 39(1) shows the off state and FIG. 39(2) shows the on state. FIG. 40 is an enlarged plan view showing the simulation results of the distribution of liquid crystal molecule alignments in the region surrounded by the dotted line in FIG. 39(2). FIG. 41 is a plan view showing the simulation results of the distribution of liquid crystal molecule alignments in a display unit of Comparative Example 5 in the on state.

In a liquid crystal display device 200E of Comparative Example 5 shown in FIG. 38, an opening is formed in the counter electrode 214 in such a shape that three rhombic portions 215E are arranged in line in one display unit and the rhombic portions 215E are connected to each other via linear portions 216. The length j of one diagonal of each rhombic portion 215D is longer than the the length i of the other diagonal. The length i is set to 3 µm and the length j is set to 7 µm. As shown in FIG. 39, the diagonal of each rhombic portion 215E having a length j is parallel to the alignment azimuth of the liquid crystal molecules 221 in the off state.

As with the liquid crystal display device 100A of Example 1, the liquid crystal display device 200E of Comparative Example 5 in the on state can generate a fringe electric field in the liquid crystal layer 220 using the openings in the counter electrode 214. In Comparative Example 5, as shown in FIG. 41, the direction of rotation of the liquid crystal molecules is opposite between adjacent rhombic portions 215D, as in Comparative Example 4. As a result, the response speed of the liquid crystal molecules is improved as compared to that in Comparative Example 1. However, in the two regions surrounded by ellipses in FIG. 40, even less liquid crystal molecules than in Comparative Example 4 are aligned at the 45° azimuth relative to the absorption axes of the first and second polarizers, leading to a low transmittance.

Comparative Example 6

Figure 42:
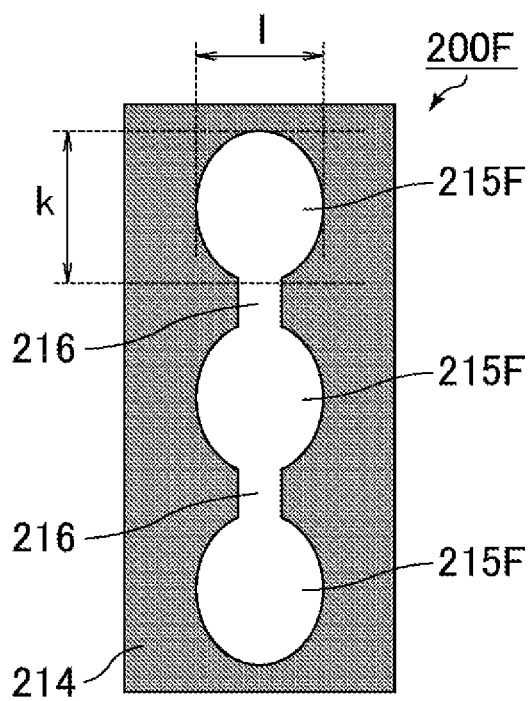
FIG. 42 is a schematic plan view of a counter electrode in a liquid crystal display device of Comparative Example 6.
Figure 43:
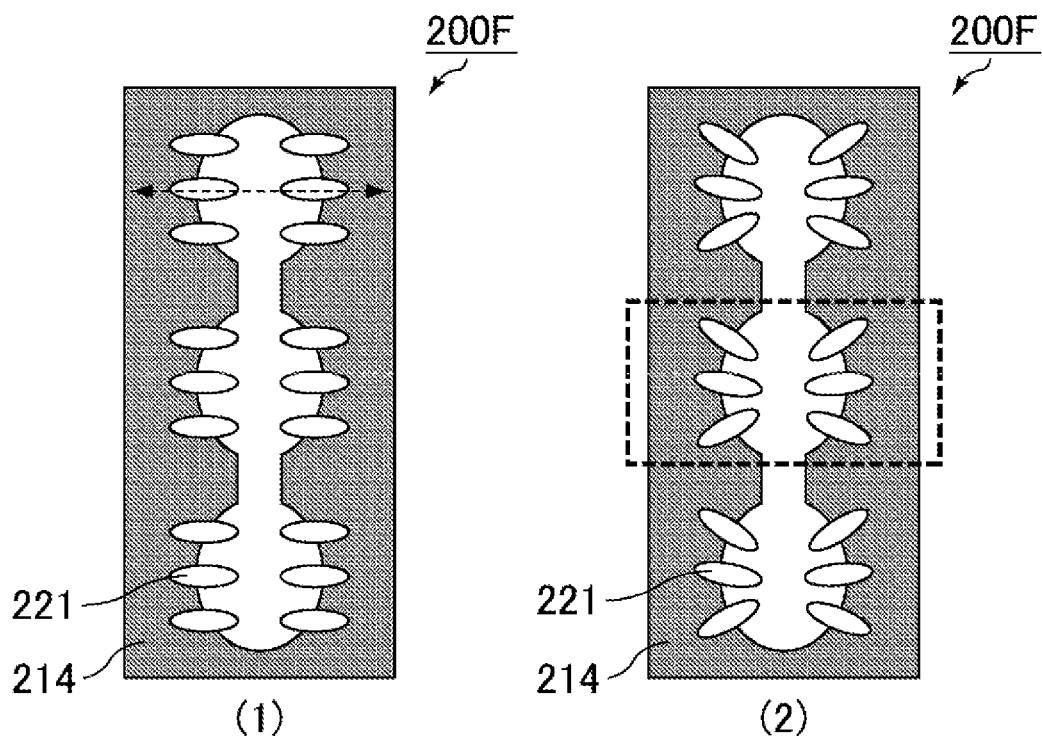
FIG. 43 schematically illustrates the control of the alignment of liquid crystal molecules in the liquid crystal display device of Comparative Example 6.
Figure 44:
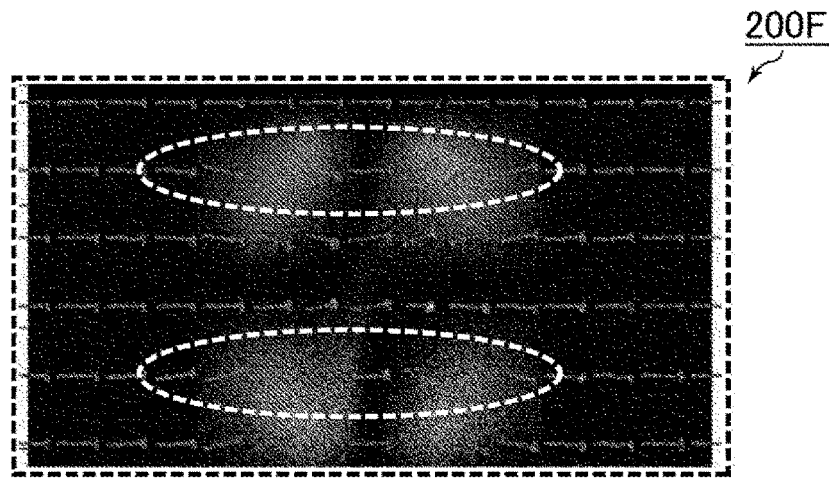
FIG. 44 is an enlarged plan view showing the simulation results of the distribution of liquid crystal molecule alignments in the region surrounded by the dotted line in FIG. 43(2).
Figure 45:
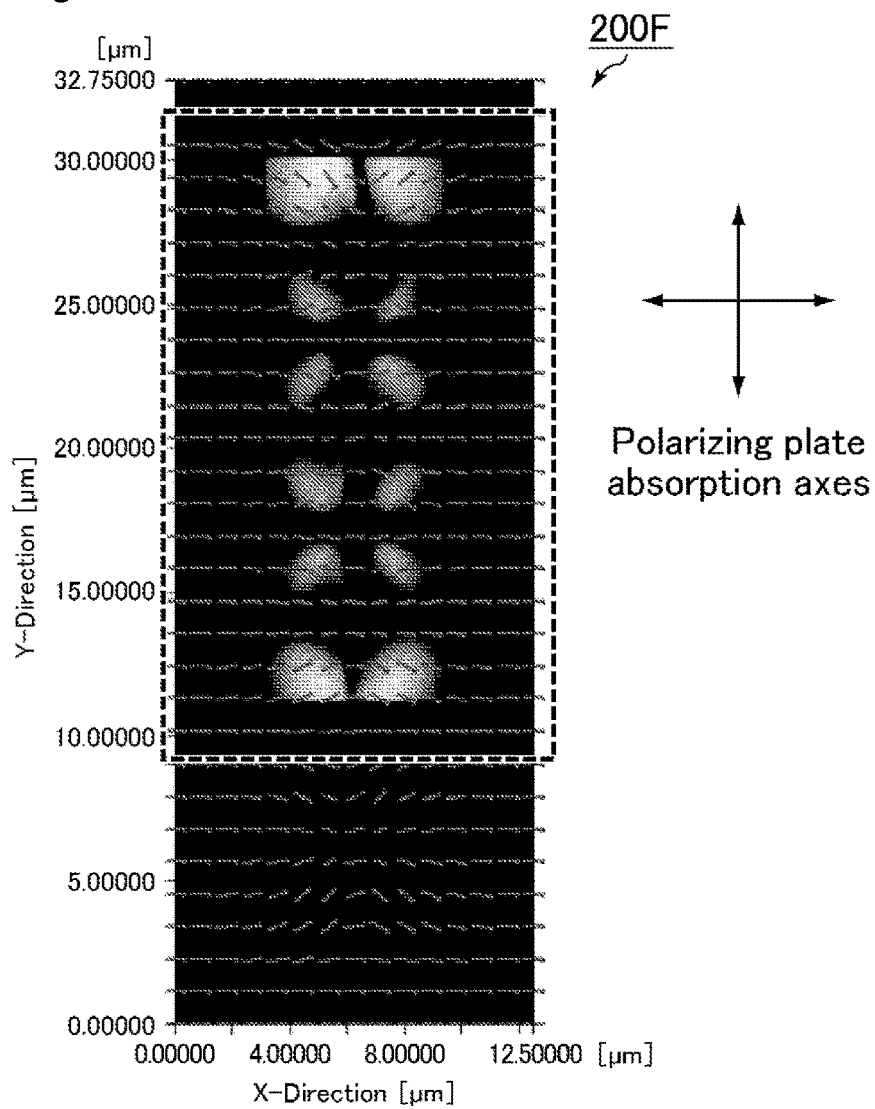
FIG. 45 is a plan view showing the simulation results of the distribution of liquid crystal molecule alignments in a display unit of Comparative Example 6 in the on state.

A liquid crystal display device of Comparative Example 6 has the same configuration as the liquid crystal display device of Example 1 except that the shape (distortion ratio) of each opening in the counter electrode 214 is changed. With reference to FIGS. 42 to 45, the liquid crystal display device of Comparative Example 6 will be described below. FIG. 42 is a schematic plan view of a counter electrode in a liquid crystal display device of Comparative Example 6. FIG. 43 schematically illustrates the control of the alignment of liquid crystal molecules in the liquid crystal display device of Comparative Example 6. FIG. 43(1) shows the off state and FIG. 43(2) shows the on state. FIG. 44 is an enlarged plan view showing the simulation results of the distribution of liquid crystal molecule alignments in the region surrounded by the dotted line in FIG. 43(2). FIG. 45 is a plan view showing the simulation results of the distribution of liquid crystal molecule alignments in a display unit of Comparative Example 6 in the on state.

In a liquid crystal display device 200F of Comparative Example 6 shown in FIG. 42, as in the liquid crystal display device 100A of Example 1, an opening is formed in the counter electrode 214 in such a shape that three elliptical portions 215F are arranged in line in one display unit and the elliptical portions 215F are connected to each other via linear portions 216. Here, as shown in FIG. 43, the liquid crystal display device is different from that of Example 1 in that the minor axis of each elliptical portion 215F is parallel to the alignment azimuth of the liquid crystal molecules 221 in the off state. In each elliptical portion 215F, l is set to 5 μm and k is set to 6 μm, where k is the length of the elliptical portion 215F at the azimuth perpendicular to the alignment azimuth of the liquid crystal molecules 221 in the off state and l is the length of the elliptical portion 215F at the alignment azimuth of the liquid crystal molecules 221 in the off state. In each elliptical portion 215F, k/l is 1.2, that is, the distortion ratio is greater than 1.

As with the liquid crystal display device 100A of Example 1, the liquid crystal display device 200F of Comparative Example 6 in the on state can generate a fringe electric field in the liquid crystal layer 220 using the openings in the counter electrode 214. In the two regions surrounded by ellipses in FIG. 44, the twist (rate of change of the alignment azimuth) of the liquid crystal molecules around the elliptical portion 215F is large. As a result, the response speed is improved as compared to that in Comparative Example 1. However, the alignment of the liquid crystal molecules 221 in Comparative Example 6 is likely to be biased because the elliptical portions 215F are longer at the azimuth perpendicular to the alignment azimuth of the liquid crystal molecules 221 in the off state. As a result, as shown in FIG. 40 and FIG. 41, a wide disclination region (unstable alignment region) is formed in the center of each elliptical portion 215F, leading to a low transmittance.

Example 5

A liquid crystal display device of Example 5 is a specific example of the liquid crystal display device 300A of Embodiment 2 described above, and has the following configuration.

In each opening in the counter electrode 314, x is set to 5 μm, y is set to 7 μm, and the distortion ratio is 0.714, where x is the length of the elliptical portion 315 at the alignment azimuth of the liquid crystal molecules 321 in the no-voltage-applied state, y is the length of the elliptical portion 315 at the azimuth perpendicular to the alignment azimuth of the liquid crystal molecules 321 in the no-voltage-applied state, and the distortion ratio is x/y. For the liquid crystal layer 320, the refractive index anisotropy (Δn) is set to 0.12, the in-plane retardation (Re) is set to 360 nm, and the viscosity is set to 80 cps. The anisotropy of dielectric constant (Δε) of the liquid crystal molecules 21 is set to −7 (negative type).

Figure 50:
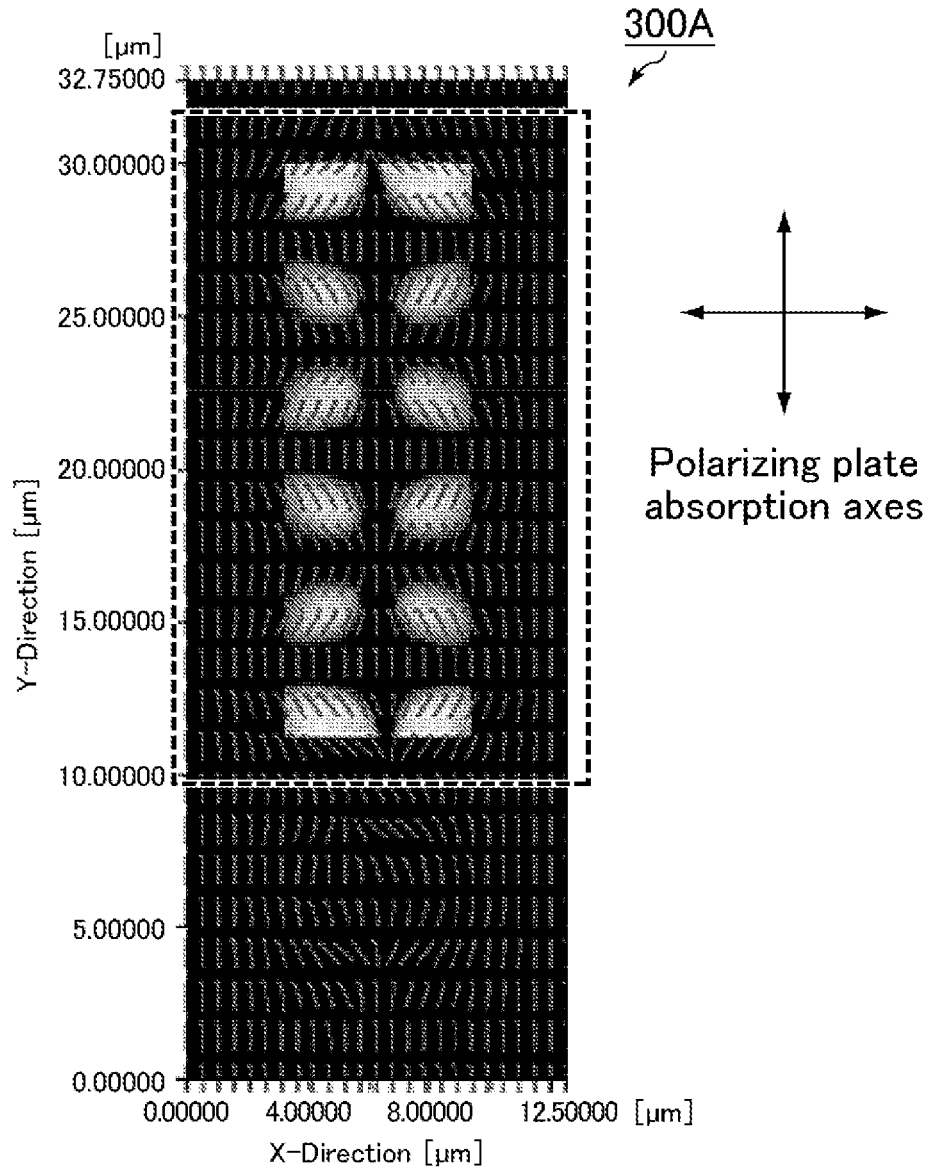
FIG. 50 is a plan view showing the simulation results of the distribution of liquid crystal molecule alignments in a display unit of Example 5 in the on state.

With reference to FIGS. 49 and 50, the distribution of liquid crystal molecule alignments in the liquid crystal display device of Example 5 in the on state (6 V application) will be described. FIG. 49 is an enlarged plan view showing the simulation results of the distribution of liquid crystal molecule alignments in the region surrounded by the dotted line in FIG. 48(2). FIG. 50 is a plan view showing the simulation results of the distribution of liquid crystal molecule alignments in a display unit of Example 5 in the on state. In the display unit in Example 5, when a voltage is applied between the pixel electrode 12 and the counter electrode 314, the liquid crystal molecules quickly rotate to form four domains around the center of the elliptical portion 315. In FIG. 49, the liquid crystal molecules in the two regions surrounded by ellipses are bend-aligned. The liquid crystal molecules on the upper side and those on the lower side in each region are aligned in opposite directions. The alignment region of the liquid crystal molecules in one elliptical portion 315 is thus divided into four domains. When the voltage between the pixel electrode 12 and the counter electrode 314 is removed, the distortion force derived from the bend alignment formed in the narrow regions allows high-speed response of the liquid crystal molecules. In addition, the electric field at the periphery of the elliptical portion 315 acts to prevent excessive rotation of the liquid crystal molecules, so that the reduction in transmittance can be suppressed as compared to cases where the opening is rhombic.

Example 6

Figure 51:
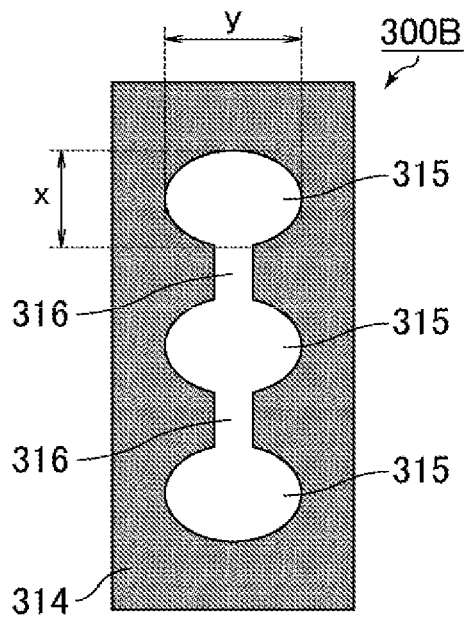
FIG. 51 is a schematic plan view of a counter electrode in a liquid crystal display device of Example 6.
Figure 52:
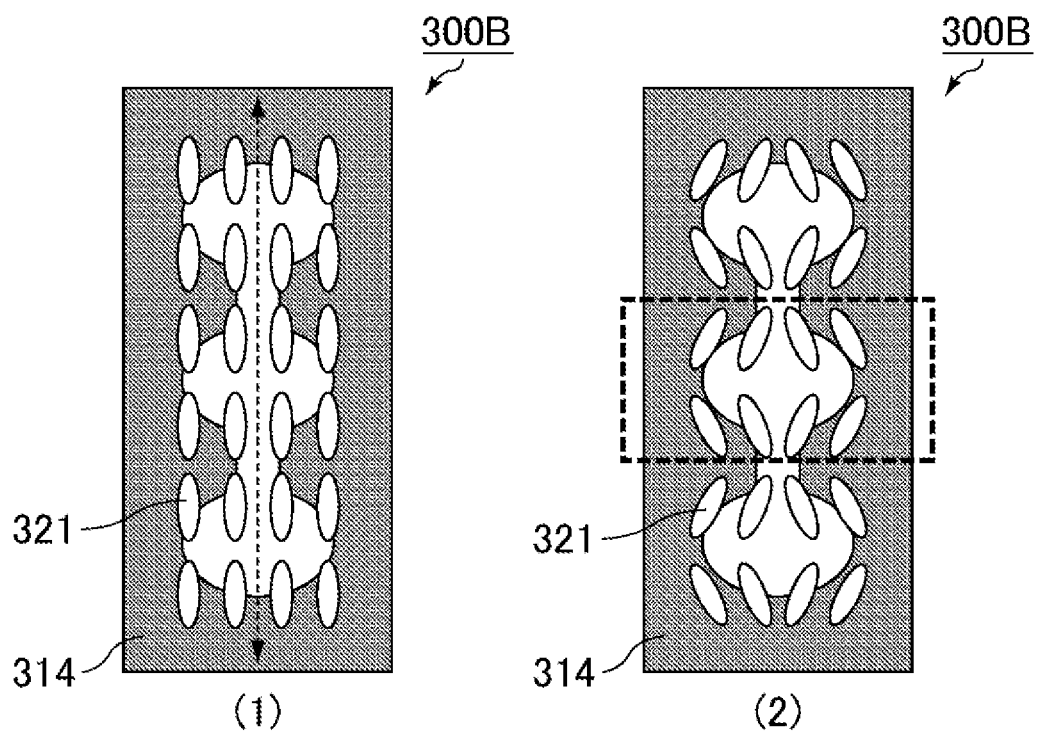
FIG. 52 schematically illustrates the control of the alignment of liquid crystal molecules in the liquid crystal display device of Example 6.
Figure 53:
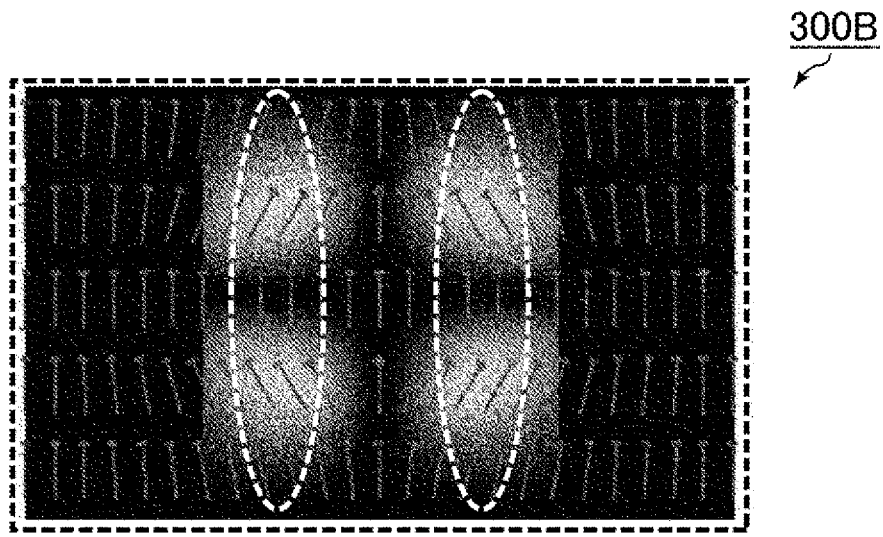
FIG. 53 is an enlarged plan view showing the simulation results of the distribution of liquid crystal molecule alignments in the region surrounded by the dotted line in FIG. 52(2).
Figure 54:
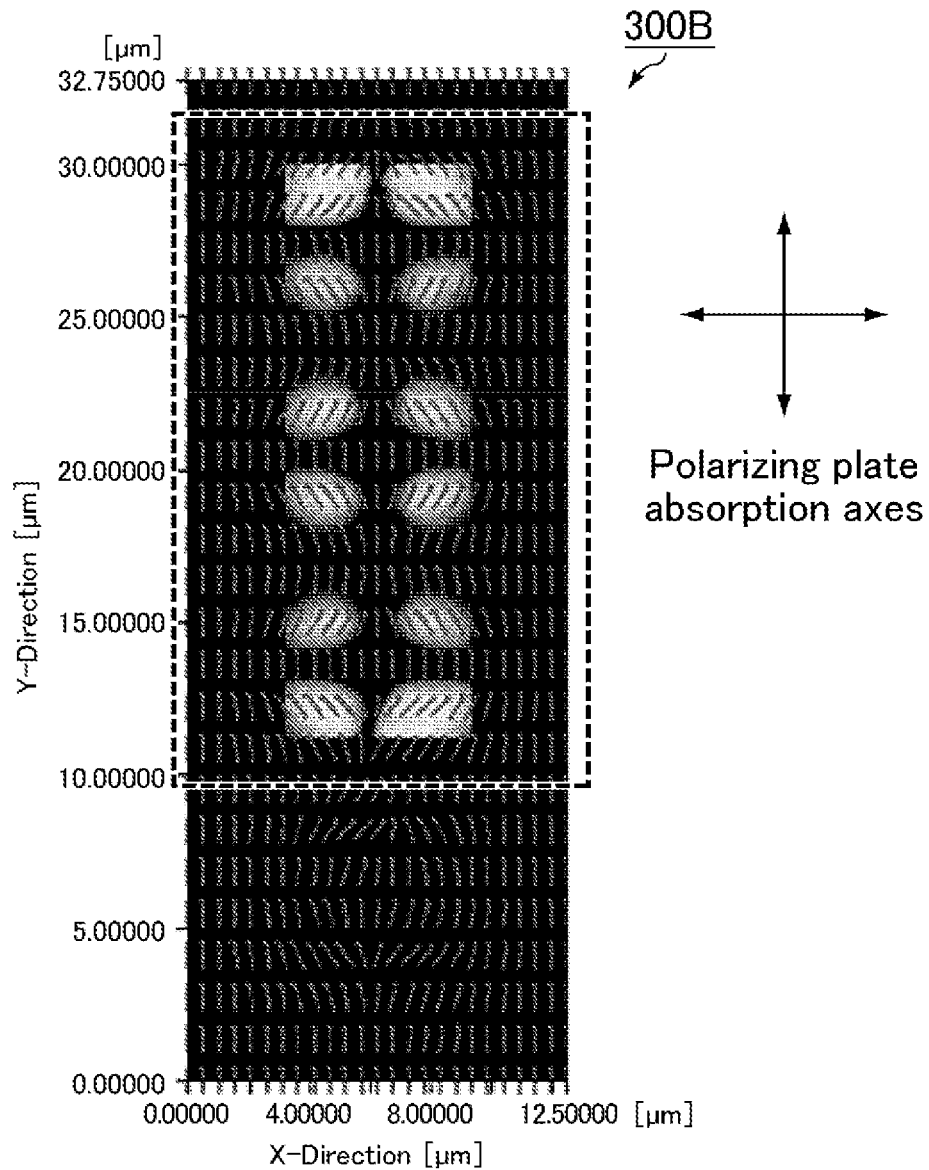
FIG. 54 is a plan view showing the simulation results of the distribution of liquid crystal molecule alignments in a display unit of Example 6 in the on state.

A liquid crystal display device of Example 6 has the same configuration as the liquid crystal display device of Example 5 except that the shape (distortion ratio) of each opening in the counter electrode 314 is changed. With reference to FIGS. 51 to 54, the liquid crystal display device of Example 6 will be described below. FIG. 51 is a schematic plan view of a counter electrode in the liquid crystal display device of Example 6. FIG. 52 schematically illustrates the control of the alignment of liquid crystal molecules in the liquid crystal display device of Example 6. FIG. 52(1) shows the off state and FIG. 52(2) shows the on state. FIG. 53 is an enlarged plan view showing the simulation results of the distribution of liquid crystal molecule alignments in the region surrounded by the dotted line in FIG. 52(2). FIG. 54 is a plan view showing the simulation results of the distribution of liquid crystal molecule alignments in a display unit of Example 6 in the on state. The dotted line in FIG. 52(1) indicates the initial alignment azimuth of the liquid crystal molecules in the no-voltage-applied state.

In a liquid crystal display device 300B of Example 6 shown in FIG. 51, as in the liquid crystal display device 300A of Example 5, an opening is formed in the counter electrode 314 in such a shape that three elliptical portions 315 are arranged in line in one display unit and the elliptical portions 315 are connected to each other via linear portions 316. Here, the liquid crystal display device is different from that of Example 1 in that in each elliptical portion 315, x is set to 4 μm, y is set to 7 μm, and the distortion ratio is 0.571. As shown in FIG. 52, the major axis of each elliptical portion 315 is perpendicular to the alignment azimuth of the liquid crystal molecules 321 in the off state, as in Example 5.

As with the liquid crystal display device 300A of Example 5, the liquid crystal display device 300B of Example 6 in the on state can generate a fringe electric field in the liquid crystal layer 320 using the openings in the counter electrode 314. In Example 6, the distortion ratio is smaller than that in Example 5, so that, as shown in FIG. 53 and FIG. 54, the twist (rate of change of the alignment azimuth) of the liquid crystal molecules around the elliptical portions 315 is large. Thus, although the transmittance is lower than that in Example 5, the response speed can be improved.

Example 7

Figure 55:
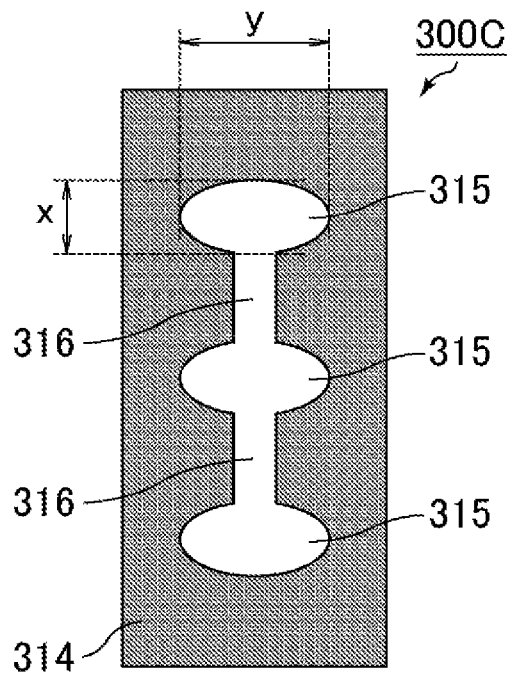
FIG. 55 is a schematic plan view of a counter electrode in a liquid crystal display device of Example 7.
Figure 56:
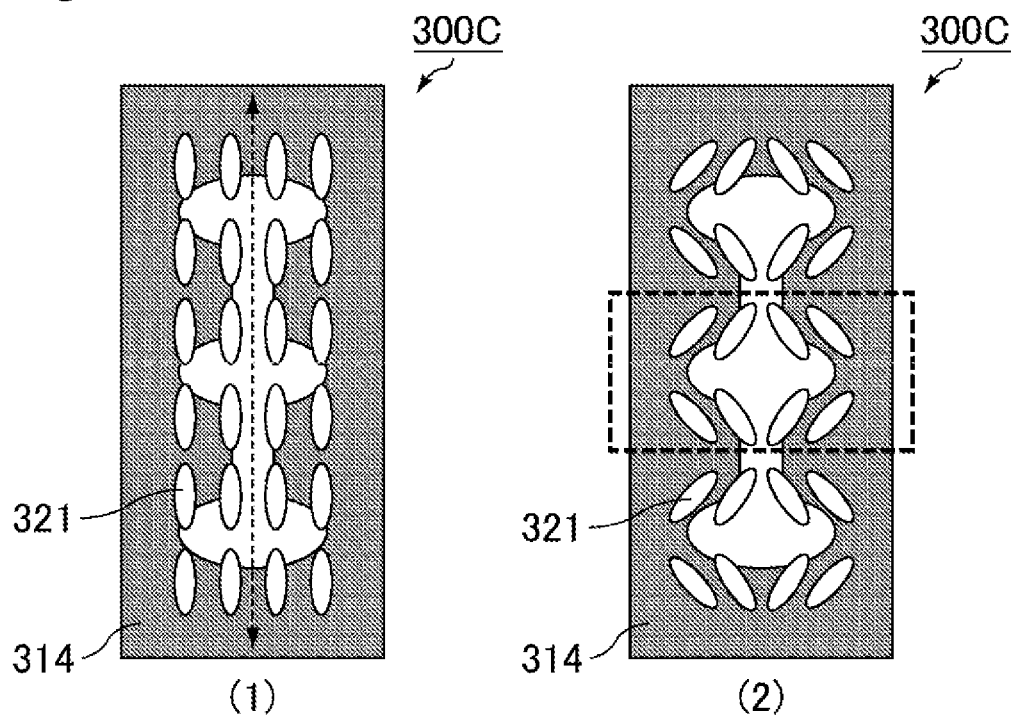
FIG. 56 schematically illustrates the control of the alignment of liquid crystal molecules in the liquid crystal display device of Example 7.
Figure 57:
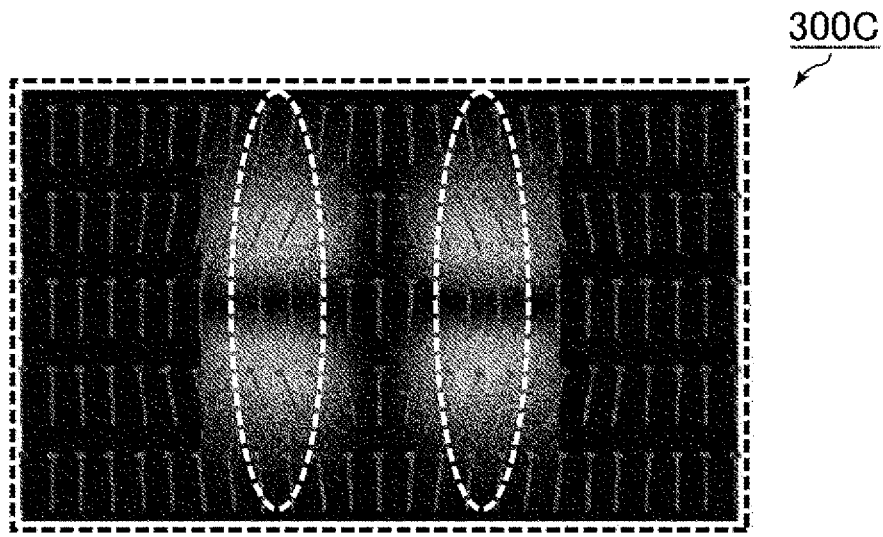
FIG. 57 is an enlarged plan view showing the simulation results of the distribution of liquid crystal molecule alignments in the region surrounded by the dotted line in FIG. 56(2).
Figure 58:
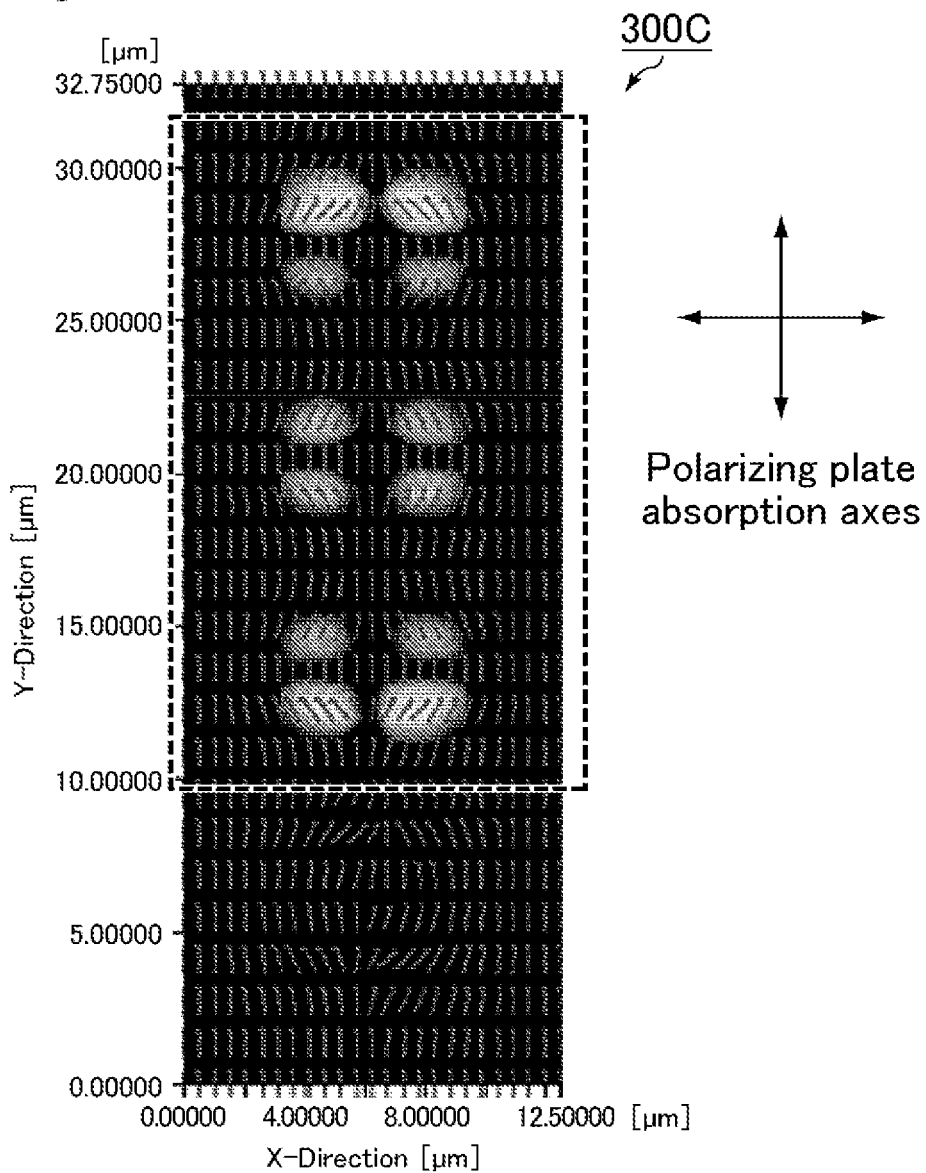
FIG. 58 is a plan view showing the simulation results of the distribution of liquid crystal molecule alignments in a display unit of Example 7 in the on state.

A liquid crystal display device of Example 7 has the same configuration as the liquid crystal display device of Example 5 except that the shape (distortion ratio) of each opening in the counter electrode 314 is changed. With reference to FIGS. 55 to 58, the liquid crystal display device of Example 7 will be described below. FIG. 55 is a schematic plan view of a counter electrode in the liquid crystal display device of Example 7. FIG. 56 schematically illustrates the control of the alignment of liquid crystal molecules in the liquid crystal display device of Example 7. FIG. 56(1) shows the off state and FIG. 56(2) shows the on state. FIG. 57 is an enlarged plan view showing the simulation results of the distribution of liquid crystal molecule alignments in the region surrounded by the dotted line in FIG. 56(2). FIG. 58 is a plan view showing the simulation results of the distribution of liquid crystal molecule alignments in a display unit of Example 7 in the on state. The dotted line in FIG. 56(1) indicates the initial alignment azimuth of the liquid crystal molecules in the no-voltage-applied state.

In a liquid crystal display device 300C of Example 7 shown in FIG. 55, as in the liquid crystal display device 300A of Example 5, an opening is formed in the counter electrode 314 in such a shape that three elliptical portions 315 are arranged in line in one display unit and the elliptical portions 315 are connected to each other via linear portions 316. Here, the liquid crystal display device is different from that of Example 5 in that in each elliptical portion 315, x is set to 3 μm, y is set to 7 μm, and the distortion ratio is 0.429. As shown in FIG. 56, the major axis of each elliptical portion 315 is perpendicular to the alignment azimuth of the liquid crystal molecules 321 in the off state, as in Example 5.

As with the liquid crystal display device 300A of Example 5, the liquid crystal display device 300C of Example 7 in the on state can generate a fringe electric field in the liquid crystal layer 320 using the openings in the counter electrode 314. In Example 7, the distortion ratio is smaller than that in Example 5, so that the twist (rate of change of the alignment azimuth) of the liquid crystal molecules around the elliptical portions 315 is larger. Thus, although the transmittance is lower than that in Example 5, the response speed can be improved.

Example 8

Figure 59:
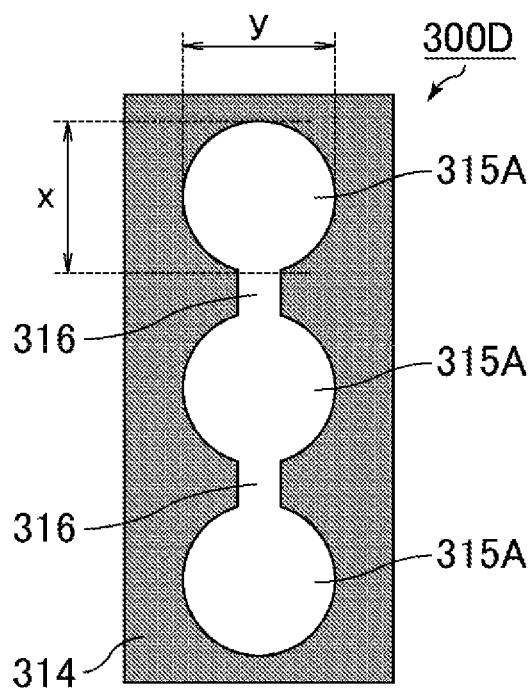
FIG. 59 is a schematic plan view of a counter electrode in a liquid crystal display device of Example 8.
Figure 60:
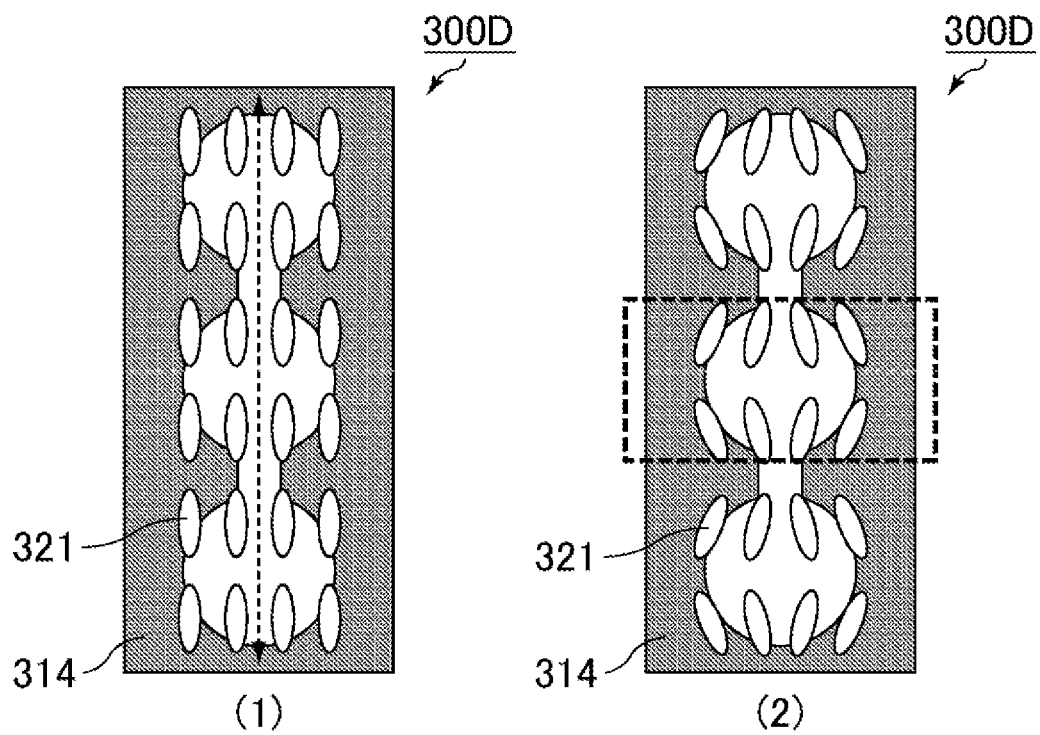
FIG. 60 schematically illustrates the control of the alignment of liquid crystal molecules in the liquid crystal display device of Example 8.
Figure 61:
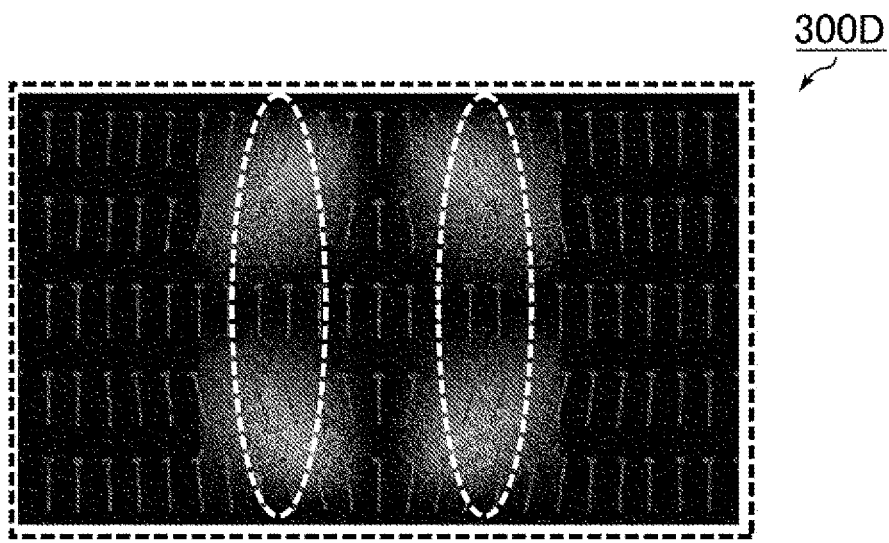
FIG. 61 is an enlarged plan view showing the simulation results of the distribution of liquid crystal molecule alignments in the region surrounded by the dotted line in FIG. 60(2).
Figure 62:
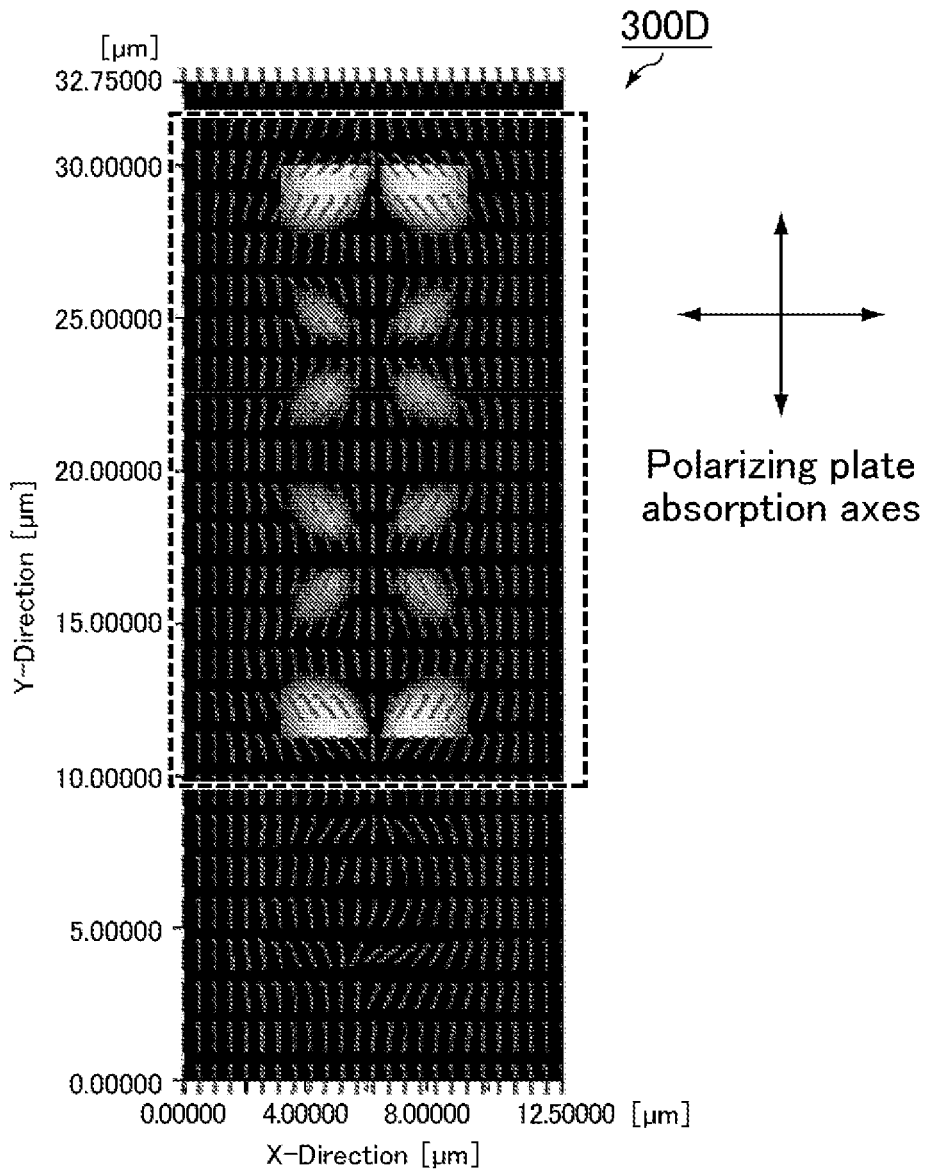
FIG. 62 is a plan view showing the simulation results of the distribution of liquid crystal molecule alignments in a display unit of Example 8 in the on state.

A liquid crystal display device of Example 8 has the same configuration as the liquid crystal display device of Example 5 except that the shape (distortion ratio) of each opening in the counter electrode 314 is changed. With reference to FIGS. 59 to 62, the liquid crystal display device of Example 8 will be described below. FIG. 59 is a schematic plan view of a counter electrode in the liquid crystal display device of Example 8. FIG. 60 schematically illustrates the control of the alignment of liquid crystal molecules in the liquid crystal display device of Example 8. FIG. 60(1) shows the off state and FIG. 60(2) shows the on state. FIG. 61 is an enlarged plan view showing the simulation results of the distribution of liquid crystal molecule alignments in the region surrounded by the dotted line in FIG. 60(2). FIG. 62 is a plan view showing the simulation results of the distribution of liquid crystal molecule alignments in a display unit of Example 8 in the on state. The dotted line in FIG. 60(1) indicates the initial alignment azimuth of the liquid crystal molecules in the no-voltage-applied state.

In a liquid crystal display device 300D of Example 8 shown in FIG. 59, an opening is formed in the counter electrode 314 in such a shape that three circular portions 315A are arranged in line in one display unit and the circular portions 315A are connected to each other via linear portions 316. In each circular portion 315A, in a plan view, x and y are both set to 6 μm and a distortion ratio is 1, where x is the length of the circular portion 315A at the alignment azimuth of the liquid crystal molecules 321 in the no-voltage-applied state, and y is the length of the circular portion 315A at the azimuth perpendicular to the alignment azimuth of the liquid crystal molecules 321 in the no-voltage-applied state.

As with the liquid crystal display device 300A of Example 5, the liquid crystal display device 300D of Example 8 in the on state can generate a fringe electric field in the liquid crystal layer 320 using the openings in the counter electrode 314. The formation of the circular portions 315A instead of the elliptical portions 315 also can improve the response speed. Here, in Example 8, as shown in FIG. 61 and FIG. 62, the distance from the center to the edge of each circular portion 315A is constant. This results in a point-symmetric alignment of the liquid crystal molecules 321, leading to the formation of a relatively large cross-shaped disclination region in the center of each circular portion 315A. The alignment simulation results shown in FIG. 62 thus indicate that the transmittance in Example 8 is lower than that of Example 5.

Comparative Example 7

Figure 63:
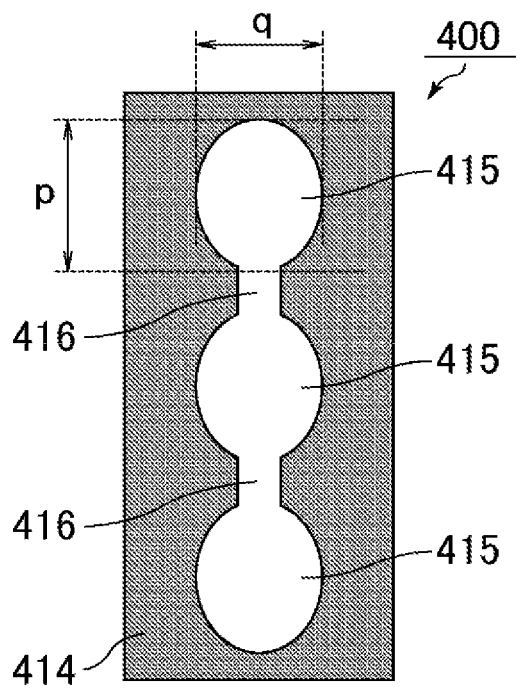
FIG. 63 is a schematic plan view of a counter electrode in a liquid crystal display device of Comparative Example 7.
Figure 64:
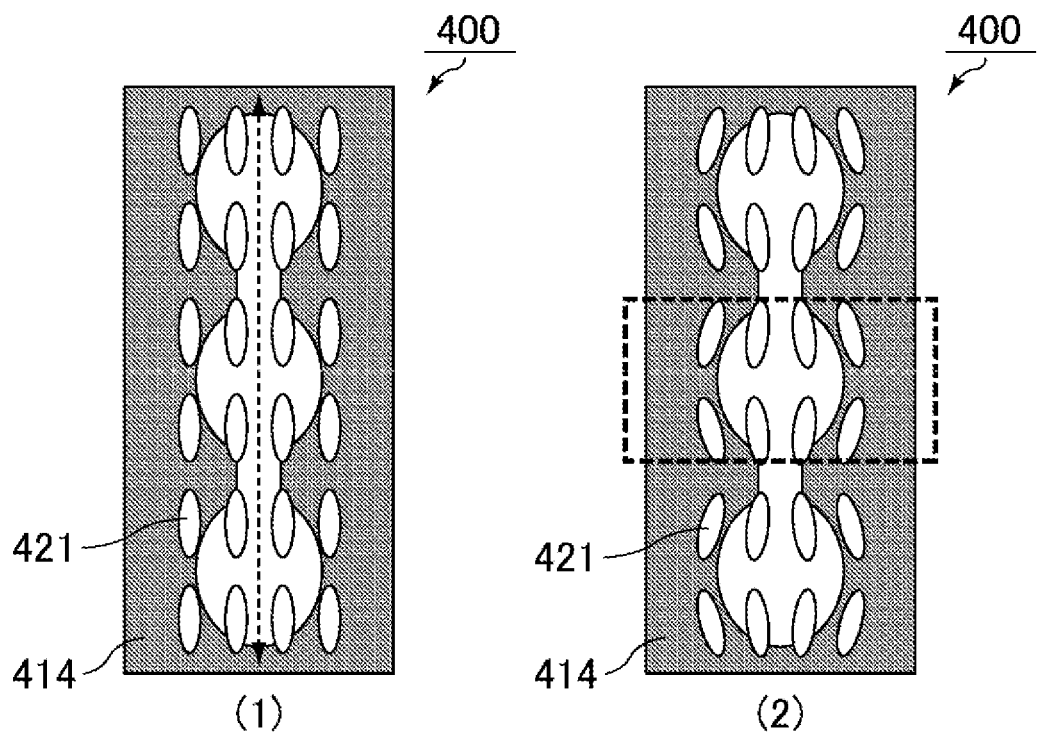
FIG. 64 schematically illustrates the control of the alignment of liquid crystal molecules in the liquid crystal display device of Comparative Example 7.
Figure 65:
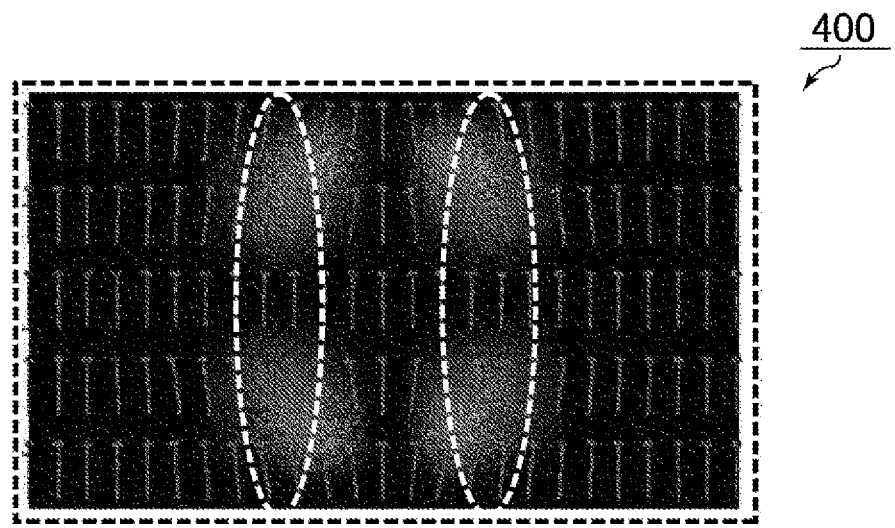
FIG. 65 is an enlarged plan view showing the simulation results of the distribution of liquid crystal molecule alignments in the region surrounded by the dotted line in FIG. 64(2).
Figure 66:
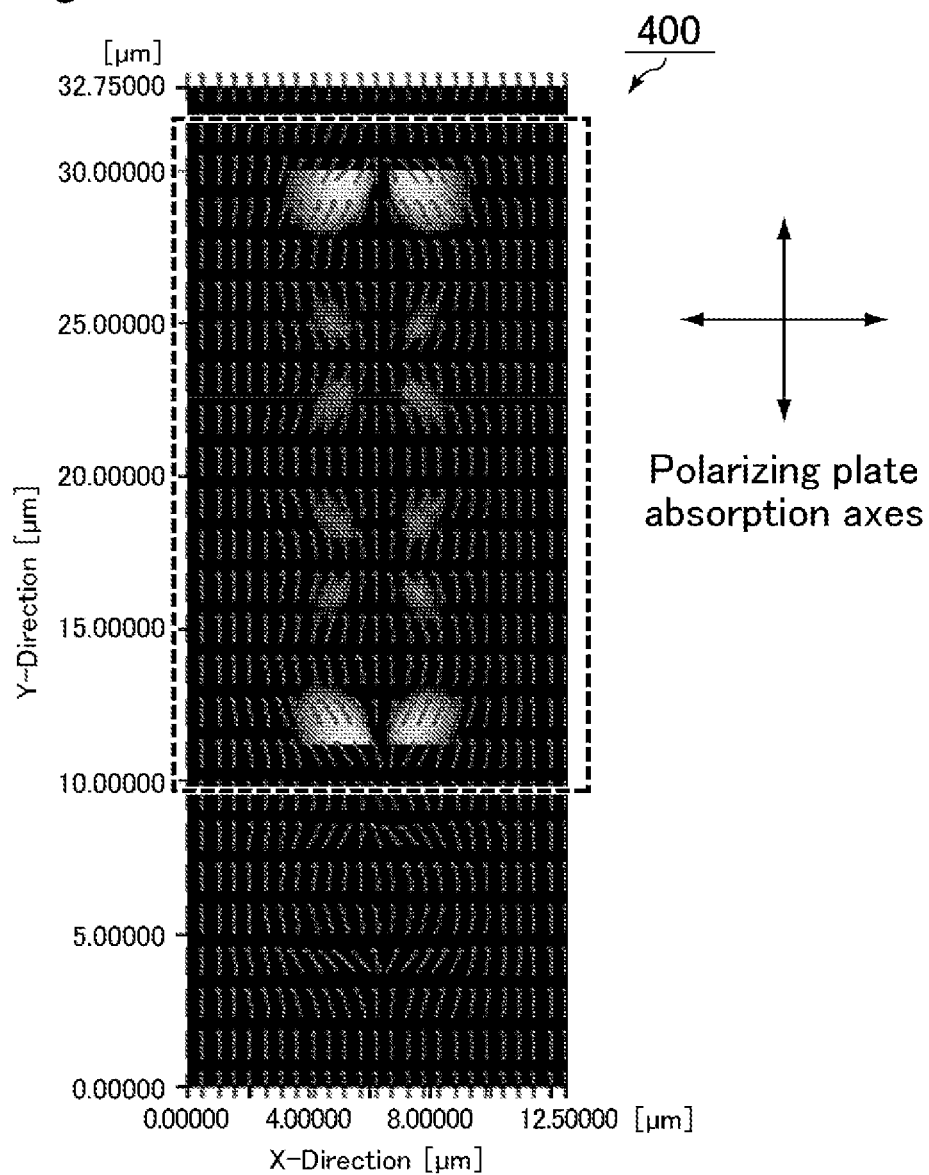
FIG. 66 is a plan view showing the simulation results of the distribution of liquid crystal molecule alignments in a display unit of Comparative Example 7 in the on state.

A liquid crystal display device of Comparative Example 7 has the same configuration as the liquid crystal display device of Example 5 except that the shape (distortion ratio) of each opening in a counter electrode 414 is changed. With reference to FIGS. 63 to 66, the liquid crystal display device of Comparative Example 7 will be described below. FIG. 63 is a schematic plan view of a counter electrode in the liquid crystal display device of Comparative Example 7. FIG. 64 schematically illustrates the control of the alignment of liquid crystal molecules in the liquid crystal display device of Comparative Example 7. FIG. 64(1) shows the off state and FIG. 64(2) shows the on state. FIG. 65 is an enlarged plan view showing the simulation results of the distribution of liquid crystal molecule alignments in the region surrounded by the dotted line in FIG. 64(2). FIG. 66 is a plan view showing the simulation results of the distribution of liquid crystal molecule alignments in a display unit of Comparative Example 7 in the on state. The dotted line in FIG. 64(1) indicates the initial alignment azimuth of the liquid crystal molecules in the no-voltage-applied state.

In a liquid crystal display device 400 of Comparative Example 7 shown in FIG. 63, as in the liquid crystal display device 300A of Example 5, an opening is formed in the counter electrode 414 in such a shape that three elliptical portions 415 are arranged in line in one display unit and the elliptical portions 415 are connected to each other via linear portions 416. Here, as shown in FIG. 64, the liquid crystal display device is different from that of Example 5 in that the minor axis of each elliptical portion 415 is perpendicular to the alignment azimuth of the liquid crystal molecules 421 in the off state. In each elliptical portion 415, p is set to 6 μm and q is set to 5 μm, where the p is the length of the elliptical portion 415 at the alignment azimuth of the liquid crystal molecules 421 in the off state and q is the length of the elliptical portion 415 at the azimuth perpendicular to the alignment azimuth of the liquid crystal molecules 421 in the off state. In each elliptical portion 415, p/q is 1.2, that is, the distortion ratio is greater than 1.

As with the liquid crystal display device 300A of Example 5, the liquid crystal display device 400 of Comparative Example 7 in the on state can generate a fringe electric field in the liquid crystal layer 320 using the openings in the counter electrode 414. In the two regions surrounded by ellipses in FIG. 65, the twist (rate of change of the alignment azimuth) of the liquid crystal molecules around the elliptical portion 415 is large. As a result, the response speed can be improved as compared to that in Comparative Example 1.

However, the alignment of the liquid crystal molecules 421 in Comparative Example 7 is likely to be biased because the elliptical portions 415 are longer at the azimuth perpendicular to the alignment azimuth of the liquid crystal molecules 421 in the off state. As a result, as shown in FIG. 65 and FIG. 66, a wide disclination region (unstable alignment region) is formed in the center of each elliptical portion 415, leading to a low transmittance.

Comparison of Examples and Comparative Examples

For the liquid crystal display devices of Examples 1 to 8 and Comparative Examples 1 to 7, simulation was performed using LCD-Master3D (Shintech, Inc.) under the evaluation conditions below. The results are shown in Table 1, Table 2, and FIGS. 67 to 73.

(Evaluation Conditions)

The voltage-transmittance characteristics were evaluated by varying the voltage (fringe voltage) applied between the pixel electrodes and the counter electrode in the range of 0 to 6 V.

The response time was tested at 4.5 V because the response at an intermediate display value is the slowest. With the maximum transmittance obtainable by optical modulation being defined as a transmittance ratio of 100%, the rise response time is defined as time required for the transmittance ratio to change from 10% to 90%, and the decay response time is defined as time required for the transmittance ratio to change from 90% to 10%. In the evaluation of the transmittance, a transmittance of 3.5% or higher was evaluated as "Good" and a transmittance of lower than 3.5% was evaluated as "Poor". In the evaluation of the average value of the black-white response, an average value of the black-white response of 4.2 ms or smaller was evaluated as "Good" and an average value of the black-white response of greater than 4.2 ms was evaluated as "Poor".

TABLE 1

|  | Example 1 | Example 2 | Example 3 | Example 4 | Comparative Example 1 | Comparative Example 2 | Comparative Example 3 | Comparative Example 4 | Comparative Example 5 | Comparative Example 6 |
| --- | --- | --- | --- | --- | --- | --- | --- | --- | --- | --- |
| Shape of opening | Elliptical | Elliptical | Elliptical | Perfectly circular | FFS | Rectangular | Rectangular | Rhombic | Rhombic | Elliptical |
| Distortion ratio | 0.71 | 0.57 | 0.43 | 1.00 | — | — | — | — | — | 1.20 |
| Transmittance (%) | 4.7 | 4.6 | 3.5 | 3.7 | 6.7 | 4.7 | 5.0 | 3.2 | 1.6 | 2.7 |
| Average value of black-white response (ms) | 4.1 | 3.8 | 4.0 | 4.1 | 15.8 | 4.9 | 4.6 | 3.5 | 3.2 | 4.2 |
| Rise response characteristics (ms) | 4.8 | 5.0 | 5.0 | 4.9 | 20.1 | 5.6 | 6.1 | 4.8 | 4.6 | 5.2 |
| Decay response characteristics (ms) | 3.4 | 2.6 | 3.0 | 3.3 | 11.4 | 4.1 | 3.0 | 2.2 | 1.7 | 3.1 |
| Evaluation of transmittance | Good | Good | Good | Good | Good | Good | Good | Poor | Poor | Poor |
| Evaluation of average value of black-white response | Good | Good | Good | Good | Poor | Poor | Poor | Good | Good | Good |
| Total evaluation | Good | Good | Good | Good | Poor | Poor | Poor | Poor | Poor | Poor |

TABLE 2

|  | Example 5 | Example 6 | Example 7 | Example 8 | Comparative Example 7 |
| --- | --- | --- | --- | --- | --- |
| Shape of opening | Elliptical | Elliptical | Elliptical | Perfectly circular | Elliptical |
| Distortion ratio | 0.71 | 0.57 | 0.43 | 1.00 | 1.20 |
| Transmittance (%) | 4.5 | 4.5 | 3.6 | 3.5 | 2.4 |
| Average value of black-white response (ms) | 3.5 | 3.7 | 3.2 | 3.5 | 3.7 |
| Rise response characteristics (ms) | 3.5 | 4.0 | 4.6 | 3.5 | 4.0 |
| Decay response characteristics (ms) | 3.5 | 3.4 | 1.8 | 3.5 | 3.4 |
| Evaluation of transmittance | Good | Good | Good | Good | Poor |
| Evaluation of average value of black-white response | Good | Good | Good | Good | Good |
| Total evaluation | Good | Good | Good | Good | Poor |

Figure 67:
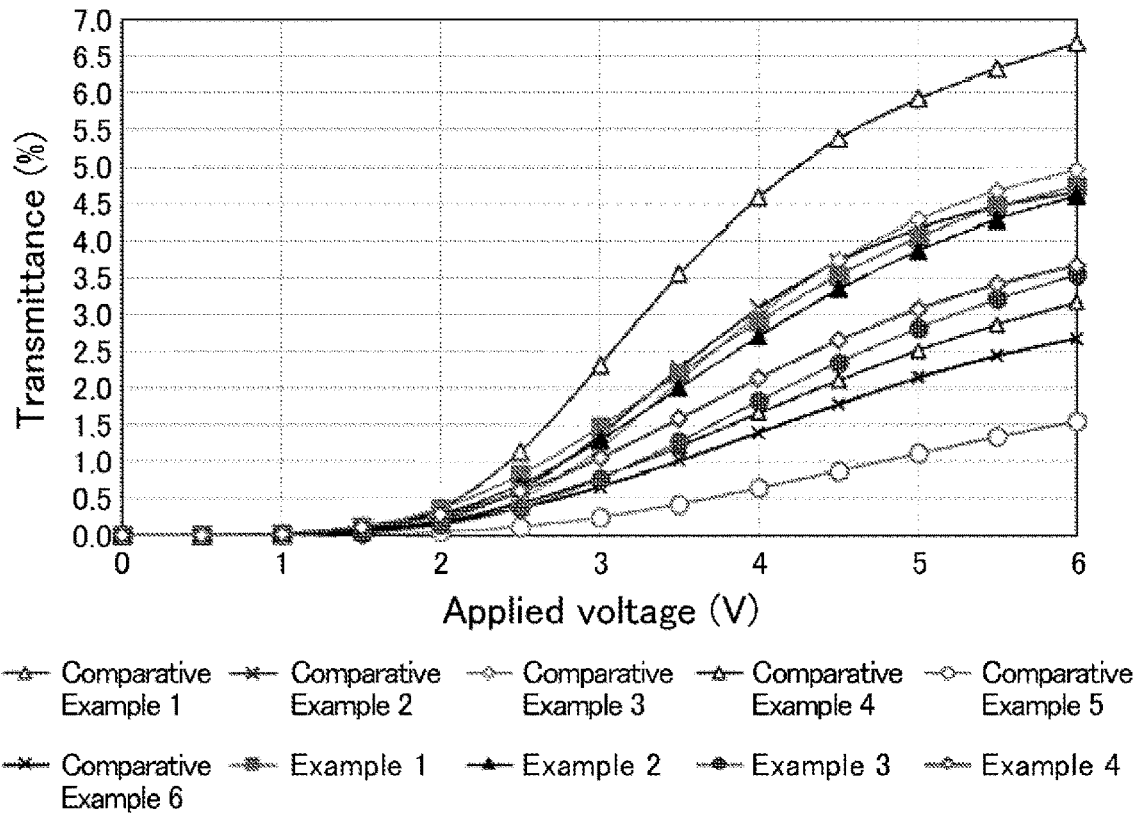
FIG. 67 is a graph showing voltage-transmittance characteristics of Examples 1 to 4 and Comparative Examples 1 to 6.

FIG. 67 is a graph showing voltage-transmittance characteristics of Examples 1 to 4 and Comparative Examples 1 to 6. As shown in FIG. 67, a transmittance of 3.5% or higher under application of a voltage of 6 V was obtained in Examples 1 to 4 according to Embodiment 1, but not obtained in Comparative Examples 4 to 6. Since high-definition liquid crystal panels are required to achieve a luminance of 350 cd/m$^2$ with a backlight having a luminance of 1000 cd/m$^2$, the liquid crystal panels need to have a transmittance of 3.5% or higher. The simulation results of the voltage-transmittance characteristics confirm that the formation of rhombic openings in the counter electrode lead to an insufficient transmittance. The results of Examples 1 to 4 and Comparative Example 6 show that the transmittance increases as the distortion ratio is increased, and that the transmittance is highest at the distortion ratio in Example 1 (0.71). The results also show that once the distortion ratio exceeds 0.71, the transmittance decreases as the distortion ratio is increased.

Figure 68:
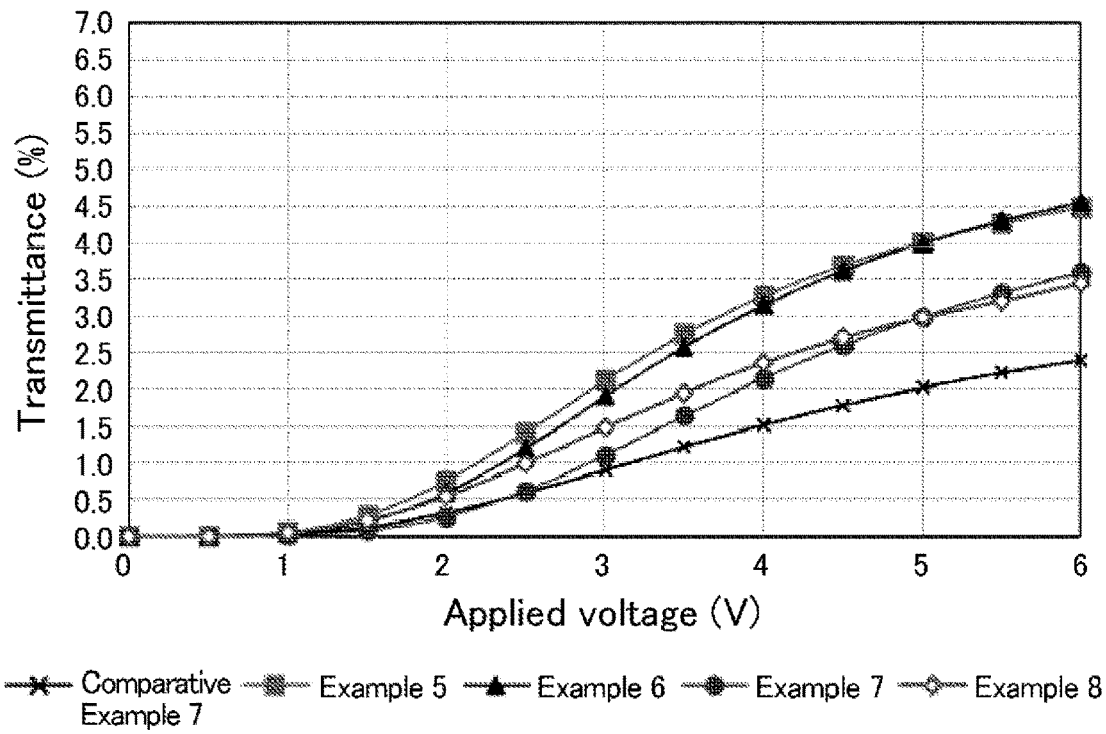
FIG. 68 is a graph showing voltage-transmittance characteristics of Examples 5 to 8 and Comparative Example 7.
Figure 69:
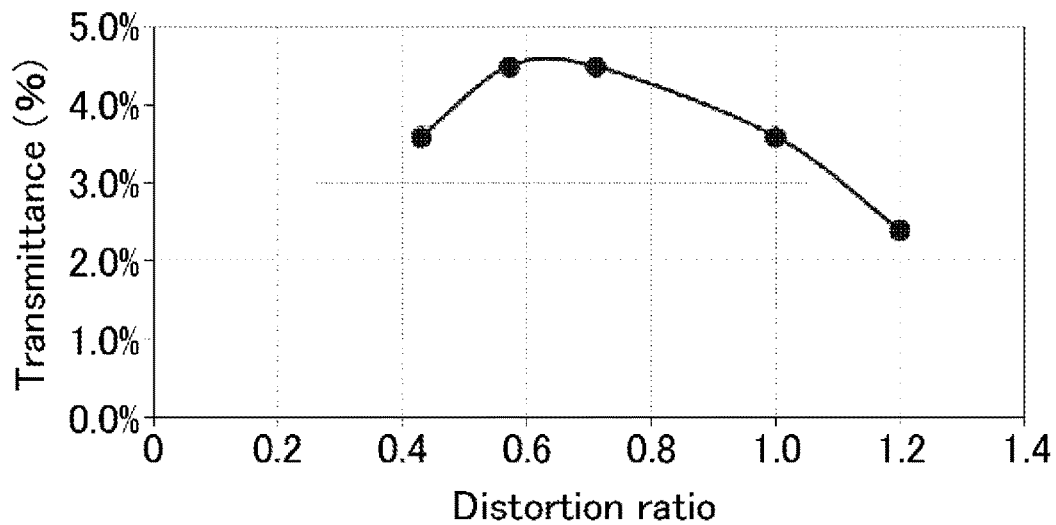
FIG. 69 is a graph showing the relation between a distortion ratio and transmittance.

FIG. 68 is a graph showing voltage-transmittance characteristics of Examples 5 to 8 and Comparative Example 7. FIG. 69 is a graph showing the relation between a distortion ratio and the transmittance. FIG. 69 shows the results of Examples 5 to 8 and Comparative Example 7, with the distortion ratio on the lateral axis and the transmittance (%) on the vertical axis. As shown in FIG. 68, a transmittance of 3.5% or higher under application of a voltage of 6 V was obtained in Examples 5 to 8 according to Embodiment 2 but not obtained in Comparative Example 7. Moreover, FIG. 69 shows that also in Example 5 to 8 and Comparative Example 7, in which the liquid crystal material used contains liquid crystal molecules having negative anisotropy of dielectric constant, the transmittance increases as the distortion ratio is increased and the transmittance is highest at the distortion ratio in Example 5 (0.71), as in Example 1 to 4 and Comparative Example 6, in which the liquid crystal material used contains liquid crystal molecules having positive anisotropy of dielectric constant. It also shows that once the distortion ratio exceeds 0.71, the transmittance decreases as the distortion ratio is increased.

Figure 70:
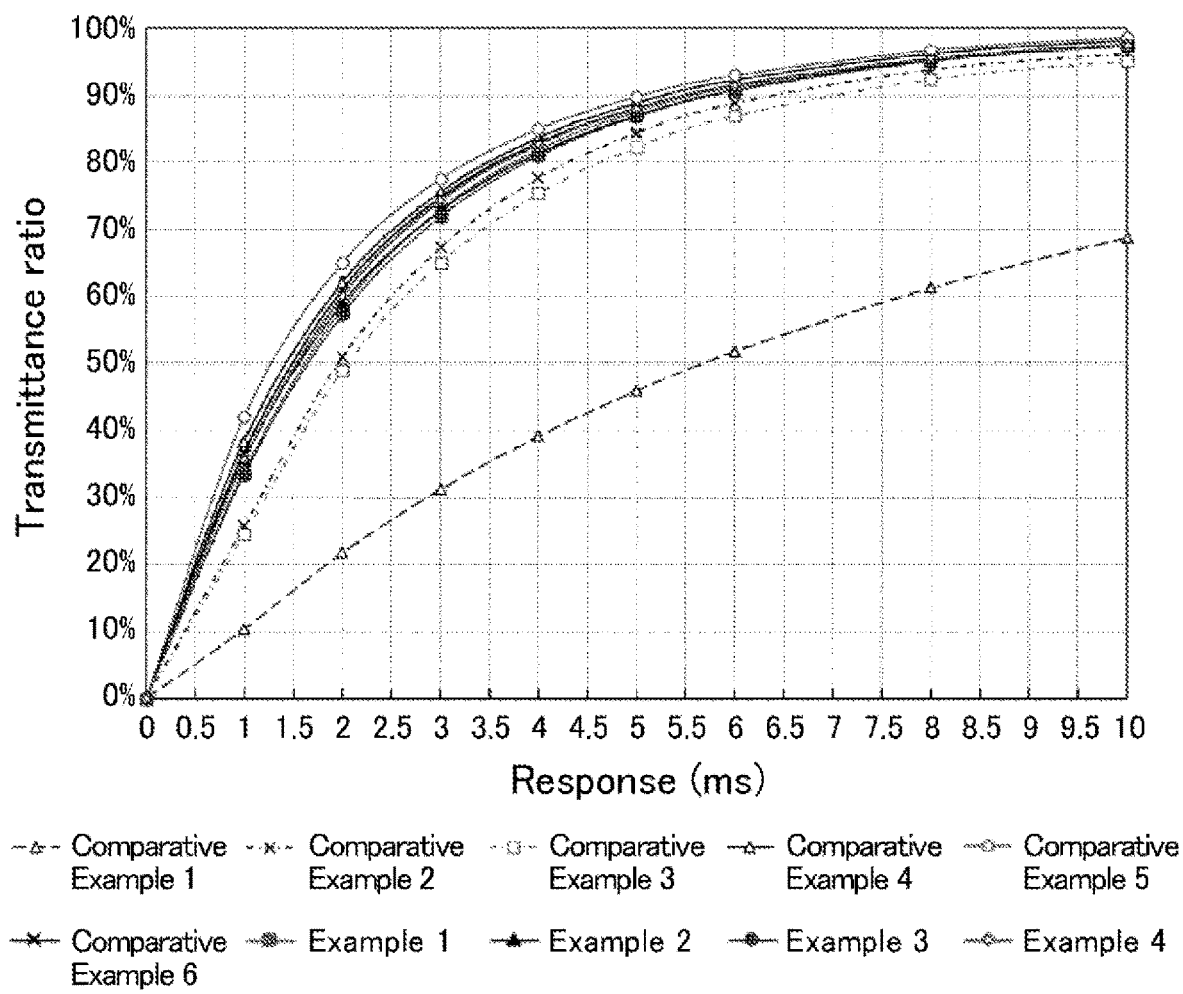
FIG. 70 is a graph showing rise response characteristics of Examples 1 to 4 and Comparative Examples 1 to 6.
Figure 71:
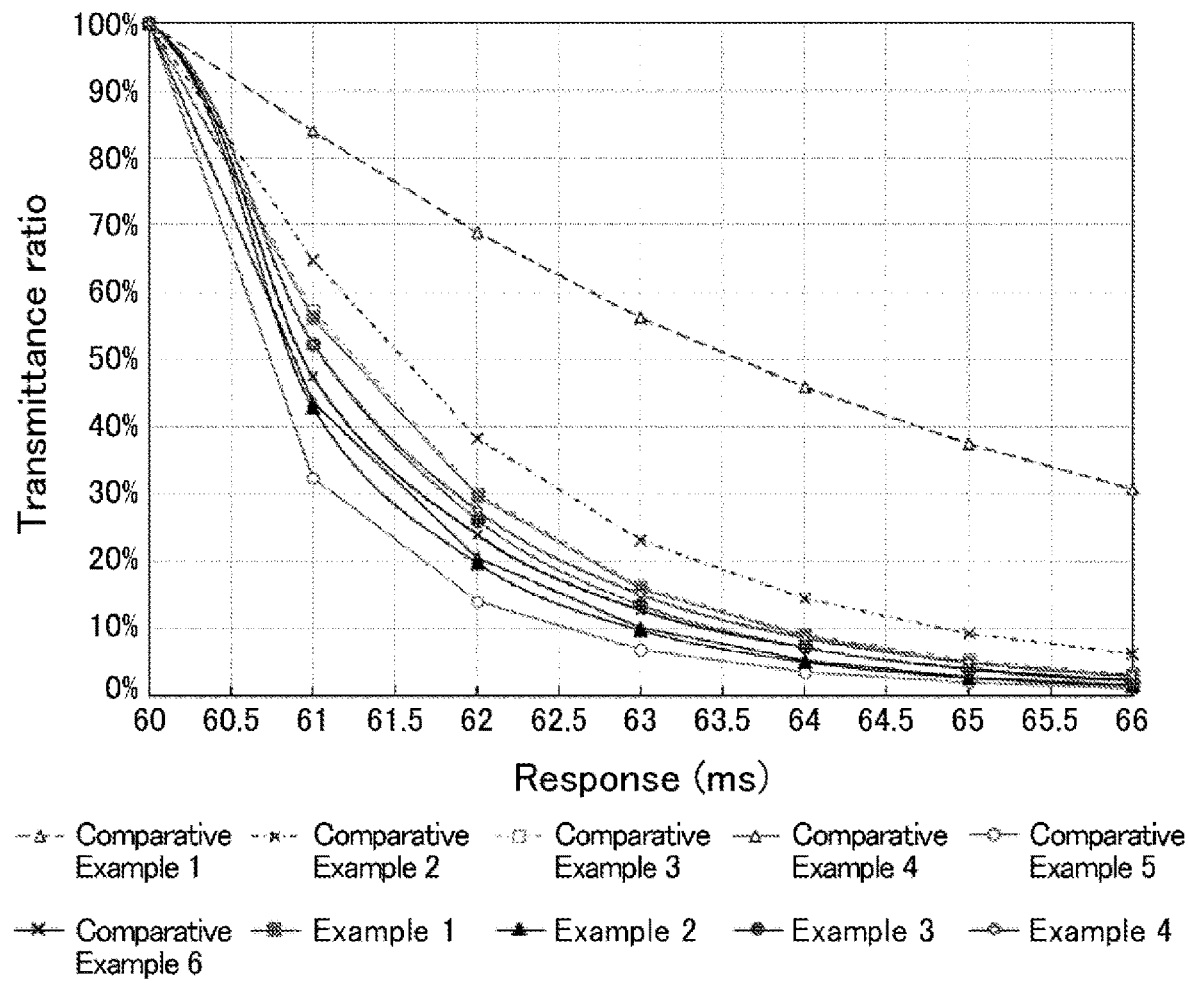
FIG. 71 is a graph showing decay response characteristics of Examples 1 to 4 and Comparative Examples 1 to 6.
Figure 72:
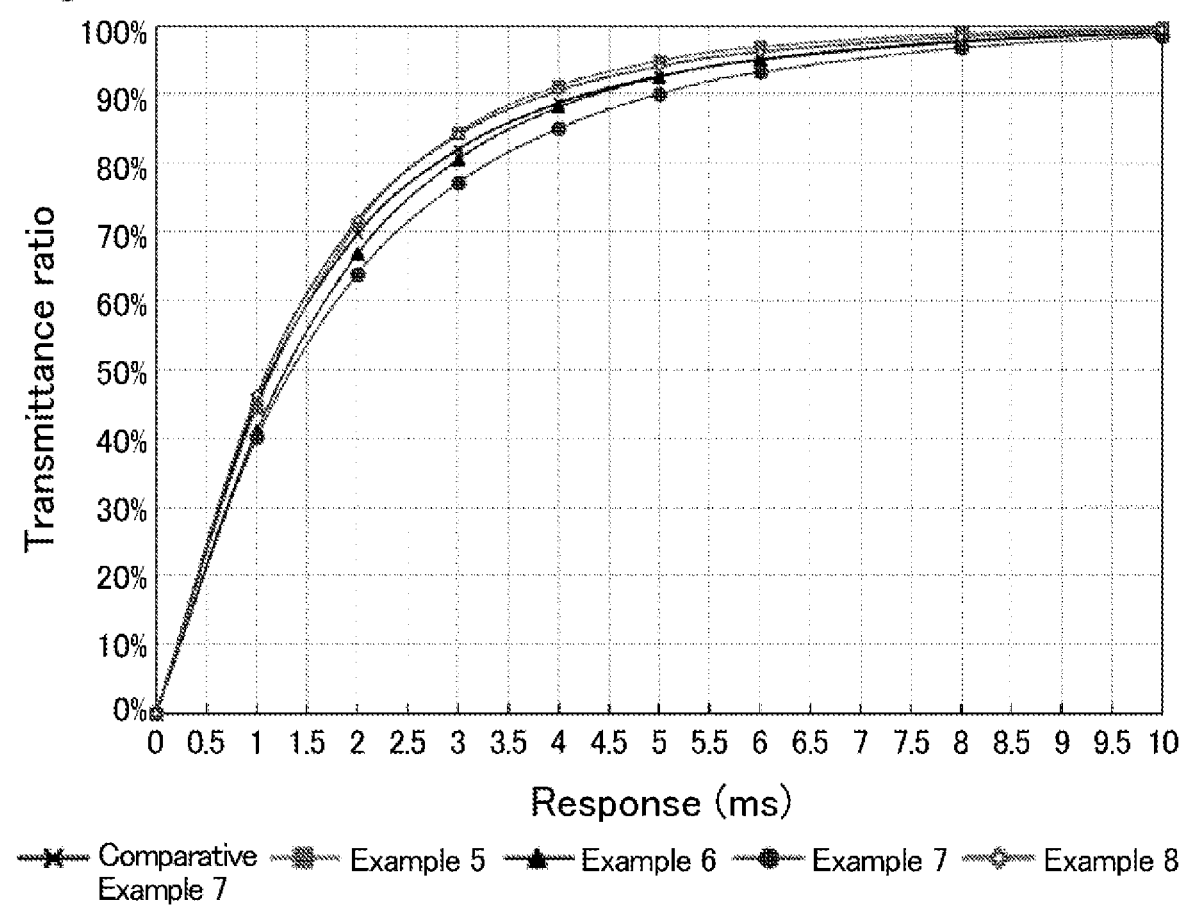
FIG. 72 is a graph showing rise response characteristics of Examples 5 to 8 and Comparative Example 7.
Figure 73:
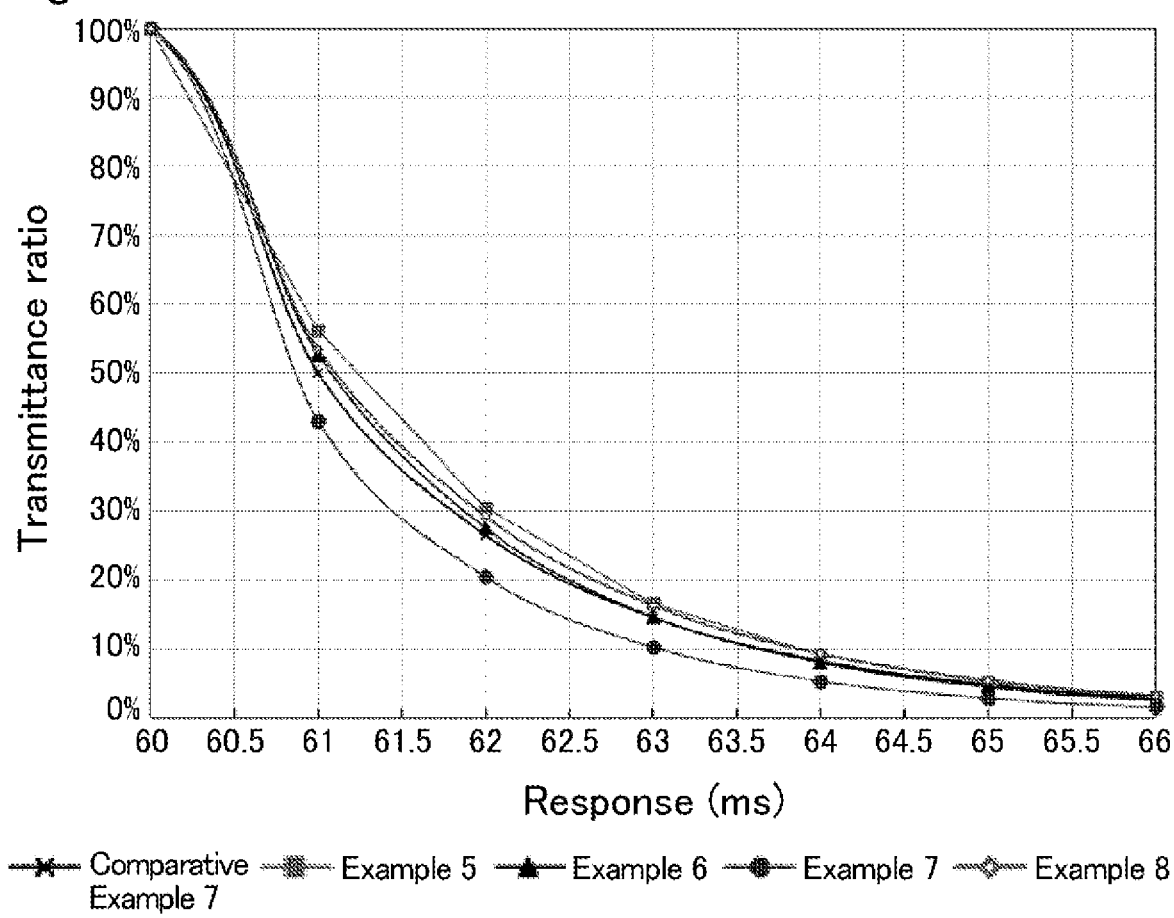
FIG. 73 is a graph showing decay response characteristics of Examples 5 to 8 and Comparative Example 7.

FIG. 70 is a graph showing rise response characteristics of Examples 1 to 4 and Comparative Examples 1 to 6. FIG. 71 is a graph showing decay response characteristics of Examples 1 to 4 and Comparative Examples 1 to 6. FIG. 72 is a graph showing rise response characteristics of Examples 5 to 8 and Comparative Example 7. FIG. 73 is a graph showing decay response characteristics of Examples 5 to 8 and Comparative Example 7. The rise response characteristics correspond to switching from black display to white display, and the decay response characteristics correspond to switching from white display to black display. When the average value of the black-white response (rise time and decay time) is smaller than 4.175 ms, which is a quarter of the period of one frame (=16.7 ms) at 60 Hz, the liquid crystal display device can accommodate double-speed display, thus achieving good moving image display performance.

As shown in FIG. 70, FIG. 71, and Table 1, an average value of the black-white response of smaller than 4.175 ms was obtained in Examples 1 to 4 but not obtained in Comparative Examples 1 to 3. The simulation results of the response characteristics confirm that the formation of quadrangular openings in the counter electrode leads to a slow response. As shown in FIG. 72, FIG. 73, and Table 2, an average value of the black-white response of smaller than 4.175 ms was obtained also in Examples 5 to 8.

The results of Examples 1 to 4 and Comparative Example 6 shown in FIG. 70, FIG. 71, and Table 1 and the results of Examples 5 to 8 and Comparative Example 7 shown in FIG. 72, FIG. 73, and Table 2 show that when the openings have a shape including an elliptical portion and/or a circular portion, the average value of the black-white response is small and the response speed is improved as compared to those in Comparative Examples 1 to 3. The results of Examples 1 to 8 and Comparative Examples 6 and 7 show that the distortion ratio is preferably less than 1 from the standpoint of transmittance, and that such a tendency is similarly observed regardless of whether the anisotropy of dielectric constant of the liquid crystal molecules is positive or negative.

Figure 74:
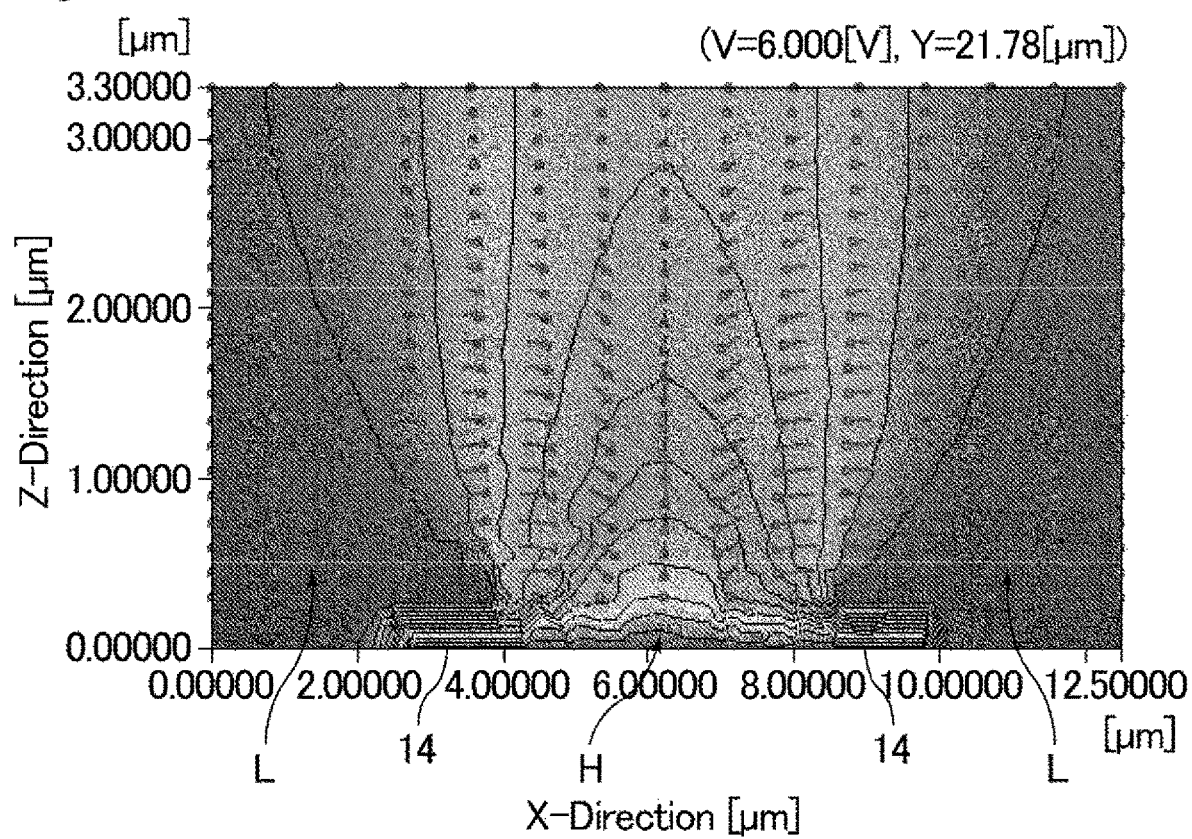
FIG. 74 is a cross-sectional view showing the simulation results of the distribution of liquid crystal molecule alignments in Example 1 in the on state.
Figure 75:
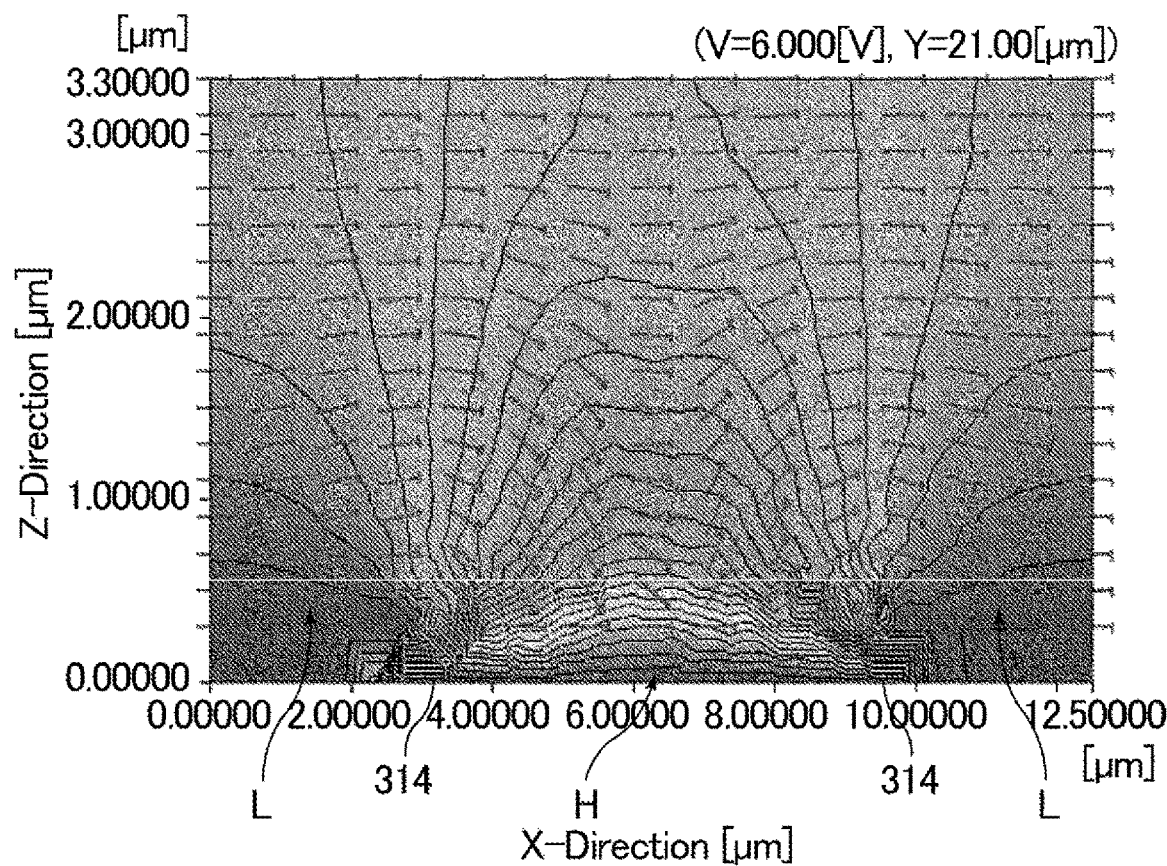
FIG. 75 is a cross-sectional view showing the simulation results of the distribution of liquid crystal molecule alignments in Example 5 in the on state.

Comparison of FIG. 70 and FIG. 72 shows that the use of a liquid crystal material containing liquid crystal molecules having negative anisotropy of dielectric constant improves the rise response speed better than the use of a liquid crystal material containing liquid crystal molecules having positive anisotropy of dielectric constant. This difference in rise response speed will be considered below taking Example 1 and Example 5, in which the dielectric constants of the liquid crystal molecules contained in the liquid crystal materials used are the same in absolute value but opposite in sign. FIG. 74 is a cross-sectional view showing the simulation results of the distribution of liquid crystal molecule alignments in Example 1 in the on state. FIG. 75 is a cross-sectional view showing the simulation results of the distribution of liquid crystal molecule alignments in Example 5 in the on state. FIG. 74 corresponds to a cross section taken along the line c-d in FIG. 6(2). FIG. 75 corresponds to a cross section taken along the line m-n in FIG. 48(2). FIGS. 74 and 75 show equipotential lines and the state of alignment of the liquid crystal molecules. The potential decreases as the distance from the counter electrode 14 or 314 increases. In FIGS. 74 and 75, a high potential region is indicated by "H" and a low potential region is indicated by "L". Comparison of FIG. 74 and FIG. 75 shows that in the case of using a liquid crystal material containing liquid crystal molecules having negative anisotropy of dielectric constant (FIG. 75), the liquid crystal molecules are aligned more parallel to the first substrate under the influence of the pulling of the fringe electric field than in the case of using a liquid crystal material containing liquid crystal molecules having positive anisotropy of dielectric constant (FIG. 74), and thus the distortion of the bend-aligned liquid crystal molecules is large. This presumably contributes to a high rise response speed.

Figure 76:
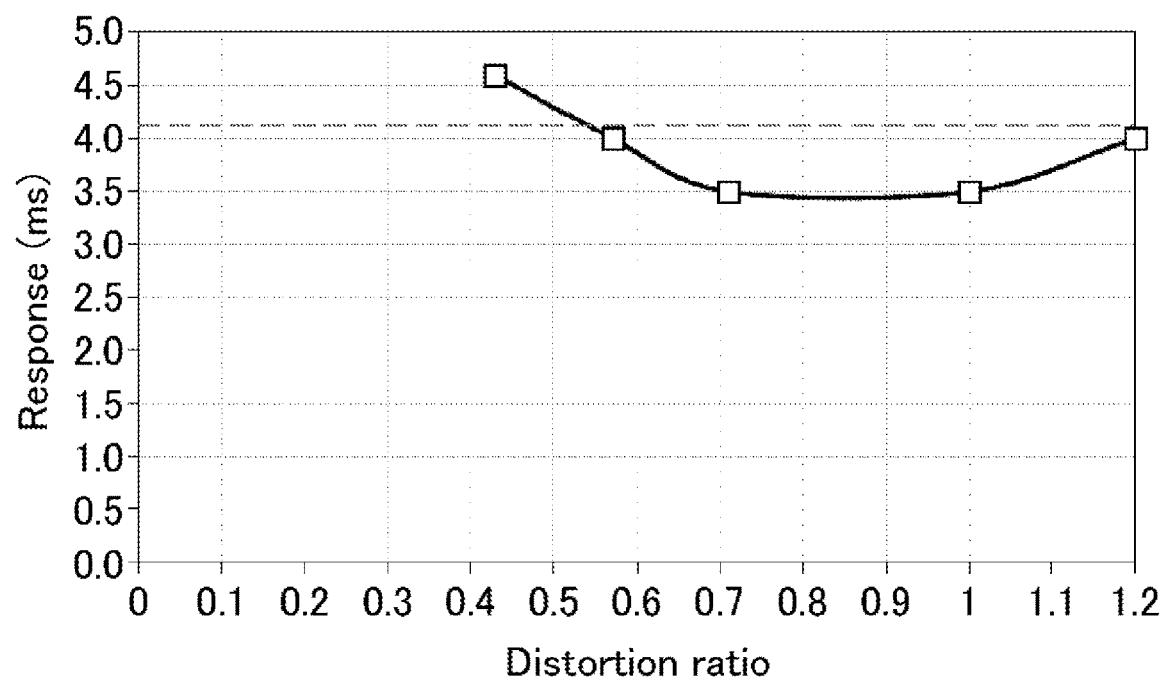
FIG. 76 is a graph showing the relation between a distortion ratio and rise response speed in Embodiment 2.

Turning to the distortion ratio, a smaller distortion ratio results in a larger twist of the liquid crystal molecules, and thus in a longer time for the liquid crystal molecules to be bend-aligned. With a smaller distortion ratio, therefore, the rise response speed tends to be slightly lower. The decay response speed, however, can be higher because the twist of the liquid crystal molecules can be utilized. Accordingly, from the standpoint of improving the decay response speed, the distortion ratio may be small. FIG. 76 is a graph showing the relation between a distortion ratio and the rise response speed in Embodiment 2. FIG. 76 shows the distortion ratio on the lateral axis and the rise response speed (ms) on the vertical axis. When the target value of the average black-white response is 4.2 ms or smaller, as shown in FIG. 76, from the viewpoint of improving the rise response speed, the lower limit of the distortion ratio is more preferably 0.55. In order to improve the rise response speed, for example, overshoot driving may be employed. In the present invention, even if the distortion ratio is small, for example, smaller than 0.55, combination of such a distortion ratio with a known overshoot driving can improve the rise and decay response speeds.

The above simulation results show that only Examples 1 to 8 satisfy both of the voltage-transmittance characteristics and the response characteristics.

ADDITIONAL REMARKS

One aspect of the present invention may be a liquid crystal display device including, in the given order: a first substrate; a liquid crystal layer containing liquid crystal molecules; and a second substrate, wherein the first substrate includes a first electrode, a second electrode positioned closer to the liquid crystal layer than the first electrode is, and an insulating film between the first electrode and the second electrode, the second electrode is provided with an opening having a shape including an elliptical portion and/or a circular portion, in a no-voltage-applied state, where no voltage is applied between the first electrode and the second electrode, the liquid crystal molecules are aligned parallel to the first substrate, and in a plan view, the major axis of the elliptical portion is parallel to an alignment azimuth of the liquid crystal molecules in the no-voltage-applied state.

The liquid crystal molecules may have positive anisotropy of dielectric constant.

In a plan view, a distortion ratio represented by Formula (1) below may be 1 or smaller:

$$\text{Distortion ratio} = a/b \tag{1}$$

where a is the length of the elliptical portion and/or the circular portion at an azimuth perpendicular to the alignment azimuth of the liquid crystal molecules in the no-voltage-applied state, and b is the length of the elliptical portion and/or the circular portion at the alignment azimuth of the liquid crystal molecules in the no-voltage-applied state.

Another aspect of the present invention may be a liquid crystal display device including, in the given order: a first substrate; a liquid crystal layer containing liquid crystal molecules; and a second substrate, wherein the first substrate includes a first electrode, a second electrode positioned closer to the liquid crystal layer than the first electrode is, and an insulating film between the first electrode and the second electrode, the second electrode has an opening having a shape including an elliptical portion and/or a circular portion, in a no-voltage-applied state, where no voltage is applied between the first electrode and the second electrode, the liquid crystal molecules are aligned parallel to the first substrate, and in a plan view, the major axis of the elliptical portion is perpendicular to an alignment azimuth of the liquid crystal molecules in the no-voltage-applied state.

The liquid crystal molecules preferably have negative anisotropy of dielectric constant.

In a plan view, a distortion ratio represented by Formula (2) below is preferably 1 or smaller:

$$\text{Distortion ratio} = x/y \tag{2}$$

where x is the length of the elliptical portion and/or the circular portion at the alignment azimuth of the liquid crystal molecules in the no-voltage-applied state, and y is the length of the elliptical portion and/or the circular portion at an azimuth perpendicular to the alignment azimuth of the liquid crystal molecules in the no-voltage-applied state.

The opening may have a shape including a plurality of the elliptical portions and/or a plurality of the circular portions and a linear portion, and the linear portion may connect the plurality of the elliptical portions and/or the plurality of the circular portions to each other.

REFERENCE SIGNS LIST

10, 210: First substrate
11, 211: Insulating substrate
12, 212: Pixel electrode (first electrode)
13, 213: Insulating layer (insulating film)
14, 214, 314, 414: Counter electrode (second electrode)
15, 215F, 315, 415: Elliptical portion
15A, 315A: Circular portion
16, 216, 316, 416: Linear portion
20, 220, 320: Liquid crystal layer
21, 221, 321, 421: Liquid crystal molecule
30, 230: Second substrate
31, 231: Insulating substrate (e.g., glass substrate)
32, 232: Color filter
33, 233: Overcoat layer
41: Gate signal line
42: Source signal line
43: TFT
100A, 100B, 100C, 100D, 200A, 200B, 200C, 200D, 200E, 200F,
300A, 300B, 300C, 300D, 400: Liquid crystal display device
215A: Square portion
215B, 215C: Rectangular portion
215D, 215E: Rhombic portion

The invention claimed is:

1. A liquid crystal display device comprising, in the given order:
    a first substrate;
    a liquid crystal layer containing liquid crystal molecules; and
    a second substrate,
    wherein the first substrate includes a first electrode, a second electrode positioned closer to the liquid crystal layer than the first electrode is, and an insulating film between the first electrode and the second electrode,
    the second electrode is provided with an opening having a shape including an elliptical portion and/or a circular portion,
    in a no-voltage-applied state, where no voltage is applied between the first electrode and the second electrode, the liquid crystal molecules are aligned parallel to the first substrate, and
    in a plan view, the major axis of the elliptical portion is parallel to an alignment azimuth of the liquid crystal molecules in the no-voltage-applied state.

2. The liquid crystal display device according to claim 1, wherein the liquid crystal molecules have positive anisotropy of dielectric constant.

3. The liquid crystal display device according to claim 1, wherein, in a plan view, a distortion ratio represented by Formula (1) below is 1 or smaller:

$$\text{Distortion ratio} = a/b \tag{1}$$

where a is the length of the elliptical portion and/or the circular portion at an azimuth perpendicular to the alignment azimuth of the liquid crystal molecules in the no-voltage-applied state, and b is the length of the elliptical portion and/or the circular portion at the alignment azimuth of the liquid crystal molecules in the no-voltage-applied state.

4. A liquid crystal display device comprising, in the given order:
    a first substrate;
    a liquid crystal layer containing liquid crystal molecules; and
    a second substrate,
    wherein the first substrate includes a first electrode, a second electrode positioned closer to the liquid crystal layer than the first electrode is, and an insulating film between the first electrode and the second electrode,
    the second electrode is provided with an opening having a shape including an elliptical portion and/or a circular portion,
    in a no-voltage-applied state, where no voltage is applied between the first electrode and the second electrode, the liquid crystal molecules are aligned parallel to the first substrate, and in a plan view, the major axis of the elliptical portion is perpendicular to an alignment azimuth of the liquid crystal molecules in the no-voltage-applied state.

5. The liquid crystal display device according to claim 4, wherein the liquid crystal molecules have negative anisotropy of dielectric constant.

6. The liquid crystal display device according to claim 4, wherein, in a plan view, a distortion ratio represented by Formula below is 1 or smaller:

$$\text{Distortion ratio} = x/y \qquad (2)$$

where x is the length of the elliptical portion and/or the circular portion at the alignment azimuth of the liquid crystal molecules in the no-voltage-applied state, and y is the length of the elliptical portion and/or the circular portion at an azimuth perpendicular to the alignment azimuth of the liquid crystal molecules in the no-voltage-applied state.

7. The liquid crystal display device according to claim 1, wherein the opening has a shape including a plurality of the elliptical portions and/or a plurality of the circular portions and a linear portion, and the linear portion connects the plurality of the elliptical portions and/or the plurality of the circular portions to each other.

8. The liquid crystal display device according to claim 4, wherein the opening has a shape including a plurality of the elliptical portions and/or a plurality of the circular portions and a linear portion, and the linear portion connects the plurality of the elliptical portions and/or the plurality of the circular portions to each other.

* * * * *